(12) United States Patent
Haskin et al.

(10) Patent No.: US 11,849,105 B2
(45) Date of Patent: *Dec. 19, 2023

(54) ESTIMATING REAL-TIME DELAY OF A VIDEO DATA STREAM

(71) Applicant: Edgy Bees Ltd., Kfar Vitkin (IL)

(72) Inventors: Menashe Haskin, Kfar Vitkin (IL); Nitay Megides, Beit Herut (IL); Amir Leibman, Netanya (IL); Ishay Peled, Kfar Sava (IL)

(73) Assignee: Edgy Bees Ltd., Kfar Vitkin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,339

(22) Filed: Dec. 14, 2022

(65) Prior Publication Data

US 2023/0124694 A1 Apr. 20, 2023

Related U.S. Application Data

(63) Continuation of application No. 17/685,407, filed on Mar. 3, 2022, now Pat. No. 11,563,932, which is a
(Continued)

(51) Int. Cl.
*H04N 17/02* (2006.01)
*H04N 17/00* (2006.01)
(Continued)

(52) U.S. Cl.
CPC ........... *H04N 17/002* (2013.01); *H04N 5/04* (2013.01); *H04N 5/265* (2013.01)

(58) Field of Classification Search
CPC ......... H04N 17/002; H04N 5/04; H04N 5/265
(Continued)

(56) References Cited

U.S. PATENT DOCUMENTS 3,213,010 A 10/1965 Saunders et al.
4,243,631 A 1/1981 Ryerson
(Continued)

FOREIGN PATENT DOCUMENTS

CN 105163056 A 12/2015
GB 2334390 A 8/1999
(Continued)

OTHER PUBLICATIONS

User manual numbered English (EU), "SM-G925F SM-G925FQ SM-G9251 User Manual" Mar. 2015 (Rev. 1.0) (145 pages).
(Continued)

*Primary Examiner* — Trang U Tran
(74) *Attorney, Agent, or Firm* — May Patents Ltd. c/o Dorit Shem-Tov

(57) ABSTRACT

In an arrangement where a physical phenomenon affects a digital video camera and is measured or sensed by a sensor, a delay of a digital video stream from the digital video camera is estimated. The digital video stream is processed by a video processor for producing a signal that represents the changing over time of the effect of the physical phenomenon on the digital video camera. The signal is then compared with the sensor output signal, such as by using cross-correlation or cross-convolution, for estimating the time delay between the compared signals. The estimated time delay may be used for synchronizing when combining additional varied data to the digital video stream for low-error time alignment. The physical phenomenon may be based on mechanical position or motion, such as pitch, yaw, or roll. The time delay estimating may be performed once, upon user control, periodically, or continuously.

54 Claims, 15 Drawing Sheets

Related U.S. Application Data continuation of application No. 17/420,766, filed as application No. PCT/IL2019/051263 on Nov. 18, 2019, now Pat. No. 11,290,708.

(60) Provisional application No. 62/807,429, filed on Feb. 19, 2019.

(51) Int. Cl.
  *H04N 5/04* (2006.01)
  *H04N 5/265* (2006.01)

(58) Field of Classification Search
  USPC .................................................. 348/194
  See application file for complete search history.

(56) References Cited

U.S. PATENT DOCUMENTS

| | | |
|---|---|---|
| 4,434,451 A | 2/1984 | Delatorre |
| 4,464,650 A | 8/1984 | Eastman |
| 4,558,302 A | 12/1985 | Welch |
| 4,759,220 A | 7/1988 | Burdess et al. |
| 4,779,215 A | 10/1988 | Moisan et al. |
| 4,814,746 A | 3/1989 | Miller |
| 4,873,481 A | 10/1989 | Nelson et al. |
| 5,001,453 A | 3/1991 | Ikejiri et al. |
| 5,105,087 A | 4/1992 | Jagielinski |
| 5,134,887 A | 8/1992 | Bell |
| 5,138,459 A | 8/1992 | Roberts |
| 5,189,463 A | 2/1993 | Capper |
| 5,402,170 A | 3/1995 | Parulski et al. |
| 5,511,547 A | 4/1996 | Markle |
| 5,546,156 A | 8/1996 | McIntyre |
| 5,578,755 A | 11/1996 | Offenberg |
| 5,604,595 A | 2/1997 | Schoen |
| 5,798,791 A | 8/1998 | Katayama |
| 5,817,943 A | 10/1998 | Welles, II et al. |
| 5,962,786 A | 10/1999 | Le Traon et al. |
| 5,982,712 A | 11/1999 | Smith |
| 6,476,372 B2 | 11/2002 | Merrill et al. |
| 6,539,320 B1 | 3/2003 | Szajnowski et al. |
| 6,549,234 B1 | 4/2003 | Lee |
| 6,606,911 B2 | 8/2003 | Akiyama et al. |
| 6,670,212 B2 | 12/2003 | McNie et al. |
| 6,747,258 B2 | 6/2004 | Benz et al. |
| 6,806,722 B2 | 10/2004 | Shon et al. |
| 6,840,103 B2 | 1/2005 | Lee |
| 6,844,897 B1 | 1/2005 | Andersson |
| 6,895,803 B2 | 5/2005 | Seakins et al. |
| 6,897,891 B2 | 5/2005 | Itsukaichi |
| 6,940,545 B1 | 9/2005 | Ray |
| 7,113,605 B2 | 9/2006 | Rui et al. |
| 7,216,047 B2 | 5/2007 | Szajnowski |
| 7,256,466 B2 | 8/2007 | Lieber et al. |
| 7,326,866 B2 | 2/2008 | Whitmore et al. |
| 7,342,212 B2 | 3/2008 | Mentzer et al. |
| 7,363,177 B2 | 4/2008 | Intrator |
| 7,432,952 B2 | 10/2008 | Fukuoka |
| 7,515,506 B2 | 4/2009 | Szajnowski |
| 7,617,729 B2 | 11/2009 | Axelrod et al. |
| 7,716,985 B2 | 5/2010 | Zhang et al. |
| 7,774,155 B2 | 8/2010 | Sato et al. |
| 7,892,876 B2 | 2/2011 | Mehregany |
| 8,244,053 B2 | 8/2012 | Steinberg |
| 8,285,067 B2 | 10/2012 | Steinberg |
| 8,773,509 B2 | 7/2014 | Pan |
| 8,941,561 B1 | 1/2015 | Starner |
| 8,948,832 B2 | 2/2015 | Hong et al. |
| 9,019,174 B2 | 4/2015 | Jerauld |
| 9,268,136 B1 | 2/2016 | Patrick et al. |
| 9,298,283 B1 | 3/2016 | Lin et al. |
| 10,089,549 B1 | 10/2018 | Cao |
| 10,418,068 B2 * | 9/2019 | Tran ............... H04N 9/8205 |
| 11,128,710 B2 * | 9/2021 | Binder ............... G07C 3/02 |
| 2002/0101515 A1 | 8/2002 | Yoshida |
| 2004/0155993 A1 | 8/2004 | Cueff et al. |
| 2004/0182167 A1 | 9/2004 | Orth et al. |
| 2006/0104620 A1 | 5/2006 | Ebato |
| 2007/0167689 A1 | 7/2007 | Ramadas et al. |
| 2007/0195167 A1 | 8/2007 | Ishiyama |
| 2007/0198144 A1 | 8/2007 | Norris et al. |
| 2007/0264623 A1 | 11/2007 | Wang et al. |
| 2007/0285438 A1 | 12/2007 | Kanowitz |
| 2009/0102940 A1 | 4/2009 | Uchida |
| 2010/0067553 A1 | 3/2010 | McKinney et al. |
| 2011/0041604 A1 | 2/2011 | Kano et al. |
| 2011/0045523 A1 | 2/2011 | Strano et al. |
| 2011/0061460 A1 | 3/2011 | Seeger et al. |
| 2011/0090399 A1 | 4/2011 | Whitaker et al. |
| 2011/0219873 A1 | 9/2011 | Ohta et al. |
| 2011/0275544 A1 | 11/2011 | Zhou et al. |
| 2012/0249768 A1 | 10/2012 | Binder |
| 2013/0201316 A1 | 8/2013 | Binder et al. |
| 2013/0222638 A1 | 8/2013 | Wheeler et al. |
| 2014/0070613 A1 | 3/2014 | Garb |
| 2014/0159877 A1 | 6/2014 | Huang |
| 2014/0362446 A1 | 12/2014 | Bickerstaff et al. |
| 2015/0086078 A1 | 3/2015 | Sibiryakov |
| 2015/0324636 A1 | 11/2015 | Bentley et al. |
| 2015/0349556 A1 | 12/2015 | Mercando et al. |
| 2016/0027335 A1 | 1/2016 | Schoensee et al. |
| 2017/0266568 A1 | 9/2017 | Lucas et al. |
| 2017/0301373 A1 | 10/2017 | Tran et al. |
| 2018/0053063 A1 | 2/2018 | Shemesh |
| 2018/0218214 A1 | 8/2018 | Pestun et al. |
| 2018/0225833 A1 | 8/2018 | Cao et al. |
| 2018/0260626 A1 | 9/2018 | Pestun et al. |

FOREIGN PATENT DOCUMENTS

| | | |
|---|---|---|
| GB | 2526154 A | 11/2014 |
| GB | 2545181 A | 6/2017 |
| JP | 2006050494 A | 2/2006 |
| JP | 2007208922 A | 8/2007 |
| JP | 2008033200 A | 2/2008 |
| WO | 2007135659 A | 11/2007 |
| WO | 2012013914 A | 2/2012 |
| WO | 2014199155 A | 12/2014 |
| WO | 2016/174659 A1 | 11/2016 |
| WO | 2017/156642 A1 | 9/2017 |
| WO | 2017214400 A | 12/2017 |

OTHER PUBLICATIONS

"Galaxy S6 Edge—Technical Specification" (retrieved Oct. 2015 from www.samsung.com/us/explore/galaxy-s-6-features-and specs) (1 page).

"Android Tutorial", downloaded from tutorialspoint.com on Jul. 2014 (216 pages).

"iOS Tutorial", downloaded from tutorialspoint.com on Jul. 2014 (185 pages).

Application Note No. RES05B00008-0100/Rec. 1.00, "R8C Family—General RTOS Concepts", published Jan. 2010 by Renesas Technology Corp. (20 pages).

JAJA Technology Review entitled: "An Overview of Real-Time Operating Systems", published Feb. 2007 [1535-5535/$32.00] by The Association for Laboratory Automation (6 pages).

Chapter 2 entitled: "Basic Concepts of Real Time Operating Systems" of a book published 2009 [ISBN—978-1-4020-9435-4] by Springer Science + Business Media B.V. entitled: "Hardware-Dependent Software—Principles and Practice" (304 pages).

Nicolas Melot, "Study of an operating system: FreeRTOS—Operating systems for embedded devices", (downloaded Jul. 2015) (39 pages).

Dr. Richard Wall entitled: "Carebot PIC32 MX7ck implementation of Free RTOS", Sep. 23, 2013 (18 pages).

Web pages entitled: "FreeRTOS™ Modules" published in the www.freertos.org web-site dated Nov. 26, 2006 (112 pages).

Rich Goyette of Carleton University as part of 'SYSC5701: Operating System Methods for Real-Time Applications', entitled: "An

(56) References Cited

OTHER PUBLICATIONS

Analysis and Description of the Inner Workings of the FreeRTOS Kernel", Apr. 1, 2007 (46 pages).
SAE J3016, entitled: "Taxonomy and Definitions for Terms Related to On-Road Motor Vehicle Automated Driving Systems" [Revised Sep. 2016] (35 pages).
Book published by Robert Bosch GmbH Edition, "Bosch Automotive Electric and Automotive Electronics", (Jul. 5, 2007) (530 pages).
Meiyuan Zhao of Security & Privacy Research, Intel Labs, "Advanced Driver Assistant System—Threats, Requirements, Security Solutions", Intel Corporation 2015 Technical White Paper (0115/MW/HBD/PDF 331817-001US) (36 pages).
PhD Thesis by Alexandre Dugarry entitled: "Advanced Driver Assistance Systems—Information Management and Presentation", Jun. 2004 (124 pages).
Texas Instrument 2015 datasheet # SWRS158A, "CC2650 SimpleLink™ Multistandard Wireless MCU", (published Feb. 2015, Revised Oct. 2015) (59 pages).
Texas Instrument publication # SWRT022 entitled: "SimpleLink™ Ultra-Low Power—Wireless Microcontroller Platform", 2015 (3 pages).
Ning-Ning Zhou and Yu-Long Deng, "Virtual Reality: A State-of-the-Art Survey", Nov. 2009 in International Journal of Automation and Computing 6(4), Nov. 2009, 319-325 (7 pages).
Steven M. LaValle, "Virtual Reality", Jul. 6, 2016 (187 pages).
D.W.F. van Krevelen and R. Poelman, "A Survey of Augmented Reality—Technologies, Applications and Limitations", published 2010 in The International Journal of Virtual Reality, 2010, 9(2):1-20 (19 pages).
Moses Okechukwu Onyesolu and Felista Udoka Eze, "Understanding Virtual Reality Technology: Advances and Applications" published 2011 by the Federal University of Technology, Owerri, Imo State, Nigeria (19 pages).
Dr. Matthias Schmidt (Ed.), Advances in Computer Science and Engineering, [ISBN: 978-953-307-173-2] by InTech, 2011 (472 pages).
James Walker of Michigan Technological University entitled: "Everyday Virtual Reality" Feb. 27, 2015 (22 pages).
Tinku Acharya and Ajoy K. Ray entitled: "Image Processing—Principles and Applications", published by Wiley-Interscience [ISBN: 13-978-0-471-71998-4] (2005) (451 pages).
Book by Wikipedia entitled: "Electronics" downloaded from en.wikibooks.org dated Mar. 15, 2015 (401 pages).
Svante Bjorklund, "A Survey and Comparison of Time-Delay Estimation Methods in Linear Systems", published 2003 by the Department of Electrical Engineering, Linkopings Universitet, Linkoping, Sweden [ISBN—91-7373-870-0] (170 pages).
Svante Bjorklund and Lennart Ljung, a Report No. LiTH-ISY-R-2554 entitled: "A Review of Time-Delay Estimation Techniques", published Dec. 30, 2003 (8 pages).
Matthew Rhudy, "Time Alignment Techniques for Experimental Sensor Data", [DOI: 10.5121/ijcses.2014.5201], presented on Apr. 2014 at International Journal of Computer Science & Engineering Survey (IJCSES) vol. 5, No. 2 (14 pages).
Yushi Zhang and Waleed H. Abdulla, "A Comparative Study of Time-Delay Estimation Techniques Using Microphone Arrays", published 2005, School of Engineering Report No. 619 The University of Auckland, New Zealand (57 pages).
The MathWorks®, Inc., https://www.mathworks.com/help/signal/ref/finddelay.html downloaded from the Internet on Jan. 2019 (5 pages).
Data sheet ICM 7555/7556 "General Purpose Timers" publication No. 19-0481 Rev.2 Nov. 1992 (6 pages).
Application Note AN170 "NE555 and NE556 Applications" from Philips semiconductors dated Dec. 1988 (19 pages).
Boualem Boashash, "Estimating and Interpreting the Instantaneous Frequency of a Signal—Part 1: Fundamentals", published in Proceedings of the IEEE, vol. 80, No. 4, Apr. 1992 (0018-9219/92$03.00, 1992 IEEE) (20 pages).
Boualem Boashash, "Estimating and Interpreting the Instantaneous Frequency of a Signal—Part 2: Algorithms and Applications", published in Proceedings of the IEEE, vol. 80, No. 4, Apr. 1992 (0018-9219/92$03.00, 1992 IEEE) (30 pages).
Jonatan Lerga, "Overview of Signal Instantaneous Frequency Estimation Methods", (8 pages).
Book entitled: "Practical Design Techniques for Sensor Signal Conditioning", by Analog Devices, Inc., 1999 (ISBN-0-916550-20-6) (366 pages).
Book entitled: "Sensors and Control Systems in manufacturing", Second Edition 2010, by Sabrie Soloman, The McGraw-Hill Companies, ISBN: 978-0-07-160573-1 (625 pages).
Book entitled: "Fundamentals of Industrial Instrumentation and Process Control", by William C. Dunn, 2005, The McGraw-Hill Companies, ISBN: 0-07-145735-6 (337 pages).
Book entitled: "Sensor technology Handbook", Edited by Jon Wilson, by Newnes-Elsevier 2005, ISBN:0-7506-7729-5 (702 pages).
The manual "80186/80188 High-Integration 16-Bit Microprocessors" by Intel Corporation Nov. 1994 (34 pages).
The manual "MC68360 Quad Integrated Communications Controller—User's Manual" by Motorola, Inc. (962 pages).
Data sheet [DS-TM4C123GH6PM-15842.2741, SPMS376E, Revision 15842.2741 Jun. 2014], "Tiva™ TM4C123GH6PM Microcontroller—Data Sheet", published 2015 by Texas Instruments Incorporated (1409 pages).
International Search Report of PCT/IL2019/051263 dated Apr. 2, 2020.
Written Opinion of PCT/IL2019/051263 dated Apr. 2, 2020.
Supplementary European Search Report of EP 19 91 6381 dated Jul. 12, 2022.
Robert Berdan, "Digital Photography Basics for Beginners", (downloaded from 'canadianphotographer.com' preceded by 'www.') (12 pages).
Joseph Ciaglia et al., "Absolute Beginner's Guide to Digital Photography", published on Apr. 2004 by Que Publishing ISBN—0-7897-3120-7) (381 pages).
Al Bovik, "Handbook of Image & Video Processing", by Academic Press, ISBN: 0-12-119790-5, 2000 (800 pages).
Application Note No. AN1928/D, "Roadrunner—Modular digital still camera reference design", by Freescale Semiconductor, Inc. (Revision 0—Feb. 20, 2001) (30 pages).
Chapter 20: "Wireless Technologies" of the publication No. 1-587005-001-3 by Cisco Systems, Inc. (Jul. 1999) "Internetworking Technologies Handbook" (42 pages).
Book published 2005 by Pearson Education, Inc. William Stallings [ISBN: 0-13-191835-4] "Wireless Communications and Networks—second Edition" (569 pages).
Telecom Regulatory Authority, "WiFi Technology", published on Jul. 2003 (60 pages).
Bluetooth SIG published Dec. 2, 2014 standard Covered Core Package version: 4.2, "Master Table of Contents & Compliance Requirements—Specification vol. 0" (2772 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi:10.3390/s120211734] (20 pages).
Yunxin (Jeff) Li, "An Overview of the DSRC/WAVE Technology", (Eveleigh, NSW 2015, Australia) downloaded from the Internet on Jul. 2017 (15 pages).
Arib STD-T75 Version 1.0, "Dedicated Short-Range Communication System—Arib Standard Version 1.0", published Sep. 2001 by Association of Radio Industries and Businesses Kasumigaseki, Chiyoda-ku, Tokyo 100-0013, Japan (469 pages).
Carnegie Mellon University chapter entitled: "Introduction to Data Compression" by Guy E. Blelloch, dated Jan. 31, 2013 (55 pages).
Adobe Digital Video Group publication, "A Digital Video Primer—An introduction to DV production, post-production, and delivery", updated and enhanced Mar. 2004 (58 pages).
Primer by Tektronix® entitled: "A Guide to Standard and High-Definition Digital Video Measurements", 2009 (112 pages).
IETF RFC 3640, "RTP Payload Format for Transport of MPEG-4 Elementary Streams", Nov. 2003 (43 pages).

(56) References Cited

OTHER PUBLICATIONS

White paper entitled: "Understanding MPEG-4: Technologies, Advantages, and Markets—An MPEGIF White Paper", published 2005 by The MPEG Industry Forum (Document No. mp-in-40182) (51 pages).
IETF RFC 3984, "RTP Payload Format for H.264 Video", Feb. 2005 (83 pages).
Gary J. Sullivan of Microsoft Corporation, "The H.264/MPEG4 Advanced Video Coding Standard and its Applications", Standards Report published in IEEE Communications Magazine, Aug. 2006 (10 pages).
Publication entitled: "An introduction to video content analysis—industry guide" published Aug. 2016 as Form No. 262 Issue 2 by British Security Industry Association (BSIA) (13 pages).
Paper entitled: "Overview of Existing Content Based Video Retrieval Systems" by Shripad A. Bhat, Omkar V. Sardessai, Preetesh P. Kunde and Sarvesh S. Shirodkar of the Department of Electronics and Telecommunication Engineering, Goa College of Engineering, Farmagudi Ponda Goa, published Feb. 2014 (8 pages).
Wilhelm Burger and Bir Bhanu entitled: "Estimating 3-D Egomotion from Perspective Image Sequences", published in IEEE Transactions on Pattern Analysis and Machine Intelligence, vol. 12, No. 11, Nov. 1990 (19 pages).
Andrew Jaegle, Stephen Phillips, and Kostas Daniilidis, "Fast, Robust, Continuous Monocular Egomotion Computation", downloaded from the Internet on Jan. 2019 (8 pages).
Tina Y. Tian, Carlo Tomasi, and David J. Heeger, "Comparison of Approaches to Egomotion Computation", downloaded from the Internet on Jan. 2019 (6 pages).
Rolf Hut, "Time Frequency Analysis—a Comparison between cochlear modeling and existing methods", Sep. 2004 (66 pages).
Franz Hlawatsch and Gerald Matz, "Time-Frequency Signal Processing: A Statistical Perspective", IEEE Nov. 1998, pp. 207-219 (11 pages).
LIS302DL manufactured by STMicroelectronics NV and described in Data-sheet LIS302DL STMicroelectronics NV, MEMS motion sensor 3-axis—±2g/±8g smart digital output "piccolo" accelerometer, Rev. 4, Oct. 2008 (42 pages).
Data-sheet 'Datasheet SQ-SEN-200 Omnidirectional Tilt and Vibration Sensor' Updated Aug. 3, 2009 (6 pages).
Datasheet "LSM9DS1—iNEMO inertial module: 3D accelerometer, 3D gyroscope, 3D magnetometer", published Mar. 2015 (72 pages).
Datasheet "ButterflyGyro™—STIM300 Intertia Measurement Unit", Oct. 2015 [TS1524 rev. 20] by Sensonor AS, headquartered in Horten, Norway (80 pages).
Martin Veskrna, "Positioning system for small devices using principles of inertial navigation system", 2013 (71 pages).
Sam Naghshineh, Golafsoun Ameri, Mazdak Zereshki & Dr. S. Krishnan, Dr. M. Abdoli-Eramaki, "Human Motion capture using Tri-Axial accelerometers", (downloaded from the Internet Mar. 2016) (49 pages).
Xiaoping Yun et al., "Self-Contained Position Tracking of Human Movement Using Small Inertial/Magnetic Sensor Module", published 2007 IEEE International Conference on Robotics and Automation (Rome, Italy, Apr. 10-14, 2007) (9 pages).
IETF RFC 3550 entitled: "Rtp: A Transport Protocol for Real-Time Applications", Jul. 2003 (89 pages).
IETF RFC 4587 entitled: "RTP Payload Format for H.261 Video Streams", Aug. 2006 (17 pages).
IETF RFC 2326 entitled: "Real Time Streaming Protocol (RTSP)", Apr. 1998 (92 pages).
John G. Apostolopoulos, Wai-Tian, and Susie J. Wee and entitled: "Video Streaming: Concepts, Algorithms, and Systems", by Hewlett-Packard Company (HP®) 2002 (36 pages).
Presentation by David Ronca, entitled: "A Brief History of Netflix Streaming", May 2013 (40 pages).
Alex MacAulay, Boris Felts, and Yuval Fisher, entitled: "Whitepaper—IP Streaming of MPEG-4" Native RTP vs "MPEG-2 Transport Stream", white paper published Oct. 2005 by Envivio® (12 pages).
An overview entitled: "HTTP Live Streaming Overview", published 2014 by Apple Inc. Developer (39 pages).
Thomas Stockhammer of Qualcomm Incorporated entitled: "Dynamic Adaptive Streaming over HTTP—Design Principles and Standards", Jan. 31, 2014 (4 pages).
Alex Zambelli and entitled: "IIS Smooth Streaming Technical Overview", Mar. 2009 by Microsoft Corporation (17 pages).
Liang Chen, Yipeng Zhou, and Dah Ming Chiu, "Smart Streaming for Online Video Services", Apr. 10, 2014 (12 pages).
Celtic-Plus publication, 'H2B2VS D1 1 1 State-of-the-art V2.0.docx' entitled: "H2B2VS D1.1.1 Report on the state of the art technologies for hybrid distribution of TV services", (downloaded Feb. 2016 from the Internet) (84 pages).
Technology brief entitled: "QuickTime Streaming", by Apple Computer, Inc. published Mar. 2005 (Document No. L308280A) (6 pages).
John G. Proakis and Dimitris G. Manolakis, "Third Edition—Digital Signal Processing—Principles, Algorithms, and Application", published 1996 by Prentice-Hall Inc. [ISBN 0-13-394338-9] (1033 pages).
Steven W. Smith, "The Scientist and Engineer's Guide to—Digital Signal Processing—Second Edition", published by California Technical Publishing [ISBN 0-9960176-7-6] (688 pages).
Yarlagadda, R.K.R., Chapter 2 entitled: "Convolution and Correlation" of the book "Analog and Digital Signals and Systems", published 2010 by Springer Science + Business Media [ISBN: 978-1-4419-0033-3] (33 pages).
The MathWorks®, Inc., webpage https://www.mathworks.com/help/signal/ref/xcorr.html downloaded Jan. 2019 (pages).
iPhone 6 technical specification (retrieved Oct. 2015 from www.apple.com/iphone-6/specs/) (32 pages).
User Guide, "iPhone User Guide For iOS 8.4 Software", dated 2015 (019-00155/2015-06) by Apple Inc. (196 pages).

* cited by examiner

| SAE level | Name | Narrative Definition | Execution of Steering and Acceleration/Deceleration | Monitoring of Driving Environment | Fallback Performance of Dynamic Driving Task | System Capability (Driving Modes) |
|---|---|---|---|---|---|---|
| *Human driver monitors the driving environment* ||||||||
| 0 | No Automation | the full-time performance by the human driver of all aspects of the dynamic driving task, even when enhanced by warning or intervention systems | Human driver | Human driver | Human driver | n/a |
| 1 | Driver Assistance | the driving mode-specific execution by a driver assistance system of either steering or acceleration/deceleration using information about the driving environment and with the expectation that the human driver perform all remaining aspects of the dynamic driving task | Human driver and system | Human driver | Human driver | Some driving modes |
| 2 | Partial Automation | the driving mode-specific execution by one or more driver assistance systems of both steering or acceleration/deceleration using information about the driving environment and with the expectation that the human driver perform all remaining aspects of the dynamic driving task | System | Human driver | Human driver | Some driving modes |
| *Automated driving system ("system") monitors the driving environment* ||||||||
| 3 | Conditional Automation | the driving mode-specific performance by an automated driving system of all the aspects of the dynamic driving task with the expectation that the human driver will respond appropriately to a request to intervene | System | System | Human driver | Some driving modes |
| 4 | High Automation | the driving mode-specific performance by an automated driving system of all the aspects of the dynamic driving task, even if a human driver does not respond appropriately to a request to intervene | System | System | System | Some driving modes |
| 5 | Full Automation | the full-time performance by an automated driving system of all the aspects of the dynamic driving task under all roadway and environmental conditions that can be managed by a human driver | System | System | System | All driving modes |

FIG. 2a (Prior Art)

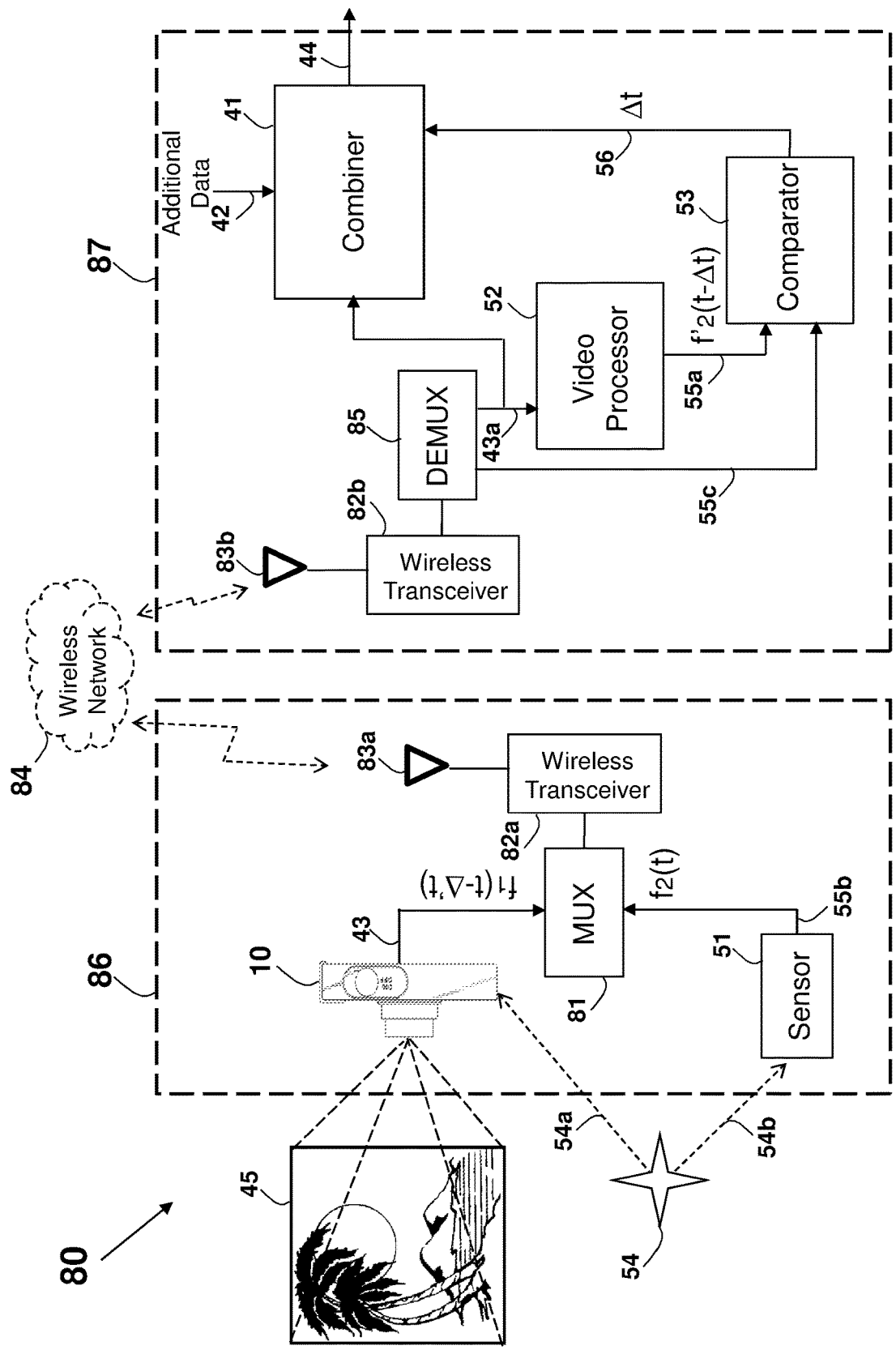

ESTIMATING REAL-TIME DELAY OF A VIDEO DATA STREAM

TECHNICAL FIELD

This disclosure generally relates to an apparatus and method for real-time estimating of a delay of a received video data stream from the video actual capturing, and in particular synchronization or time-stamping of a received video data stream, such as video data stream received from a video camera in a vehicle, with other real-time signals, such as for overlaying additional data to the video data stream.

BACKGROUND

Unless otherwise indicated herein, the materials described in this section are not prior art to the claims in this application and are not admitted to be prior art by inclusion in this section.

Digital photography is described in an article by Robert Berdan (downloaded from 'canadianphotographer.com' preceded by 'www.') entitled: "*Digital Photography Basics for Beginners*", and in a guide published on April 2004 by Que Publishing (ISBN—0-7897-3120-7) entitled: "*Absolute Beginner's Guide to Digital Photography*" authored by Joseph Ciaglia et al., which are both incorporated in their entirety for all purposes as if fully set forth herein.

A digital camera 10 shown in FIG. 1 may be a digital still camera which converts captured image into an electric signal upon a specific control, or can be a video camera, wherein the conversion between captured images to the electronic signal is continuous (e.g., 24 frames per second). The camera 10 is preferably a digital camera, wherein the video or still images are converted using an electronic image sensor 12. The digital camera 10 includes a lens 11 (or few lenses) for focusing the received light centered around an optical axis 8 (referred to herein as a line-of-sight) onto the small semiconductor image sensor 12. The optical axis 8 is an imaginary line along which there is some degree of rotational symmetry in the optical system, and typically passes through the center of curvature of the lens 11 and commonly coincides with the axis of the rotational symmetry of the sensor 12. The image sensor 12 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, New York.

An image processor block 13 receives the analog signal from the image sensor 12. The Analog Front End (AFE) in the block 13 filters, amplifies, and digitizes the signal, using an analog-to-digital (A/D) converter. The AFE further provides Correlated Double Sampling (CDS), and provides a gain control to accommodate varying illumination conditions. In the case of a CCD-based sensor 12, a CCD AFE (Analog Front End) component may be used between the digital image processor 13 and the sensor 12. Such an AFE may be based on VSP2560 '*CCD Analog Front End for Digital Cameras*' available from Texas Instruments Incorporated of Dallas, Texas, U.S.A. The block 13 further contains a digital image processor, which receives the digital data from the AFE, and processes this digital representation of the image to handle various industry-standards, and to execute various computations and algorithms. Preferably, additional image enhancements may be performed by the block 13 such as generating greater pixel density or adjusting color balance, contrast, and luminance. Further, the block 13 may perform other data management functions and processing on the raw digital image data. Commonly, the timing relationship of the vertical/horizontal reference signals and the pixel clock are also handled in this block. Digital Media System-on-Chip device TMS320DM357 available from Texas Instruments Incorporated of Dallas, Texas, U.S.A. is an example of a device implementing in a single chip (and associated circuitry) part or all of the image processor 13, part or all of a video compressor 14 and part or all of a transceiver 15. In addition to a lens or lens system, color filters may be placed between the imaging optics and the photosensor array 12 to achieve desired color manipulation.

The processing block 13 converts the raw data received from the photosensor array 12 (which can be any internal camera format, including before or after Bayer translation) into a color-corrected image in a standard image file format. The camera 10 further comprises a connector 19, and a transmitter or a transceiver 15 is disposed between the connector 19 and the image processor 13. The transceiver 15 may further includes isolation magnetic components (e.g. transformer-based), balancing, surge protection, and other suitable components required for providing a proper and standard interface via the connector 19. In the case of connecting to a wired medium, the connector 19 further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used in order to transmit and receive the appropriate level of signal to and from the wired medium. An equalizer may also be used in order to compensate for any frequency dependent characteristics of the wired medium.

Other image processing functions performed by the image processor 13 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The image processing may further include an algorithm for motion detection by comparing the current image with a reference image and counting the number of different pixels, where the image sensor 12 or the digital camera 10 are assumed to be in a fixed location and thus assumed to capture the same image. Since images are naturally differ due to factors such as varying lighting, camera flicker, and CCD dark currents, pre-processing is useful to reduce the number of false positive alarms. Algorithms that are more complex are necessary to detect motion when the camera itself is moving, or when the motion of a specific object must be detected in a field containing other movement that can be ignored. Further, the video or image processing may use, or be based on, the algorithms and techniques disclosed in the book entitled: "*Handbook of Image & Video Processing*", edited by Al Bovik, by Academic Press, ISBN: 0-12-119790-5, which is incorporated in its entirety for all purposes as if fully set forth herein.

A controller 18, located within the camera device or module 10, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 18 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The controller 18 controls and monitors the device operation, such as initialization, configuration, interface, and commands.

The digital camera device or module 10 requires power for its described functions such as for capturing, storing, manipulating, and transmitting the image. A dedicated power source may be used such as a battery or a dedicated connection to an external power source via connector 19. The power supply may contain a DC/DC converter. In another embodiment, the power supply is power fed from the AC power supply via AC plug and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply is integrated into a single device or circuit, in order to share common circuits. Further, the power supply may include a boost converter, such as a buck boost converter, charge pump, inverter and regulators as known in the art, as required for conversion of one form of electrical power to another desired form and voltage. While the power supply (either separated or integrated) can be an integral part and housed within the camera 10 enclosure, it may be enclosed as a separate housing connected via cable to the camera 10 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. The video compressor 14 (or video encoder) shown in FIG. 1 is disposed between the image processor 13 and the transceiver 15, allowing for compression of the digital video signal before its transmission over a cable or over-the-air. In some cases, compression may not be required, hence obviating the need for such compressor 14. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 11 is positioned to collect optical energy representative of a subject or a scenery, and to focus the optical energy onto the photosensor array 12. Commonly, the photosensor array 12 is a matrix of photosensitive pixels, which generates an electric signal that is a representative of the optical energy directed at the pixel by the imaging optics. The captured image (still images or as video data) may be stored in a memory 17, that may be volatile or non-volatile memory, and may be a built-in or removable media. Many stand-alone cameras use SD format, while a few use CompactFlash or other types. A LCD or TFT miniature display 16 typically serves as an Electronic ViewFinder (EVF) where the image captured by the lens is electronically displayed. The image on this display is used to assist in aiming the camera at the scene to be photographed. The sensor records the view through the lens; the view is then processed, and finally projected on a miniature display, which is viewable through the eyepiece. Electronic viewfinders are used in digital still cameras and in video cameras. Electronic viewfinders can show additional information, such as an image histogram, focal ratio, camera settings, battery charge, and remaining storage space. The display 16 may further display images captured earlier that are stored in the memory 17.

A digital camera is described in U.S. Pat. No. 6,897,891 to Itsukaichi entitled: "Computer System Using a Camera That is Capable of Inputting Moving Picture or Still Picture Data", in U.S. Patent Application Publication No. 2007/0195167 to Ishiyama entitled: "Image Distribution System, Image Distribution Server, and Image Distribution Method", in U.S. Patent Application Publication No. 2009/0102940 to Uchida entitled: "Imaging Device and imaging Control Method", and in U.S. Pat. No. 5,798,791 to Katayama et al. entitled: "Multieye Imaging Apparatus", which are all incorporated in their entirety for all purposes as if fully set forth herein.

A digital camera capable of being set to implement the function of a card reader or camera is disclosed in U.S. Patent Application Publication 2002/0101515 to Yoshida et al. entitled: "Digital camera and Method of Controlling Operation of Same", which is incorporated in its entirety for all purposes as if fully set forth herein. When the digital camera capable of being set to implement the function of a card reader or camera is connected to a computer via a USB, the computer is notified of the function to which the camera has been set. When the computer and the digital camera are connected by the USB, a device request is transmitted from the computer to the digital camera. Upon receiving the device request, the digital camera determines whether its operation at the time of the USB connection is that of a card reader or PC camera. Information indicating the result of the determination is incorporated in a device descriptor, which the digital camera then transmits to the computer. Based on the device descriptor, the computer detects the type of operation to which the digital camera has been set. The driver that supports this operation is loaded and the relevant commands are transmitted from the computer to the digital camera.

A prior art example of a portable electronic camera connectable to a computer is disclosed in U.S. Pat. No. 5,402,170 to Parulski et al. entitled: "Hand-Manipulated Electronic Camera Tethered to a Personal Computer", a digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein. A camera with human face detection means is disclosed in U.S. Pat. No. 6,940,545 to Ray et al., entitled: "Face Detecting Camera and Method", and in U.S. Patent Application Publication No. 2012/0249768 to Binder entitled: "System and Method for Control Based on Face or Hand Gesture Detection", which are both incorporated in their entirety for all purposes as if fully set forth herein. A digital still camera is described in an application Note No. AN1928/D (Revision 0-20 Feb. 2001) by Freescale Semiconductor, Inc. entitled: "Roadrunner—Modular digital still camera reference design", which is incorporated in its entirety for all purposes as if fully set forth herein.

An imaging method is disclosed in U.S. Pat. No. 8,773,509 to Pan entitled: "Imaging Device, Imaging Method and Recording Medium for Adjusting Imaging Conditions of Optical Systems Based on Viewpoint Images", which is incorporated in its entirety for all purposes as if fully set forth herein. The method includes: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image, and on the calculated amount of parallax; and adjusting imaging conditions of the reference optical system and the adjustment target optical system, based on image data in the imaging condition evaluation region corresponding to the first viewpoint image, at the set coordinates, and on image data in the imaging condition evaluation region corresponding to the second viewpoint image, at the calculated coordinates, and outputting the viewpoint images in the adjusted imaging conditions.

A portable hand-holdable digital camera is described in Patent Cooperation Treaty (PCT) International Publication Number WO 2012/013914 by Adam LOMAS entitled: "Portable Hand-Holdable Digital Camera with Range Finder", which is incorporated in its entirety for all purposes as if fully set forth herein. The digital camera comprises a camera housing having a display, a power button, a shoot button, a flash unit, and a battery compartment; capture means for capturing an image of an object in two dimensional form and for outputting the captured two-dimensional image to the display; first range finder means including a zoomable lens unit supported by the housing for focusing on an object and calculation means for calculating a first distance of the object from the lens unit and thus a distance between points on the captured two-dimensional image viewed and selected on the display; and second range finder means including an emitted-beam range finder on the housing for separately calculating a second distance of the object from the emitted-beam range finder and for outputting the second distance to the calculation means of the first range finder means for combination therewith to improve distance determination accuracy.

A camera having a pointing aid emitter is described in U.S. Pat. No. 5,546,156 to McIntyre entitled: "Camera with Pointing Aid", which is incorporated in its entirety for all purposes as if fully set forth herein. The pointing aid emitter produces a visible beam generally aligned with the optical axis of the camera objective lens such that the visible beam illuminates an object in the scene includes a scene measurement system that measures an aspect of the scene and an emitter controller that adjusts the output power of the pointing aid emitter in accordance with the scene aspect measured by the scene measurement system to reduce power consumption and reduce the risk of damage to the object that is illuminated by the beam. The scene measurement system of the camera preferably comprises an ambient light measuring system of a camera automatic exposure system and a distance measuring system of a camera automatic focus system. The emitter preferably comprises a laser light source that produces a visible laser beam.

A camera that receives light from a field of view, produces signals representative of the received light, and intermittently reads the signals to create a photographic image is described in U.S. Pat. No. 5,189,463 to Axelrod et al. entitled: "Camera Aiming Mechanism and Method", which is incorporated in its entirety for all purposes as if fully set forth herein. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator or other functionally similar component.

Image. A digital image is a numeric representation (normally binary) of a two-dimensional image. Depending on whether the image resolution is fixed, it may be of a vector or raster type. Raster images have a finite set of digital values, called picture elements or pixels. The digital image contains a fixed number of rows and columns of pixels, which are the smallest individual element in an image, holding quantized values that represent the brightness of a given color at any specific point. Typically, the pixels are stored in computer memory as a raster image or raster map, a two-dimensional array of small integers, where these values are commonly transmitted or stored in a compressed form. The raster images can be created by a variety of input devices and techniques, such as digital cameras, scanners, coordinate-measuring machines, seismographic profiling, airborne radar, and more. Common image formats include GIF, JPEG, and PNG.

The Graphics Interchange Format (better known by its acronym GIF) is a bitmap image format that supports up to 8 bits per pixel for each image, allowing a single image to reference its palette of up to 256 different colors chosen from the 24-bit RGB color space. It also supports animations and allows a separate palette of up to 256 colors for each frame. GIF images are compressed using the Lempel-Ziv-Welch (LZW) lossless data compression technique to reduce the file size without degrading the visual quality. The GIF (GRAPHICS INTERCHANGE FORMAT) Standard Version 89a is available from www.w3.org/Graphics/GIF/spec-gif89a.txt.

JPEG (seen most often with the .jpg or .jpeg filename extension) is a commonly used method of lossy compression for digital images, particularly for those images produced by digital photography. The degree of compression can be adjusted, allowing a selectable tradeoff between storage size and image quality and typically achieves 10:1 compression with little perceptible loss in image quality. JPEG/Exif is the most common image format used by digital cameras and other photographic image capture devices, along with JPEG/JFIF. The term "JPEG" is an acronym for the Joint Photographic Experts Group, which created the standard. JPEG/JFIF supports a maximum image size of 65535×65535 pixels-one to four gigapixels (1000 megapixels), depending on the aspect ratio (from panoramic 3:1 to square). JPEG is standardized under as ISO/IEC 10918-1:1994 entitled: "*Information technology—Digital compression and coding of continuous-tone still images: Requirements and guidelines*".

Portable Network Graphics (PNG) is a raster graphics file format that supports lossless data compression that was created as an improved replacement for Graphics Interchange Format (GIF), and is the commonly used lossless image compression format on the Internet. PNG supports palette-based images (with palettes of 24-bit RGB or 32-bit RGBA colors), grayscale images (with or without alpha channel), and full-color non-palette-based RGBimages (with or without alpha channel). PNG was designed for transferring images on the Internet, not for professional-quality print graphics, and, therefore, does not support non-RGB color spaces such as CMYK. PNG was published as an ISO/IEC15948:2004 standard entitled: "*Information technology—Computer graphics and image processing—Portable Network Graphics (PNG): Functional specification*".

Further, a digital image acquisition system that includes a portable apparatus for capturing digital images and a digital processing component for detecting, analyzing, invoking subsequent image captures, and informing the photographer regarding motion blur, and reducing the camera motion blur in an image captured by the apparatus, is described in U.S. Pat. No. 8,244,053 entitled: "Method and Apparatus for Initiating Subsequent Exposures Based on Determination of Motion Blurring Artifacts", and in U.S. Pat. No. 8,285,067 entitled: "Method Notifying Users Regarding Motion Artifacts Based on Image Analysis", both to Steinberg et al. which are both incorporated in their entirety for all purposes as if fully set forth herein.

Furthermore, a camera that has the release button, a timer, a memory and a control part, and the timer measures elapsed time after the depressing of the release button is released, used to prevent a shutter release moment to take a good picture from being missed by shortening time required for focusing when a release button is depressed again, is described in Japanese Patent Application Publication No. JP2008033200 to Hyo Hana entitled: "Camera", a through image that is read by a face detection processing circuit, and the face of an object is detected, and is detected again by the face detection processing circuit while half pressing a shutter button, used to provide an imaging apparatus capable of photographing a quickly moving child without fail, is described in a Japanese Patent Application Publication No. JP2007208922 to Uchida Akihiro entitled: "Imaging Apparatus", and a digital camera that executes image evaluation processing for automatically evaluating a photographic image (exposure condition evaluation, contrast evaluation, blur or focus blur evaluation), and used to enable an image photographing apparatus such as a digital camera to automatically correct a photographic image, is described in Japanese Patent Application Publication No. JP2006050494 to Kita Kazunori entitled: "Image Photographing Apparatus", which are all incorporated in their entirety for all purposes as if fully set forth herein.

Wireless. Any embodiment herein may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "*Wireless Technologies*" of the publication number 1-587005-001-3 by Cisco Systems, Inc. (7/99) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks-second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHz and 2.500 GHz, a 5.8 GHz band that includes the frequency band 5.725-5.875 GHz, a 24 GHz band that includes the frequency band 24.000-24.250 GHz, a 61 GHz band that includes the frequency band 61.000-61.500 GHz, a 122 GHz band that includes the frequency band 122.000-123.000 GHz, and a 244 GHz band that includes the frequency band 244.000-246.000 GHz.

ZigBee. ZigBee is a standard for a suite of high-level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus the average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirement, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "WiFi Technology" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 µs intervals. Two clock ticks make up a slot of 625 µs, and two slots make up a slot pair of 1250 µs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "Master Table of Contents & Compliance Requirements-Specification Volume 0", and in an article published 2012 in Sensors [ISSN 1424-8220] by Caries Gomez et al. [Sensors 2012, 12, 11734-11753; doi:10.3390/s120211734] entitled: "Overview and Evaluation of Bluetooth Low Energy: An Emerging Low-Power Wireless Technology", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

DSRC. Dedicated Short-Range Communication (DSRC) is a one-way or two-way short-range to medium-range wireless communication channels specifically designed for automotive use and a corresponding set of protocols and standards. DSRC is a two-way short-to-medium range wireless communications capability that permits very high data transmission critical in communications-based active safety applications. In Report and Order FCC-03-324, the Federal Communications Commission (FCC) allocated 75 MHz of spectrum in the 5.9 GHz band for use by intelligent transportations systems (ITS) vehicle safety and mobility applications. DSRC serves a short to medium range (1000 meters) communications service and supports both public safety and private operations in roadside-to-vehicle and vehicle-to-vehicle communication environments by providing very high data transfer rates where minimizing latency in the communication link and isolating relatively small communication zones is important. DSRC transportation applications for Public Safety and Traffic Management include Blind spot warnings, Forward collision warnings, Sudden braking ahead warnings, Do not pass warnings, Intersection collision avoidance and movement assistance, Approaching emergency vehicle warning, Vehicle safety inspection, Transit or emergency vehicle signal priority, Electronic parking and toll payments, Commercial vehicle clearance and safety inspections, In-vehicle signing, Rollover warning, and Traffic and travel condition data to improve traveler information and maintenance services.

The European standardization organization European Committee for Standardization (CEN), sometimes in co-operation with the International Organization for Standardization (ISO) developed some DSRC standards: EN 12253: 2004 Dedicated Short-Range Communication-Physical layer using microwave at 5.8 GHz (review), EN 12795:2002 Dedicated Short-Range Communication (DSRC)—DSRC Data link layer: Medium Access and Logical Link Control (review), EN 12834:2002 Dedicated Short-Range Communication-Application layer (review), EN 13372:2004 Dedicated Short-Range Communication (DSRC)— DSRC profiles for RTTT applications (review), and EN ISO 14906: 2004 Electronic Fee Collection-Application interface. An overview of the DSRC/WAVE technologies is described in a paper by Yunxin (Jeff) Li (Eveleigh, N S W 2015, Australia) downloaded from the Internet on July 2017, entitled: "*An Overview of the DSRC/WAVE Technology*", and the DSRC is further standardized as ARIB STD-T75 VERSION 1.0, published September 2001 by Association of Radio Industries and Businesses Kasumigaseki, Chiyoda-ku, Tokyo 100-0013, Japan, entitled: "*DEDICATED SHORT-RANGE COMMUNICATION SYSTEM-ARIB STANDARD Version 1.0*", which are both incorporated in their entirety for all purposes as if fully set forth herein.

IEEE 802.11p. The IEEE 802.11p standard is an example of DSRC and is a published standard entitled: "*Part 11: Wireless LAN Medium Access Control (MAC) and Physical Layer (PHY) Specifications Amendment 6: Wireless Access in Vehicular Environments*", that adds wireless access in vehicular environments (WAVE), a vehicular communication system, for supporting Intelligent Transportation Systems (ITS) applications. It includes data exchange between high-speed vehicles and between the vehicles and the roadside infrastructure, so called V2X communication, in the licensed ITS band of 5.9 GHz (5.85-5.925 GHz). IEEE 1609 is a higher layer standard based on the IEEE 802.11p, and is also the base of a European standard for vehicular communication known as ETSI ITS-G5.2. The Wireless Access in Vehicular Environments (WAVE/DSRC) architecture and services necessary for multi-channel DSRC/WAVE devices to communicate in a mobile vehicular environment is described in the family of IEEE 1609 standards, such as IEEE 1609.1-2006 Resource Manager, IEEE Std 1609.2 Security Services for Applications and Management Messages, IEEE Std 1609.3 Networking Services, IEEE Std 1609.4 Multi-Channel Operation IEEE Std 1609.5 Communications Manager, as well as IEEE P802.11p Amendment: "*Wireless Access in Vehicular Environments*".

As the communication link between the vehicles and the roadside infrastructure might exist for only a short amount of time, the IEEE 802.11p amendment defines a way to exchange data through that link without the need to establish a Basic Service Set (BSS), and thus, without the need to wait for the association and authentication procedures to complete before exchanging data. For that purpose, IEEE 802.11p enabled stations use the wildcard BSSID (a value of all 1s) in the header of the frames they exchange, and may start sending and receiving data frames as soon as they arrive on the communication channel. Because such stations are neither associated nor authenticated, the authentication and data confidentiality mechanisms provided by the IEEE 802.11 standard (and its amendments) cannot be used. These kinds of functionality must then be provided by higher network layers. IEEE 802.11p standard uses channels within the 75 MHz bandwidth in the 5.9 GHz band (5.850-5.925 GHz). This is half the bandwidth, or double the transmission time for a specific data symbol, as used in 802.11a. This allows the receiver to better cope with the characteristics of the radio channel in vehicular communications environments, e.g., the signal echoes reflected from other cars or houses.

Compression. Data compression, also known as source coding and bit-rate reduction, involves encoding information using fewer bits than the original representation. Compression can be either lossy, or lossless. Lossless compression reduces bits by identifying and eliminating statistical redundancy, so that no information is lost in lossless compression. Lossy compression reduces bits by identifying unnecessary information and removing it. The process of reducing the size of a data file is commonly referred to as a data compression. A compression is used to reduce resource usage, such as data storage space, or transmission capacity. Data compression is further described in a Carnegie Mellon University chapter entitled: "*Introduction to Data Compression*" by Guy E. Blelloch, dated Jan. 31, 2013, which is incorporated in its entirety for all purposes as if fully set forth herein.

In a scheme involving lossy data compression, some loss of information is acceptable. For example, dropping of a nonessential detail from a data can save storage space. Lossy data compression schemes may be informed by research on how people perceive the data involved. For example, the human eye is more sensitive to subtle variations in luminance than it is to variations in color. JPEG image compression works in part by rounding off nonessential bits of information. There is a corresponding trade-off between preserving information and reducing size. A number of popular compression formats exploit these perceptual differences, including those used in music files, images, and video.

Lossy image compression is commonly used in digital cameras, to increase storage capacities with minimal degradation of picture quality. Similarly, DVDs use the lossy MPEG-2 Video codec for video compression. In lossy audio compression, methods of psychoacoustics are used to remove non-audible (or less audible) components of the audio signal. Compression of human speech is often performed with even more specialized techniques, speech coding, or voice coding, is sometimes distinguished as a separate discipline from audio compression. Different audio and speech compression standards are listed under audio codecs. Voice compression is used in Internet telephony, for example, and audio compression is used for CD ripping and is decoded by audio player.

Lossless data compression algorithms usually exploit statistical redundancy to represent data more concisely without losing information, so that the process is reversible. Lossless compression is possible because most real-world data has statistical redundancy. The Lempel-Ziv (LZ) compression methods are among the most popular algorithms for lossless storage. DEFLATE is a variation on LZ optimized for decompression speed and compression ratio, and is used in PKZIP, Gzip and PNG. The LZW (Lempel-Ziv-Welch) method is commonly used in GIF images, and is described in IETF RFC 1951. The LZ methods use a table-based compression model where table entries are substituted for repeated strings of data. For most LZ methods, this table is generated dynamically from earlier data in the input. The table itself is often Huffman encoded (e.g., SHRI, LZX). Typical modern lossless compressors use probabilistic models, such as prediction by partial matching.

Lempel-Ziv-Welch (LZW) is an example of lossless data compression algorithm created by Abraham Lempel, Jacob Ziv, and Terry Welch. The algorithm is simple to implement, and has the potential for very high throughput in hardware implementations. It was the algorithm of the widely used Unix file compression utility compress, and is used in the GIF image format. The LZW and similar algorithms are described in U.S. Pat. No. 4,464,650 to Eastman et al. entitled: "Apparatus and Method for Compressing Data Signals and Restoring the Compressed Data Signals", in U.S. Pat. No. 4,814,746 to Miller et al. entitled: "Data Compression Method", and in U.S. Pat. No. 4,558,302 to Welch entitled: "High Speed Data Compression and Decompression Apparatus and Method", which are all incorporated in their entirety for all purposes as if fully set forth herein.

Image/video. Any content herein may consist of, be part of, or include, an image or a video content. A video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. An intraframe or interframe compression may be used, and the compression may be a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

Video. The term 'video' typically pertains to numerical or electrical representation or moving visual images, commonly referring to recording, reproducing, displaying, or broadcasting the moving visual images. Video, or a moving image in general, is created from a sequence of still images called frames, and by recording and then playing back frames in quick succession, an illusion of movement is created. Video can be edited by removing some frames and combining sequences of frames, called clips, together in a timeline. A Codec, short for 'coder-decoder', describes the method in which video data is encoded into a file and decoded when the file is played back. Most video is compressed during encoding, and so the terms codec and compressor are often used interchangeably. Codecs can be lossless or lossy, where lossless codecs are higher quality than lossy codecs, but produce larger file sizes. Transcoding is the process of converting from one codec to another. Common codecs include DV-PAL, HDV, H.264, MPEG-2, and MPEG-4. Digital video is further described in Adobe Digital Video Group publication updated and enhanced March 2004, entitled: "*A Digital Video Primer—An introduction to DV production, post-production, and delivery*", which is incorporated in its entirety for all purposes as if fully set forth herein.

Digital video data typically comprises a series of frames, including orthogonal bitmap digital images displayed in rapid succession at a constant rate, measured in Frames-Per-Second (FPS). In interlaced video each frame is composed of two halves of an image (referred to individually as fields, two consecutive fields compose a full frame), where the first half contains only the odd-numbered lines of a full frame, and the second half contains only the even-numbered lines.

Many types of video compression exist for serving digital video over the internet, and on optical disks. The file sizes of digital video used for professional editing are generally not practical for these purposes, and the video requires further compression with codecs such as Sorenson, H.264, and more recently, Apple ProRes especially for HD. Currently widely used formats for delivering video over the internet are MPEG-4, Quicktime, Flash, and Windows Media. Other PCM based formats include CCM 601 commonly used for broadcast stations, MPEG-4 popular for online distribution of large videos and video recorded to flash memory, MPEG-2 used for DVDs, Super-VCDs, and many broadcast television formats, MPEG-1 typically used for video CDs, and H.264 (also known as MPEG-4 Part 10 or AVC) commonly used for Blu-ray Discs and some broadcast television formats.

The term 'Standard Definition' (SD) describes the frame size of a video, typically having either a 4:3 or 16:9 frame aspect ratio. The SD PAL standard defines 4:3 frame size and 720×576 pixels, (or 768×576 if using square pixels), while SD web video commonly uses a frame size of 640×480 pixels. Standard-Definition Television (SDTV) refers to a television system that uses a resolution that is not considered to be either high-definition television (1080i, 1080p, 1440p, 4K UHDTV, and 8K UHD) or enhanced-definition television (EDTV 480p). The two common SDTV signal types are 576i, with 576 interlaced lines of resolution, derived from the European-developed PAL and SECAM systems, and 480i based on the American National Television System Committee NTSC system. In North America, digital SDTV is broadcast in the same 4:3 aspect ratio as NTSC signals with widescreen content being center cut. However, in other parts of the world that used the PAL or SECAM color systems, standard-definition television is now usually shown with a 16:9 aspect ratio. Standards that support digital SDTV broadcast include DVB, ATSC, and ISDB.

The term 'High-Definition' (HD) refers multiple video formats, which use different frame sizes, frame rates and scanning methods, offering higher resolution and quality than standard-definition. Generally, any video image with considerably more than 480 horizontal lines (North America) or 576 horizontal lines (Europe) is considered high-definition, where 720 scan lines is commonly the minimum. HD video uses a 16:9 frame aspect ratio and frame sizes that are 1280×720 pixels (used for HD television and HD web video), 1920×1080 pixels (referred to as full-HD or full-raster), or 1440×1080 pixels (full-HD with non-square pixels).

High definition video (prerecorded and broadcast) is defined by the number of lines in the vertical display resolution, such as 1,080 or 720 lines, in contrast to regular digital television (DTV) using 480 lines (upon which NTSC is based, 480 visible scanlines out of 525) or 576 lines (upon which PAL/SECAM are based, 576 visible scanlines out of 625). HD is further defined by the scanning system being progressive scanning (p) or interlaced scanning (i). Progressive scanning (p) redraws an image frame (all of its lines) when refreshing each image, for example 720p/1080p. Interlaced scanning (i) draws the image field every other line or "odd numbered" lines during the first image refresh operation, and then draws the remaining "even numbered" lines during a second refreshing, for example 1080i. Interlaced scanning yields greater image resolution if a subject is not moving, but loses up to half of the resolution, and suffers "combing" artifacts when a subject is moving. HD video is further defined by the number of frames (or fields) per second (Hz), where in Europe 50 Hz (60 Hz in the USA) television broadcasting system is common. The 720p60 format is 1,280×720 pixels, progressive encoding with 60 frames per second (60 Hz). The 1080i50/1080i60 format is 1920×1080 pixels, interlaced encoding with 50/60 fields, (50/60 Hz) per second.

Currently common HD modes are defined as 720p, 1080i, 1080p, and 1440p. Video mode 720p relates to frame size of 1,280×720 (W×H) pixels, 921,600 pixels per image, progressive scanning, and frame rates of 23.976, 24, 25, 29.97, 30, 50, 59.94, 60, or 72 Hz. Video mode 1080i relates to frame size of 1,920×1,080 (W×H) pixels, 2,073,600 pixels per image, interlaced scanning, and frame rates of 25 (50 fields/s), 29.97 (59.94 fields/s), or 30 (60 fields/s) Hz. Video mode 1080p relates to frame size of 1,920×1,080 (W×H) pixels, 2,073,600 pixels per image, progressive scanning, and frame rates of 24 (23.976), 25, 30 (29.97), 50, or 60 (59.94) Hz. Similarly, video mode 1440p relates to frame size of 2,560×1,440 (W×H) pixels, 3,686,400 pixels per image, progressive scanning, and frame rates of 24 (23.976), 25, 30 (29.97), 50, or 60 (59.94) Hz. Digital video standards are further described in a published 2009 primer by Tektronix® entitled: "*A Guide to Standard and High-Definition Digital Video Measurements*", which is incorporated in its entirety for all purposes as if fully set forth herein.

MPEG-4. MPEG-4 is a method of defining compression of audio and visual (AV) digital data, designated as a standard for a group of audio and video coding formats, and related technology by the ISO/IEC Moving Picture Experts Group (MPEG) (ISO/IEC JTC1/SC29/WG11) under the formal standard ISO/IEC 14496-'Coding of audio-visual objects'. Typical uses of MPEG-4 include compression of AV data for the web (streaming media) and CD distribution, voice (telephone, videophone) and broadcast television applications. MPEG-4 provides a series of technologies for developers, for various service-providers and for end users, as well as enabling developers to create multimedia objects possessing better abilities of adaptability and flexibility to improve the quality of such services and technologies as digital television, animation graphics, the World Wide Web and their extensions. Transporting of MPEG-4 is described in IETF RFC 3640, entitled: "RTP Payload Format for Transport of MPEG-4 Elementary Streams", which is incorporated in its entirety for all purposes as if fully set forth herein. The MPEG-4 format can perform various functions such as multiplexing and synchronizing data, associating with media objects for efficiently transporting via various network channels. MPEG-4 is further described in a white paper published 2005 by The MPEG Industry Forum (Document Number mp-in-40182), entitled: "*Understanding MPEG-4: Technologies, Advantages, and Markets-An MPEGIF White Paper*", which is incorporated in its entirety for all purposes as if fully set forth herein.

H.264. H.264 (a.k.a. MPEG-4 Part 10, or Advanced Video Coding (MPEG-4 AVC)) is a commonly used video compression format for the recording, compression, and distribution of video content. H.264/MPEG-4 AVC is a block-oriented motion-compensation-based video compression standard ITU-T H.264, developed by the ITU-T Video Coding Experts Group (VCEG) together with the ISO/IEC JTC1 Moving Picture Experts Group (MPEG), defined in the ISO/IEC MPEG-4 AVC standard ISO/IEC 14496-10-MPEG-4 Part 10-'Advanced Video Coding'. H.264 is widely used by streaming internet sources, such as videos from Vimeo, YouTube, and the iTunes Store, web software such as the Adobe Flash Player and Microsoft Silverlight, and also various HDTV broadcasts over terrestrial (ATSC, ISDB-T, DVB-T or DVB-T2), cable (DVB-C), and satellite (DVB-S and DVB-S2). H.264 is further described in a Standards Report published in IEEE Communications Magazine, August 2006, by Gary J. Sullivan of Microsoft Corporation, entitled: "*The H.264/MPEG4 Advanced Video Coding Standard and its Applications*", and further in IETF RFC 3984 entitled: "RTP Payload Format for H.264 Video", which are both incorporated in their entirety for all purposes as if fully set forth herein.

VCA. Video Content Analysis (VCA), also known as video content analytics, is the capability of automatically analyzing video to detect and determine temporal and spatial events. VCA deals with the extraction of metadata from raw video to be used as components for further processing in applications such as search, summarization, classification or event detection. The purpose of video content analysis is to provide extracted features and identification of structure that constitute building blocks for video retrieval, video similarity finding, summarization and navigation. Video content analysis transforms the audio and image stream into a set of semantically meaningful representations. The ultimate goal is to extract structural and semantic content automatically, without any human intervention, at least for limited types of video domains. Algorithms to perform content analysis include those for detecting objects in video, recognizing specific objects, persons, locations, detecting dynamic events in video, associating keywords with image regions or motion. VCA is used in a wide range of domains including entertainment, healthcare, retail, automotive, transport, home automation, flame and smoke detection, safety and security. The algorithms can be implemented as software on general purpose machines, or as hardware in specialized video processing units.

Many different functionalities can be implemented in VCA. Video Motion Detection is one of the simpler forms where motion is detected with regard to a fixed background scene. More advanced functionalities include video tracking and egomotion estimation. Based on the internal representation that VCA generates in the machine, it is possible to build other functionalities, such as identification, behavior analysis or other forms of situation awareness. VCA typically relies on good input video, so it is commonly combined with video enhancement technologies such as video denoising, image stabilization, unsharp masking and super-resolution. VCA is described in a publication entitled: "*An introduction to video content analysis-industry guide*" published August 2016 as Form No. 262 Issue 2 by British Security Industry Association (BSIA), and various content based retrieval systems are described in a paper entitled: "*Overview of Existing Content Based Video Retrieval Systems*" by Shripad A. Bhat, Omkar V. Sardessai, Preetesh P. Kunde and Sarvesh S. Shirodkar of the Department of Electronics and Telecommunication Engineering, Goa College of Engineering, Farmagudi Ponda Goa, published February 2014 in ISSN No: 2309-4893 International Journal of Advanced Engineering and Global Technology Vol-2, Issue-2, which are both incorporated in their entirety for all purposes as if fully set forth herein.

Egomotion. Eegomotion is defined as the 3D motion of a camera within an environment, and typically refers to estimating a camera's motion relative to a rigid scene. An example of egomotion estimation would be estimating a car's moving position relative to lines on the road or street signs being observed from the car itself. The estimation of egomotion is important in autonomous robot navigation applications. The goal of estimating the egomotion of a camera is to determine the 3D motion of that camera within the environment using a sequence of images taken by the camera. The process of estimating a camera's motion within an environment involves the use of visual odometry techniques on a sequence of images captured by the moving camera. This is typically done using feature detection to construct an optical flow from two image frames in a sequence generated from either single cameras or stereo cameras. Using stereo image pairs for each frame helps reduce error and provides additional depth and scale information.

Features are detected in the first frame, and then matched in the second frame. This information is then used to make the optical flow field for the detected features in those two images. The optical flow field illustrates how features diverge from a single point, the focus of expansion. The focus of expansion can be detected from the optical flow field, indicating the direction of the motion of the camera, and thus providing an estimate of the camera motion. There are other methods of extracting egomotion information from images as well, including a method that avoids feature detection and optical flow fields and directly uses the image intensities.

The computation of sensor motion from sets of displacement vectors obtained from consecutive pairs of images is described in a paper by Wilhelm Burger and Bir Bhanu entitled: "*Estimating 3-D Egomotion from Perspective Image Sequences*", published in IEEE TRANSACTIONS ON PATTERN ANALYSIS AND MACHINE INTELLIGENCE, VOL. 12, NO. 11, November 1990, which is incorporated in its entirety for all purposes as if fully set forth herein. The problem is investigated with emphasis on its application to autonomous robots and land vehicles. First, the effects of 3-D camera rotation and translation upon the observed image are discussed and in particular the concept of the Focus Of Expansion (FOE). It is shown that locating the FOE precisely is difficult when displacement vectors are corrupted by noise and errors. A more robust performance can be achieved by computing a 2-D region of possible FOE-locations (termed the fuzzy FOE) instead of looking for a single-point FOE. The shape of this FOE-region is an explicit indicator for the accuracy of the result. It has been shown elsewhere that given the fuzzy FOE, a number of powerful inferences about the 3-D scene structure and motion become possible. This paper concentrates on the aspects of computing the fuzzy FOE and shows the performance of a particular algorithm on real motion sequences taken from a moving autonomous land vehicle.

Robust methods for estimating camera egomotion in noisy, real-world monocular image sequences in the general case of unknown observer rotation and translation with two views and a small baseline are described in a paper by Andrew Jaegle, Stephen Phillips, and Kostas Daniilidis of the University of Pennsylvania, Philadelphia, PA, U.S.A. entitled: "*Fast, Robust, Continuous Monocular Egomotion Computation*", downloaded from the Internet on January 2019, which is incorporated in its entirety for all purposes as if fully set forth herein. This is a difficult problem because of the nonconvex cost function of the perspective camera motion equation and because of non-Gaussian noise arising from noisy optical flow estimates and scene non-rigidity. To address this problem, we introduce the expected residual likelihood method (ERL), which estimates confidence weights for noisy optical flow data using likelihood distributions of the residuals of the flow field under a range of counterfactual model parameters. We show that ERL is effective at identifying outliers and recovering appropriate confidence weights in many settings. We compare ERL to a novel formulation of the perspective camera motion equation using a lifted kernel, a recently proposed optimization framework for joint parameter and confidence weight estimation with good empirical properties. We incorporate these strategies into a motion estimation pipeline that avoids falling into local minima. We find that ERL outperforms the lifted kernel method and baseline monocular egomotion estimation strategies on the challenging KITTI dataset, while adding almost no runtime cost over baseline egomotion methods.

Six algorithms for computing egomotion from image velocities are described and evaluated in a paper by Tina Y. Tian, Carlo Tomasi, and David J. Heeger of the Department of Psychology and Computer Science Department of Stanford University, Stanford, CA 94305, entitled: "*Comparison of Approaches to Egomotion Computation*", downloaded from the Internet on January 2019, which is incorporated in its entirety for all purposes as if fully set forth herein. Various benchmarks are established for quantifying bias and sensitivity to noise, and for quantifying the convergence properties of those algorithms that require numerical search. The simulation results reveal some interesting and surprising results. First, it is often written in the literature that the egomotion problem is difficult because translation (e.g., along the X-axis) and rotation (e.g., about the Y-axis) produce similar image velocities. It was found, to the contrary, that the bias and sensitivity of our six algorithms are totally invariant with respect to the axis of rotation. Second, it is also believed by some that fixating helps to make the egomotion problem easier. It was found, to the contrary, that fixating does not help when the noise is independent of the image velocities. Fixation does help if the noise is proportional to speed, but this is only for the trivial reason that the speeds are slower under fixation. Third, it is widely believed that increasing the field of view will yield better performance, and it was found, to the contrary, that this is not necessarily true.

A system for estimating ego-motion of a moving camera for detection of independent moving objects in a scene is described in U.S. Pat. No. 10,089,549 to Cao et al. entitled: "Valley search method for estimating ego-motion of a camera from videos", which is incorporated in its entirety for all purposes as if fully set forth herein. For consecutive frames in a video captured by a moving camera, a first ego-translation estimate is determined between the consecutive frames from a first local minimum. From a second local minimum, a second ego-translation estimate is determined. If the first ego-translation estimate is equivalent to the second ego-translation estimate, the second ego-translation estimate is output as the optimal solution. Otherwise, a cost function is minimized to determine an optimal translation until the first ego-translation estimate is equivalent to the second ego-translation estimate, and an optimal solution is output. Ego-motion of the camera is estimated using the optimal solution, and independent moving objects are detected in the scene.

A system for compensating for ego-motion during video processing is described in U.S. Patent Application Publication No. 2018/0225833 to Cao et al. entitled: "Efficient hybrid method for ego-motion from videos captured using an aerial camera", which is incorporated in its entirety for all purposes as if fully set forth herein. The system generates an initial estimate of camera ego-motion of a moving camera for consecutive image frame pairs of a video of a scene using a projected correlation method, the camera configured to capture the video from a moving platform. An optimal estimation of camera ego-motion is generated using the initial estimate as an input to a valley search method or an alternate line search method. All independent moving objects are detected in the scene using the described hybrid method at superior performance compared to existing methods while saving computational cost.

A method for estimating ego motion of an object moving on a surface is described in U.S. Patent Application Publication No. 2015/0086078 to Sibiryakov entitled: "Method for estimating ego motion of an object", which is incorporated in its entirety for all purposes as if fully set forth herein. The method including generating at least two composite top view images of the surface on the basis of video frames provided by at least one onboard video camera of the object moving on the surface; performing a region matching between consecutive top view images to extract global motion parameters of the moving object; calculating the ego motion of the moving object from the extracted global motion parameters of the moving object.

Thermal camera. Thermal imaging is a method of improving visibility of objects in a dark environment by detecting the objects infrared radiation and creating an image based on that information. Thermal imaging, near-infrared illumination, and low-light imaging are the three most commonly used night vision technologies. Unlike the other two methods, thermal imaging works in environments without any ambient light Like near-infrared illumination, thermal imaging can penetrate obscurants such as smoke, fog and haze. All objects emit infrared energy (heat) as a function of their temperature, and the infrared energy emitted by an object is known as its heat signature. In general, the hotter an object is, the more radiation it emits. A thermal imager (also known as a thermal camera) is essentially a heat sensor that is capable of detecting tiny differences in temperature. The device collects the infrared radiation from objects in the scene and creates an electronic image based on information about the temperature differences. Because objects are rarely precisely the same temperature as other objects around them, a thermal camera can detect them and they will appear as distinct in a thermal image.

A thermal camera, also known as thermographic camera, is a device that forms a heat zone image using infrared radiation, similar to a common camera that forms an image using visible light. Instead of the 400-700 nanometer range of the visible light camera, infrared cameras operate in wavelengths as long as 14,000 nm (14 µm). A major difference from optical cameras is that the focusing lenses cannot be made of glass, as glass blocks long-wave infrared light. Typically the spectral range of thermal radiation is from 7 to 14 mkm. Special materials such as Germanium, calcium fluoride, crystalline silicon or newly developed special type of Chalcogenide glass must be used. Except for calcium fluoride all these materials are quite hard but have high refractive index (n=4 for germanium) which leads to very high Fresnel reflection from uncoated surfaces (up to more than 30%). For this reason most of the lenses for thermal cameras have antireflective coatings.

LIDAR. Light Detection And Ranging—LIDAR—also known as Lidar, LiDAR or LADAR (sometimes Light Imaging, Detection, And Ranging), is a surveying technology that measures distance by illuminating a target with a laser light. Lidar is popularly used as a technology to make high-resolution maps, with applications in geodesy, geomatics, archaeology, geography, geology, geomorphology, seismology, forestry, atmospheric physics, Airborne Laser Swath Mapping (ALSM) and laser altimetry, as well as laser scanning or 3D scanning, with terrestrial, airborne and mobile applications. Lidar typically uses ultraviolet, visible, or near infrared light to image objects. It can target a wide range of materials, including non-metallic objects, rocks, rain, chemical compounds, aerosols, clouds and even single molecules. A narrow laser-beam can map physical features with very high resolutions; for example, an aircraft can map terrain at 30 cm resolution or better. Wavelengths vary to suit the target: from about 10 micrometers to the UV (approximately 250 nm). Typically light is reflected via backscattering. Different types of scattering are used for different LIDAR applications: most commonly Rayleigh scattering, Mie scattering, Raman scattering, and fluorescence. Based on different kinds of backscattering, the LIDAR can be accordingly called Rayleigh Lidar, Mie Lidar, Raman Lidar, Na/Fe/K Fluorescence Lidar, and so on. Suitable combinations of wavelengths can allow for remote mapping of atmospheric contents by identifying wavelength-dependent changes in the intensity of the returned signal. Lidar has a wide range of applications, which can be divided into airborne and terrestrial types. These different types of applications require scanners with varying specifications based on the data's purpose, the size of the area to be captured, the range of measurement desired, the cost of equipment, and more.

Airborne LIDAR (also airborne laser scanning) is when a laser scanner, while attached to a plane during flight, creates a 3D point cloud model of the landscape. This is currently the most detailed and accurate method of creating digital elevation models, replacing photogrammetry. One major advantage in comparison with photogrammetry is the ability to filter out vegetation from the point cloud model to create a digital surface model where areas covered by vegetation can be visualized, including rivers, paths, cultural heritage sites, etc. Within the category of airborne LIDAR, there is sometimes a distinction made between high-altitude and low-altitude applications, but the main difference is a reduction in both accuracy and point density of data acquired at higher altitudes. Airborne LIDAR may also be used to create bathymetric models in shallow water. Drones are being used with laser scanners, as well as other remote sensors, as a more economical method to scan smaller areas. The possibility of drone remote sensing also eliminates any danger that crews of a manned aircraft may be subjected to in difficult terrain or remote areas. Airborne LIDAR sensors are used by companies in the remote sensing field. They can be used to create a DTM (Digital Terrain Model) or DEM (Digital Elevation Model); this is quite a common practice for larger areas as a plane can acquire 3-4 km wide swaths in a single flyover. Greater vertical accuracy of below 50 mm may be achieved with a lower flyover, even in forests, where it is able to give the height of the canopy as well as the ground elevation. Typically, a GNSS receiver configured over a georeferenced control point is needed to link the data in with the WGS (World Geodetic System).

Terrestrial applications of LIDAR (also terrestrial laser scanning) happen on the Earth's surface and may be stationary or mobile. Stationary terrestrial scanning is most common as a survey method, for example in conventional topography, monitoring, cultural heritage documentation and forensics. The 3D point clouds acquired from these types of scanners can be matched with digital images taken of the scanned area from the scanner's location to create realistic looking 3D models in a relatively short time when compared to other technologies. Each point in the point cloud is given the colour of the pixel from the image taken located at the same angle as the laser beam that created the point.

Mobile LIDAR (also mobile laser scanning) is when two or more scanners are attached to a moving vehicle to collect data along a path. These scanners are almost always paired with other kinds of equipment, including GNSS receivers and IMUs. One example application is surveying streets, where power lines, exact bridge heights, bordering trees, etc. all need to be taken into account. Instead of collecting each of these measurements individually in the field with a tachymeter, a 3D model from a point cloud can be created where all of the measurements needed can be made, depending on the quality of the data collected. This eliminates the problem of forgetting to take a measurement, so long as the model is available, reliable and has an appropriate level of accuracy.

Autonomous vehicles use LIDAR for obstacle detection and avoidance to navigate safely through environments. Cost map or point cloud outputs from the LIDAR sensor provide the necessary data for robot software to determine where potential obstacles exist in the environment and where the robot is in relation to those potential obstacles. LIDAR sensors are commonly used in robotics or vehicle automation. The very first generations of automotive adaptive cruise control systems used only LIDAR sensors.

LIDAR technology is being used in robotics for the perception of the environment as well as object classification. The ability of LIDAR technology to provide three-dimensional elevation maps of the terrain, high precision distance to the ground, and approach velocity can enable safe landing of robotic and manned vehicles with a high degree of precision. LiDAR has been used in the railroad industry to generate asset health reports for asset management and by departments of transportation to assess their road conditions. LIDAR is used in Adaptive Cruise Control (ACC) systems for automobiles. Systems use a LIDAR device mounted on the front of the vehicle, such as the bumper, to monitor the distance between the vehicle and any vehicle in front of it. In the event the vehicle in front slows down or is too close, the ACC applies the brakes to slow the vehicle. When the road ahead is clear, the ACC allows the vehicle to accelerate to a speed preset by the driver. Any apparatus herein, which may be any of the systems, devices, modules, or functionalities described herein, may be integrated with, or used for, Light Detection And Ranging (LIDAR), such as airborne, terrestrial, automotive, or mobile LIDAR.

Time-frequency Analysis. A time-frequency analysis comprises those techniques that study a signal in both the time and frequency domains simultaneously, using various time-frequency representations. Rather than viewing a 1-dimensional signal (a function, real or complex-valued, whose domain is the real line) and some transform (another function whose domain is the real line, obtained from the original via some transform), time-frequency analysis studies a two-dimensional signal—a function whose domain is the two-dimensional real plane, obtained from the signal via a time-frequency transform. Time-Frequency analysis is described in an article by Rolf Hut (September 2004) entitled: "*Time Frequency Analysis-a Comparison between cochlear modeling and existing methods*", and in an article by Franz Hlawatsch and Gerald Matz (of the Institute of Communications and radio-Frequency Engineering, Vienna University of Technology) entitled: "Time-Frequency Signal Processing: A Statistical Perspective", which are both incorporated in their entirety for all purposes as if fully set forth herein. One of the most basic forms of time-frequency analysis is the Short-Time Fourier Transform (STFT), but more sophisticated techniques have been developed, such as wavelets.

There are several different ways to formulate a valid time-frequency distribution function, resulting in several well-known time-frequency distributions, such as: Short-time Fourier transform (including the Gabor transform); Wavelet transform; Bilinear time-frequency distribution function (Wigner distribution function, or WDF); and Modified Wigner distribution function or Gabor-Wigner distribution function.

Pitch/Roll/Yaw (Spatial orientation and motion). Any device that can move in space, such as an aircraft in flight, is typically free to rotate in three dimensions: yaw—nose left or right about an axis running up and down; pitch—nose up or down about an axis running from wing to wing; and roll—rotation about an axis running from nose to tail, as pictorially shown in FIG. 2. The axes are alternatively designated as vertical, transverse, and longitudinal respectively. These axes move with the vehicle and rotate relative to the Earth along with the craft. These rotations are produced by torques (or moments) about the principal axes. On an aircraft, these are intentionally produced by means of moving control surfaces, which vary the distribution of the net aerodynamic force about the vehicle's center of gravity. Elevators (moving flaps on the horizontal tail) produce pitch, a rudder on the vertical tail produces yaw, and ailerons (flaps on the wings that move in opposing directions) produce roll. On a spacecraft, the moments are usually produced by a reaction control system consisting of small rocket thrusters used to apply asymmetrical thrust on the vehicle. Normal axis, or yaw axis, is an axis drawn from top to bottom, and perpendicular to the other two axes. Parallel to the fuselage station. Transverse axis, lateral axis, or pitch axis, is an axis running from the pilot's left to right in piloted aircraft, and parallel to the wings of a winged aircraft. Parallel to the buttock line. Longitudinal axis, or roll axis, is an axis drawn through the body of the vehicle from tail to nose in the normal direction of flight, or the direction the pilot faces. Parallel to the waterline.

Vertical axis (yaw)—The yaw axis has its origin at the center of gravity and is directed towards the bottom of the aircraft, perpendicular to the wings and to the fuselage reference line. Motion about this axis is called yaw. A positive yawing motion moves the nose of the aircraft to the right. The rudder is the primary control of yaw. Transverse axis (pitch)—The pitch axis (also called transverse or lateral axis) has its origin at the center of gravity and is directed to the right, parallel to a line drawn from wingtip to wingtip. Motion about this axis is called pitch. A positive pitching motion raises the nose of the aircraft and lowers the tail. The elevators are the primary control of pitch. Longitudinal axis (roll)—The roll axis (or longitudinal axis) has its origin at the center of gravity and is directed forward, parallel to the fuselage reference line. Motion about this axis is called roll. An angular displacement about this axis is called bank. A positive rolling motion lifts the left wing and lowers the right wing. The pilot rolls by increasing the lift on one wing and decreasing it on the other. This changes the bank angle. The ailerons are the primary control of bank.

PTZ. A Pan-Tilt-Zoom camera (PTZ camera) is a camera that is capable of remote directional and zoom control. PTZ is an abbreviation for pan, tilt and zoom and reflects the movement options of the camera. Other types of cameras are ePTZ or virtual pan-tilt-zoom (VPTZ) where a high-resolution camera digitally zooms and pans into portions of the image, with no physical camera movement. Ultra-low bandwidth surveillance streaming technologies use VPTZ to stream user-defined areas in higher quality without increasing overall bandwidth usage. Surveillance cameras of this type are often connected to a digital video recorder which records the full field of view in full quality. PTZ Cameras are commonly used in applications such as surveillance, video conferencing, live production, lecture capture and distance learning.

Recent PTZ cameras include a built-in firmware program that monitors the change of pixels generated by the video clip in the camera. When the pixels change due to movement within the camera's field of view, the camera can actually focus on the pixel variation and move the camera in an attempt to center the pixel fluctuation on the video chip. This results in the camera following movement. The program allows the camera to estimate the size of the object which is moving and distance of the movement from the camera. With this estimate, the camera can adjust the camera's optical lens, zooming in and out, in an attempt to stabilize the size of pixel fluctuation as a percentage of total viewing area. Once the movement exits the camera's field of view, the camera returns to a pre-programmed or "parked" position until it senses pixel variation and the process starts over again.

Level meter. A spirit level, bubble level or simply a level is an instrument designed to indicate whether a surface is horizontal (level) or vertical (plumb). Different types of spirit levels may be used by carpenters, stonemasons, bricklayers, other building trades workers, surveyors, millwrights and other metalworkers, and in some photographic or videographic work, and typically involves a sealed glass tube containing alcohol and an air bubble. Early spirit levels had very slightly curved glass vials with constant inner diameter at each viewing point. These vials are incompletely filled with a liquid, usually a colored spirit or alcohol, leaving a bubble in the tube. They have a slight upward curve, so that the bubble naturally rests in the center, the highest point. At slight inclinations, the bubble travels away from the marked center position. Where a spirit level must also be usable upside-down or on its side, the curved constant-diameter tube is replaced by an uncurved barrel-shaped tube with a slightly larger diameter in its middle.

Alcohols such as ethanol are often used rather than water, since alcohols have low viscosity and surface tension, which allows the bubble to travel the tube quickly and settle accurately with minimal interference with the glass surface. Alcohols also have a much wider liquid temperature range, and are less susceptible to break the vial as water could due to ice expansion. A colorant such as fluorescein, typically yellow or green, may be added to increase the visibility of the bubble. An extension of the spirit level is the bull's eye level: a circular, flat-bottomed device with the liquid under a slightly convex glass face with a circle at the center. It serves to level a surface across a plane, while the tubular level only does so in the direction of the tube.

Tilting level, dumpy level, or automatic level are terms used to refer to types of leveling instruments as used in surveying to measure height differences over larger distances. It has a spirit level mounted on a telescope (perhaps 30 power) with cross-hairs, itself mounted on a tripod. The observer reads height values off two graduated vertical rods, one 'behind' and one 'in front', to obtain the height difference between the ground points on which the rods are resting. Starting from a point with a known elevation and going cross country (successive points being perhaps 100 meters (328 ft) apart) height differences can be measured cumulatively over long distances and elevations can be calculated. Precise leveling is supposed to give the difference in elevation between two points one kilometer (0.62 miles) apart correct to within a few millimeters.

A traditional carpenter's spirit level looks like a short plank of wood and often has a wide body to ensure stability, and that the surface is being measured correctly. In the middle of the spirit level is a small window where the bubble and the tube is mounted. Two notches (or rings) designate where the bubble should be if the surface is levelled. Often an indicator for a 45 degree inclination is included. A line level is a level designed to hang on a builder's string line. The body of the level incorporates small hooks to allow it to attach and hang from the string line. The body is lightweight, so as not to weigh down the string line, it is also small in size as the string line in effect becomes the body; when the level is hung in the center of the string, each leg of the string line extends the levels plane.

Digital levels are increasingly common in replacing conventional spirit levels particularly in civil engineering applications, such as building construction and steel structure erection, for on-site angle alignment and leveling tasks. The industry practitioners often refer those leveling tool as "construction level", "heavy duty level", "inclinometer", or "protractor". These modern electronic levels are (i) capable of displaying precise numeric angles within 360° with high accuracy, (ii) digital readings can be read from a distance with clarity, (iii) affordable price resulted from mass adoption, providing advantages that the traditional levels are unable to match. Typically, these features enable steel beam frames under construction to be precisely aligned and levelled to the required orientation, which is vital to effectively ensure the stability, strength, and rigidity of steel structures on sites. Digital levels, embedded with angular MEMS technology effectively improve productivity and quality of many modern civil structures used by on-site constructions workers. Some of the recent models are even designed with waterproof IP65 and impact resistance features to meet the stringent working environment of the industry.

Inclinometer. An inclinometer or clinometer is an instrument for measuring angles of slope (or tilt), elevation or depression of an object with respect to gravity. It is also known as a tilt meter, tilt indicator, slope alert, slope gauge, gradient meter, gradiometer, level gauge, level meter, declinometer, and pitch & roll indicator. Clinometers measure both inclines (positive slopes, as seen by an observer looking upwards) and declines (negative slopes, as seen by an observer looking downward) using three different units of measure: degrees, percent, and topo. Astrolabes are inclinometers that were used for navigation and locating astronomical objects from ancient times to the Renaissance.

Tilt sensors and inclinometers generate an artificial horizon and measure angular tilt with respect to this horizon. They are used in cameras, aircraft flight controls, automobile security systems, and specialty switches and are also used for platform leveling, boom angle indication, and in other applications requiring measurement of tilt. Common implementations of tilt sensors and inclinometers are accelerometer, Liquid Capacitive, electrolytic, gas bubble in liquid, and pendulum.

Traditional spirit levels and pendulum-based electronic leveling instruments are usually constrained by only single-axis and narrow tilt measurement range. However, most precision leveling, angle measurement, alignment and surface flatness profiling tasks essentially involve a 2-dimensional surface plane angle rather than two independent orthogonal single-axis objects. 2-Axis inclinometers that are built with MEMS tilt sensors provides simultaneous 2-dimensional angle readings of a surface plane tangent to earth datum.

2-Axis Digital Inclinometer. 2-axis MEMS technology enables simultaneous two-dimensional (X-Y plane) tilt angles (i.e. pitch & roll) measurement, eliminates tedious trial-and-error (i.e. going back-and-forth) experienced when using single-axis levels to adjust machine footings to attain a precise leveling position. 2-axis MEMS inclinometers can be digitally compensated and precisely calibrated for non-linearity for operating temperature variation resulting in higher angular accuracy over wider angular measurement range. 2-axis MEMS inclinometer with built-in accelerometer sensors may generate numerical data tabulated in the form of vibration profiles that enable machine installer to track and assess alignment quality in real-time and verify structure positional stability by comparing machine's leveling profiles before and after setting up.

Gyroscope. A gyroscope is a device commonly used for measuring or maintaining orientation and angular velocity. It is typically based on a spinning wheel or disc in which the axis of rotation is free to assume any orientation by itself. When rotating, the orientation of this axis is unaffected by tilting or rotation of the mounting, according to the conservation of angular momentum. Gyroscopes based on other operating principles also exist, such as the microchip-packaged MEMS gyroscopes found in electronic devices, solid-state ring lasers, fibre-optic gyroscopes, and the extremely sensitive quantum gyroscope. MEMS gyroscopes are popular in some consumer electronics, such as smartphones.

A gyroscope is typically a wheel mounted in two or three gimbals, which are pivoted supports that allow the rotation of the wheel about a single axis. A set of three gimbals, one mounted on the other with orthogonal pivot axes, may be used to allow a wheel mounted on the innermost gimbal to have an orientation remaining independent of the orientation, in space, of its support. In the case of a gyroscope with two gimbals, the outer gimbal, which is the gyroscope frame, is mounted so as to pivot about an axis in its own plane determined by the support. This outer gimbal possesses one degree of rotational freedom and its axis possesses none. The inner gimbal is mounted in the gyroscope frame (outer gimbal) so as to pivot about an axis in its own plane that is always perpendicular to the pivotal axis of the gyroscope frame (outer gimbal). This inner gimbal has two degrees of rotational freedom. The axle of the spinning wheel defines the spin axis. The rotor is constrained to spin about an axis, which is always perpendicular to the axis of the inner gimbal. So the rotor possesses three degrees of rotational freedom and its axis possesses two. The wheel responds to a force applied to the input axis by a reaction force to the output axis. A gyroscope flywheel will roll or resist about the output axis depending upon whether the output gimbals are of a free or fixed configuration. Examples of some free-output-gimbal devices would be the attitude reference gyroscopes used to sense or measure the pitch, roll and yaw attitude angles in a spacecraft or aircraft.

Accelerometer. An accelerometer is a device that measures proper acceleration, typically being the acceleration (or rate of change of velocity) of a body in its own instantaneous rest frame. Single- and multi-axis models of accelerometer are available to detect magnitude and direction of the proper acceleration, as a vector quantity, and can be used to sense orientation (because direction of weight changes), coordinate acceleration, vibration, shock, and falling in a resistive medium (a case where the proper acceleration changes, since it starts at zero, then increases). Micro-machined Microelectromechanical Systems (MEMS) accelerometers are increasingly present in portable electronic devices and video game controllers, to detect the position of the device or provide for game input. Conceptually, an accelerometer behaves as a damped mass on a spring. When the accelerometer experiences an acceleration, the mass is displaced to the point that the spring is able to accelerate the mass at the same rate as the casing. The displacement is then measured to give the acceleration.

In commercial devices, piezoelectric, piezoresistive and capacitive components are commonly used to convert the mechanical motion into an electrical signal. Piezoelectric accelerometers rely on piezoceramics (e.g. lead zirconate titanate) or single crystals (e.g. quartz, tourmaline). They are unmatched in terms of their upper frequency range, low packaged weight and high temperature range. Piezoresistive accelerometers are preferred in high shock applications. Capacitive accelerometers typically use a silicon micro-machined sensing element. Their performance is superior in the low frequency range and they can be operated in servo mode to achieve high stability and linearity. Modern accelerometers are often small micro electro-mechanical systems (MEMS), and are indeed the simplest MEMS devices possible, consisting of little more than a cantilever beam with a proof mass (also known as seismic mass). Damping results from the residual gas sealed in the device. As long as the Q-factor is not too low, damping does not result in a lower sensitivity. Most micromechanical accelerometers operate in-plane, that is, they are designed to be sensitive only to a direction in the plane of the die. By integrating two devices perpendicularly on a single die a two-axis accelerometer can be made. By adding another out-of-plane device, three axes can be measured. Such a combination may have much lower misalignment error than three discrete models combined after packaging.

A laser accelerometer comprises a frame having three orthogonal input axes and multiple proof masses, each proof mass having a predetermined blanking surface. A flexible beam supports each proof mass. The flexible beam permits movement of the proof mass on the input axis. A laser light source provides a light ray. The laser source is characterized to have a transverse field characteristic having a central null intensity region. A mirror transmits a ray of light to a detector. The detector is positioned to be centered to the light ray and responds to the transmitted light ray intensity to provide an intensity signal. The intensity signal is characterized to have a magnitude related to the intensity of the transmitted light ray. The proof mass blanking surface is centrally positioned within and normal to the light ray null intensity region to provide increased blanking of the light ray in response to transverse movement of the mass on the input axis. The proof mass deflects the flexible beam and moves the blanking surface in a direction transverse to the light ray to partially blank the light beam in response to acceleration in the direction of the input axis. A control responds to the intensity signal to apply a restoring force to restore the proof mass to a central position and provides an output signal proportional to the restoring force.

A motion sensor may include one or more accelerometers, which measures the absolute acceleration or the acceleration relative to freefall. For example, one single-axis accelerometer per axis may be used, requiring three such accelerometers for three-axis sensing. The motion sensor may be a single or multi-axis sensor, detecting the magnitude and direction of the acceleration as a vector quantity, and thus can be used to sense orientation, acceleration, vibration, shock and falling. The motion sensor output may be analog or digital signals, representing the measured values. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., Quartz, Tourmaline). A piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical electrical system) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, 'MEMS motion sensor 3-axis-±2 g/±8 g smart digital output "piccolo" accelerometer', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, NH, USA, described in the data-sheet 'DATASHEET SQ-SEN-200 Omnidirectional Tilt and Vibration Sensor' Updated 2009 Aug. 3, which is incorporated in its entirety for all purposes as if fully set forth herein. Other types of motion sensors may be equally used, such as devices based on piezoelectric, piezo-resistive, and capacitive components, to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

IMU. The Inertial Measurement Unity (IMU) is an integrated sensor package that combines multiple accelerometers and gyros to produce a three dimensional measurement of both specific force and angular rate, with respect to an inertial reference frame, as for example the Earth-Centered Inertial (ECI) reference frame. Specific force is a measure of acceleration relative to free-fall. Subtracting the gravitational acceleration results in a measurement of actual coordinate acceleration. Angular rate is a measure of rate of rotation. Typically, IMU includes the combination of only a 3-axis accelerometer combined with a 3-axis gyro. An onboard processor, memory, and temperature sensor may be included to provide a digital interface, unit conversion and to apply a sensor calibration model. An IMU may include one or more motion sensors.

An Inertial Measurement Unit (IMU) further measures and reports a body's specific force, angular rate, and sometimes the magnetic field surrounding the body, using a combination of accelerometers and gyroscopes, sometimes also magnetometers. IMUs are typically used to maneuver aircraft, including unmanned aerial vehicles (UAVs), among many others, and spacecraft, including satellites and landers. The IMU is the main component of inertial navigation systems used in aircraft, spacecraft, watercraft, drones, UAV and guided missiles among others. In this capacity, the data collected from the IMU's sensors allows a computer to track a craft's position, using a method known as dead reckoning.

An inertial measurement unit works by detecting the current rate of acceleration using one or more accelerometers, and detects changes in rotational attributes like pitch, roll and yaw using one or more gyroscopes. Typical IMU also includes a magnetometer, mostly to assist calibration against orientation drift. Inertial navigation systems contain IMUs that have angular and linear accelerometers (for changes in position); some IMUs include a gyroscopic element (for maintaining an absolute angular reference). Angular accelerometers measure how the vehicle is rotating in space. Generally, there is at least one sensor for each of the three axes: pitch (nose up and down), yaw (nose left and right) and roll (clockwise or counter-clockwise from the cockpit). Linear accelerometers measure non-gravitational accelerations of the vehicle. Since it can move in three axes (up & down, left & right, forward & back), there is a linear accelerometer for each axis. The three gyroscopes are commonly placed in a similar orthogonal pattern, measuring rotational position in reference to an arbitrarily chosen coordinate system. A computer continually calculates the vehicle's current position. First, for each of the six degrees of freedom (x,y,z, and Ox, Oy, and Oz), it integrates over time the sensed acceleration, together with an estimate of gravity, to calculate the current velocity. Then it integrates the velocity to calculate the current position.

An example for an IMU is a module Part Number LSM9DS1 available from STMicroelectronics NV headquartered in Geneva, Switzerland and described in a datasheet published March 2015 and entitled: "LSM9DS1-iNEMO inertial module: 3D accelerometer, 3D gyroscope, 3D magnetometer", which is incorporated in its entirety for all purposes as if fully set forth herein. Another example for an IMU is unit Part Number STIM300 available from Sensonor AS, headquartered in Horten, Norway, and is described in a datasheet dated October 2015 [TS1524 rev. 20] entitled: "ButterflyGyro™-STIM300 Intertia Measurement Unit", which is incorporated in its entirety for all purposes as if fully set forth herein. Using IMU for human motion or positioning is described in a Master's Thesis by Martin Veskrna of Masaryk University, Faculty of Informatics dated 2013, entitled: "*Positioning system for small devices using principles of inertial navigation system*", in an article by Sam Naghshineh, Golafsoun Ameri, Mazdak Zereshki & Dr. S. Krishnan, Dr. M. Abdoli-Eramaki (downloaded from the Internet 3/2016) entitled: "*Human Motion capture using Tri-Axial accelerometers*", and in a paper by Xiaoping Yun et al. published 2007 IEEE International Conference on Robotics and Automation (Rome, Italy, 10-14 Apr. 2007) entitled: "*Self-Contained Position Tracking of Human Movement Using Small Inertial/Magnetic Sensor Module*", which are all incorporated in their entirety for all purposes as if fully set forth herein.

Streaming. Streaming media is multimedia that is constantly received by and presented to an end-user while being delivered by a provider. A client media player can begin playing the data (such as a movie) before the entire file has been transmitted. Distinguishing delivery method from the media distributed applies specifically to telecommunications networks, as most of the delivery systems are either inherently streaming (e.g., radio, television), or inherently non-streaming (e.g., books, video cassettes, audio CDs). Live streaming refers to content delivered live over the Internet, and requires a form of source media (e.g. a video camera, an audio interface, screen capture software), an encoder to digitize the content, a media publisher, and a content delivery network to distribute and deliver the content. Streaming content may be according to, compatible with, or based on, IETF RFC 2550 entitled: "*RTP: A Transport Protocol for Real-Time Applications*", IETF RFC 4587 entitled: "*RTP Payload Format for H.261 Video Streams*", or IETF RFC 2326 entitled: "*Real Time Streaming Protocol (RTSP)*", which are all incorporated in their entirety for all purposes as if fully set forth herein. Video streaming is further described in a published 2002 paper by Hewlett-Packard Company (HP®) authored by John G. Apostolopoulos, Wai-Tian, and Susie J. Wee and entitled: "*Video Streaming: Concepts, Algorithms, and Systems*", which is incorporated in its entirety for all purposes as if fully set forth herein.

An audio stream may be compressed using an audio codec such as MP3, Vorbis or AAC, and a video stream may be compressed using a video codec such as H.264 or VP8. Encoded audio and video streams may be assembled in a container bitstream such as MP4, FLV, WebM, ASF or ISMA. The bitstream is typically delivered from a streaming server to a streaming client using a transport protocol, such as MMS or RTP. Newer technologies such as HLS, Microsoft's Smooth Streaming, Adobe's HDS and finally MPEG-DASH have emerged to enable adaptive bitrate (ABR) streaming over HTTP as an alternative to using proprietary transport protocols. The streaming client may interact with the streaming server using a control protocol, such as MMS or RTSP.

Streaming media may use Datagram protocols, such as the User Datagram Protocol (UDP), where the media stream is sent as a series of small packets. However, there is no mechanism within the protocol to guarantee delivery, so if data is lost, the stream may suffer a dropout. Other protocols may be used, such as the Real-time Streaming Protocol (RTSP), Real-time Transport Protocol (RTP) and the Real-time Transport Control Protocol (RTCP). RTSP runs over a variety of transport protocols, while the latter two typically use UDP. Another approach is HTTP adaptive bitrate streaming that is based on HTTP progressive download, designed to incorporate both the advantages of using a standard web protocol, and the ability to be used for streaming even live content is adaptive bitrate streaming. Reliable protocols, such as the Transmission Control Protocol (TCP), guarantee correct delivery of each bit in the media stream, using a system of timeouts and retries, which makes them more complex to implement. Unicast protocols send a separate copy of the media stream from the server to each recipient, and are commonly used for most Internet connections.

Multicasting broadcasts the same copy of the multimedia over the entire network to a group of clients, and may use multicast protocols that were developed to reduce the server/ network loads resulting from duplicate data streams that occur when many recipients receive unicast content streams, independently. These protocols send a single stream from the source to a group of recipients, and depending on the network infrastructure and type, the multicast transmission may or may not be feasible. IP Multicast provides the capability to send a single media stream to a group of recipients on a computer network, and a multicast protocol, usually Internet Group Management Protocol, is used to manage delivery of multicast streams to the groups of recipients on a LAN. Peer-to-peer (P2P) protocols arrange for prerecorded streams to be sent between computers, thus preventing the server and its network connections from becoming a bottleneck. HTTP Streaming—(a.k.a. Progressive Download; Streaming) allows for that while streaming content is being downloaded, users can interact with, and/or view it. VOD streaming is further described in a NETFLIX® presentation dated May 2013 by David Ronca, entitled: "A Brief History of Netflix Streaming", which is incorporated in its entirety for all purposes as if fully set forth herein.

Media streaming techniques are further described in a white paper published October 2005 by Envivio® and authored by Alex MacAulay, Boris Felts, and Yuval Fisher, entitled: "WHITEPAPER-IP Streaming of MPEG-4" Native RTP vs MPEG-2 Transport Stream", in an overview published 2014 by Apple Inc.-Developer, entitled: "HTTP Live Streaming Overview", and in a paper by Thomas Stockhammer of Qualcomm Incorporated entitled: "Dynamic Adaptive Streaming over HTTP-Design Principles and Standards", in a Microsoft Corporation published March 2009 paper authored by Alex Zambelli and entitled: "IIS Smooth Streaming Technical Overview", in an article by Liang Chen, Yipeng Zhou, and Dah Ming Chiu dated 10 Apr. 2014 entitled: "Smart Streaming for Online Video Services", in Celtic-Plus publication (downloaded February 2016 from the Internet) referred to as 'H2B2VS D1 1 1 State-of-the-art V2.0.docx' entitled: "H2B2VS D1.1.1 Report on the state of the art technologies for hybrid distribution of TV services", and in a technology brief by Apple Computer, Inc. published March 2005 (Document No. L308280A) entitled: "Quick-Time Streaming", which are all incorporated in their entirety for all purposes as if fully set forth herein.

DSP. A Digital Signal Processor (DSP) is a specialized microprocessor (or a SIP block), with its architecture optimized for the operational needs of digital signal processing, serving the goal of DSPs is usually to measure, filter and/or compress continuous real-world analog signals. Most general-purpose microprocessors can also execute digital signal processing algorithms successfully, but dedicated DSPs usually have better power efficiency thus they are more suitable in portable devices such as mobile phones because of power consumption constraints. DSPs often use special memory architectures that are able to fetch multiple data and/or instructions at the same time. Digital signal processing algorithms typically require a large number of mathematical operations to be performed quickly and repeatedly on a series of data samples. Signals (perhaps from audio or video sensors) are constantly converted from analog to digital, manipulated digitally, and then converted back to analog form. Many DSP applications have constraints on latency; that is, for the system to work, the DSP operation must be completed within some fixed time, and deferred (or batch) processing is not viable. A specialized digital signal processor, however, will tend to provide a lower-cost solution, with better performance, lower latency, and no requirements for specialized cooling or large batteries. The architecture of a digital signal processor is optimized specifically for digital signal processing. Most also support some of the features as an applications processor or microcontroller, since signal processing is rarely the only task of a system. Some useful features for optimizing DSP algorithms are outlined below.

Hardware features visible through DSP instruction sets commonly include hardware modulo addressing, allowing circular buffers to be implemented without having to constantly test for wrapping; a memory architecture designed for streaming data, using DMA extensively and expecting code to be written to know about cache hierarchies and the associated delays; driving multiple arithmetic units may require memory architectures to support several accesses per instruction cycle; separate program and data memories (Harvard architecture), and sometimes concurrent access on multiple data buses; and special SIMD (single instruction, multiple data) operations. Digital signal processing is further described in a book by John G. Proakis and Dimitris G. Manolakis, published 1996 by Prentice-Hall Inc. [ISBN 0-13-394338-9] entitled: "Third Edition-DIGITAL SIGNAL PROCESSING-Principles, Algorithms, and Application", and in a book by Steven W. Smith entitled: "The Scientist and Engineer's Guide to-Digital Signal Processing-Second Edition", published by California Technical Publishing [ISBN 0-9960176-7-6], which are both incorporated in their entirety for all purposes as if fully set forth herein.

Convolution and correlation. A convolution is a mathematical operation on two signals or functions (f and g) to produce a third function (or signal) that expresses how the shape of one is modified by the other. The term convolution refers to both the result function and to the process of computing it. For real-valued functions, of a continuous or discrete variable, it differs from cross-correlation only in that either f (x) or g(x) is reflected about the y-axis; thus it is a cross-correlation of f(x) and g(−x), or f (−x) and g(x). For continuous functions, the cross-correlation operator is the adjoint of the convolution operator. Computing the inverse of the convolution operation is known as deconvolution. Correlation is a measure of similarity between two signals. There are several correlation coefficients for measuring the degree of correlation. The most common of these is the Pearson correlation coefficient, which is sensitive only to a linear relationship between two variables (which may be present even when one variable is a nonlinear function of the other). Other correlation coefficients have been developed to be more robust than the Pearson correlation, and are more sensitive to nonlinear relationships. Correlation operation is typically carried out similar to convolution, except for left-for-right flip of one signal, and is commonly used to optimally detect a known known waveform in a signal.

Cross-correlation is a measure of similarity of two series as a function of the displacement of one relative to the other, also known as a sliding dot product or sliding inner-product. It is commonly used for searching a long signal for a shorter, known feature, and has applications in pattern recognition, single particle analysis, electron tomography, averaging, cryptanalysis, and neurophysiology. The cross-correlation is similar in nature to the convolution of two functions. In an autocorrelation, which is the cross-correlation of a signal with itself, there will always be a peak at a lag of zero, and its size will be the signal energy.

Convolution and correlation are described in Chapter 2 entitled: "Convolution and Correlation" of the book "Analog and Digital Signals and Systems" by Yarlagadda, R. K. R. published 2010 by Springer Science+Business Media [ISBN: 978-1-4419-0033-3], which is incorporated in its entirety for all purposes as if fully set forth herein. A practical example of cross-correlation function is the function 'xcorr' of MATLAB provided by The MathWorks®, Inc. and described in the webpage https://www.mathworks.com/help/signal/ref/xcorr.html downloaded January 2019, which is incorporated in its entirety for all purposes as if fully set forth herein.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, California, U.S.A. and described in iPhone 6 technical specification (retrieved 10/2015 from www.apple.com/iphone-6/specs/), and in a User Guide dated 2015 (019-00155/2015-06) by Apple Inc. entitled: "iPhone User Guide For iOS 8.4 Software", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), 03/2015 (Rev. 1.0) entitled: "SM-G925F SM-G925FQ SM-G925I User Manual" and having features and specification described in "Galaxy S6 Edge—Technical Specification" (retrieved 10/2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or another mobile device. Modem mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently popular mobile OSs are Android, Symbian, Apple iOS, BlackBerry, MeeGo, Windows Phone, and Bada. Mobile devices with mobile communications capabilities (e.g. smartphones) typically contain two mobile operating systems—a main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "*IOS Tutorial*", downloaded from tutorialspoint.com on July 2014, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an application Note No. RES05B00008-0100/Rec. 1.00 published January 2010 by Renesas Technology Corp. entitled: "R8C Family-General RTOS Concepts", in JAJA Technology Review article published February 2007 [1535-5535/ $32.00] by The Association for Laboratory Automation [doi:10.1016/j.jala.2006.10.016] entitled: "An Overview of Real-Time Operating Systems", and in Chapter 2 entitled: "Basic Concepts of Real Time Operating Systems" of a book published 2009 [ISBN-978-1-4020-9435-4] by Springer Science+Business Media B.V. entitled: "Hardware-Dependent Software-Principles and Practice", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is 1/1000 of a second to 1/100 of a second, via an interrupt from a hardware timer, but this interval is often changed to suit a particular application. FreeRTOS™ is described in a paper by Nicolas Melot (downloaded July 2015) entitled: "Study of an operating system: FreeRTOS— Operating systems for embedded devices", in a paper (dated Sep. 23, 2013) by Dr. Richard Wall entitled: "Carebot PIC32 MX7ck implementation of Free RTOS", FreeRTOS™ modules are described in web pages entitled: "FreeRTOS™ Modules" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "An Analysis and Description of the Inner Workings of the FreeRTOS Kernel", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32- and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/ OS, stylized as μC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases, the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts that use buoyancy to float in the air in much the same way that ships float on the water. They are characterized by one or more large gasbags or canopies filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and manpower have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcrafts, such as helicopters, have a powered rotary wing or rotor, where the rotor disc can be angled slightly forward so that a proportion of its lift is directed forwards. The rotor may, similar to a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

The lighting system of a motor vehicle consists of lighting and signaling devices mounted or integrated to the front, rear, sides, and in some cases, the top of a motor vehicle. This lights the roadway for the driver and increases the conspicuity of the vehicle, allowing other drivers and pedestrians to see a vehicle's presence, position, size, direction of travel, and the driver's intentions regarding direction and speed of travel. Emergency vehicles usually carry distinctive lighting equipment to warn drivers and indicate priority of movement in traffic. A headlamp is a lamp attached to the front of a vehicle to light the road ahead. A chassis consists of an internal framework that supports a manmade object in its construction and use. An example of a chassis is the underpart of a motor vehicle, consisting of the frame (on which the body is mounted).

Autonomous car. An autonomous car (also known as a driverless car, self-driving car, or robotic car) is a vehicle that is capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. Among the potential benefits of autonomous cars is a significant reduction in traffic collisions; the resulting injuries; and related costs, including a lower need for insurance. Autonomous cars are also predicted to offer major increases in traffic flow; enhanced mobility for children, the elderly, disabled and poor people; the relief of travelers from driving and navigation chores; lower fuel consumption; significantly reduced needs for parking space in cities; a reduction in crime; and the facilitation of different business models for mobility as a service, especially those involved in the sharing economy.

Modern self-driving cars generally use Bayesian Simultaneous Localization And Mapping (SLAM) algorithms, which fuse data from multiple sensors and an off-line map into current location estimates and map updates. SLAM with Detection and Tracking of other Moving Objects (DATMO), which also handles things such as cars and pedestrians, is a variant being developed by research at Google. Simpler systems may use roadside Real-Time Locating System (RTLS) beacon systems to aid localization. Typical sensors include LIDAR and stereo vision, GPS and IMU. Visual object recognition uses machine vision including neural networks.

The term 'Dynamic driving task' includes the operational (steering, braking, accelerating, monitoring the vehicle and roadway) and tactical (responding to events, determining when to change lanes, turn, use signals, etc.) aspects of the driving task, but not the strategic (determining destinations and waypoints) aspect of the driving task. The term 'Driving mode' refers to a type of driving scenario with characteristic dynamic driving task requirements (e.g., expressway merging, high speed, cruising, low speed traffic jam, closed-campus operations, etc.). The term 'Request to intervene' refers to notification by the automated driving system to a human driver that s/he should promptly begin or resume performance of the dynamic driving task.

The SAE International standard J3016, entitled: "*Taxonomy and Definitions for Terms Related to On-Road Motor Vehicle Automated Driving Systems*" [Revised 2016-09], which is incorporated in its entirety for all purposes as if fully set forth herein, describes six different levels (ranging from none to fully automated systems), based on the amount of driver intervention and attentiveness required, rather than the vehicle capabilities. The levels are further described in a table 20a in FIG. 2a. Level 0 refers to automated system issues warnings but has no vehicle control, while Level 1 (also referred to as "hands on") refers to driver and automated system that shares control over the vehicle. An example would be Adaptive Cruise Control (ACC) where the driver controls steering and the automated system controls speed. Using Parking Assistance, steering is automated while speed is manual. The driver must be ready to retake full control at any time. Lane Keeping Assistance (LKA) Type II is a further example of level 1 self-driving.

In Level 2 (also referred to as "hands off"), the automated system takes full control of the vehicle (accelerating, braking, and steering). The driver must monitor the driving and be prepared to immediately intervene at any time if the automated system fails to respond properly. In Level 3 (also referred to as "eyes off"), the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. A key distinction is between level 2, where the human driver performs part of the dynamic driving task, and level 3, where the automated driving system performs the entire dynamic driving task. Level 4 (also referred to as "mind off") is similar to level 3, but no driver attention is ever required for safety, i.e., the driver may safely go to sleep or leave the driver's seat. Self-driving is supported only in limited areas (geofenced) or under special circumstances, such as traffic jams. Outside of these areas or circumstances, the vehicle must be able to safely abort the trip, i.e., park the car, if the driver does not retake control. In Level 5 (also referred to as "wheel optional"), no human intervention is required. An example would be a robotic taxi.

An autonomous vehicle and systems having an interface for payloads that allows integration of various payloads with relative ease are disclosed in U.S. Patent Application Publication No. 2007/0198144 to Norris et al. entitled: "Networked multi-role robotic vehicle", which is incorporated in its entirety for all purposes as if fully set forth herein. There is a vehicle control system for controlling an autonomous vehicle, receiving data, and transmitting a control signal on at least one network. A payload is adapted to detachably connect to the autonomous vehicle, the payload comprising a network interface configured to receive the control signal from the vehicle control system over the at least one network. The vehicle control system may encapsulate payload data and transmit the payload data over the at least one network, including Ethernet or CAN networks. The payload may be a laser scanner, a radio, a chemical detection system, or a Global Positioning System unit. In certain embodiments, the payload is a camera mast unit, where the camera communicates with the autonomous vehicle control system to detect and avoid obstacles. The camera mast unit may be interchangeable, and may include structures for receiving additional payload components.

Automotive electric and electronic technologies and systems are described in a book published by Robert Bosch GmbH (5$^{th}$ Edition, July 2007) entitled: "*Bosch Automotive Electric and Automotive Electronics*" [ISBN-978-3-658-01783-5], which is incorporated in its entirety for all purposes as if fully set forth herein.

ADAS. Advanced Driver Assistance Systems, or ADAS, are automotive electronic systems to help the driver in the driving process, such as to increase car safety and more generally road safety using a safe Human-Machine Interface. Advanced driver assistance systems (ADAS) are developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. ADAS technology can be based upon, or use, vision/camera systems, sensor technology, car data networks, Vehicle-to-vehicle (V2V), or Vehicle-to-Infrastructure systems, and leverage wireless network connectivity to offer improved value by using car-to-car and car-to-infrastructure data. ADAS technologies or applications comprise: Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system (such as Precrash system), Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

ADAS is further described in Intel Corporation 2015 Technical White Paper (0115/MW/HBD/PDF 331817-001US) by Meiyuan Zhao of Security & Privacy Research, Intel Labs entitled: "*Advanced Driver Assistant System-Threats, Requirements, Security Solutions*", and in a PhD Thesis by Alexandre Dugarry submitted on June 2004 to the Cranfield University, School of Engineering, Applied Mathematics and Computing Group, entitled: "*Advanced Driver Assistance Systems-Information Management and Presentation*", which are both incorporated in their entirety for all purposes as if fully set forth herein.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wrist-bands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, ddbutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texas, U.S.A.) and described in a Texas Instrument 2015 publication #SWRT022 entitled: "SimpleLink™ Ultra-Low Power-Wireless Microcontroller Platform", and in a Texas Instrument 2015 datasheet #SWRS158A (published February 2015, Revised October 2015) entitled: "CC2650 SimpleLink™ Multistandard Wireless MCU", which are both incorporated in their entirety for all purposes as if fully set forth herein.

Virtual Reality. Virtual Reality (VR) or virtual realities, also known as immersive multimedia or computer-simulated reality, is a computer technology that replicates an environment, real or imagined, and simulates a user's physical presence and environment to allow for user interaction. Virtual realities artificially create sensory experience, which can include sight, touch, hearing, and smell. Most up-to-date virtual realities are displayed either on a computer monitor or with a virtual reality headset (also called head-mounted display), and some simulations include additional sensory information and focus on real sound through speakers or headphones targeted towards VR users. Some advanced haptic systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The immersive environment can be similar to the real world in order to create a lifelike experience—for example, in simulations for pilot or combat training—or it can differ significantly from reality, such as in VR games.

VR is described in an article published November 2009 in International Journal of Automation and Computing 6(4), November 2009, 319-325 [DOI: 10.1007/s11633-009-0319-9] by Ning-Ning Zhou and Yu-Long Deng entitled: "*Virtual Reality: A State-of-the-Art Survey*", in a draft publication authored by Steven M. LaValle of the University of Illinois dated Jul. 6, 2016 entitled: "*VIRTUAL REALITY*", in an article by D. W. F. van Krevelen and R. Poelman published 2010 in The International Journal of Virtual Reality, 2010, 9(2):1-20 entitled: "A Survey of Augmented Reality-Technologies, Applications and Limitations", in a paper by Moses Okechukwu Onyesolu and Felista Udoka Eze entitled: "*Understanding Virtual Reality Technology: Advances and Applications*" published 2011 by the Federal University of Technology, Owerri, Imo State, Nigeria, in an article by Dr. Matthias Schmidt (Ed.) published in Advances and Applications, Advances in Computer Science and Engineering, [ISBN: 978-953-307-173-2] by InTech, and in an 02/27/15 article by James Walker of Michigan Technological University entitled: "Everyday Virtual Reality", which are all incorporated in their entirety for all purposes as if fully set forth herein.

A method (50) of altering content provided to a user is described in U.S. Patent Application Publication No. 2007/0167689 to Ramadas et al. entitled: "Method and system for enhancing a user experience using a user's physiological state", which is incorporated in its entirety for all purposes as if fully set forth herein. The method includes the steps of creating (60) a user profile based on past physiological measurements of the user, monitoring (74) at least one current physiological measurement of the user, and altering (82) the content provided to the user based on the user profile and the at least one current physiological measurement. The user profile can be created by recording a plurality of inferred or estimated emotional states (64) of the user which can include a time sequence of emotional states, stimulus contexts for such states, and a temporal relationship between the emotional state and the stimulus context. The content can be altered in response to the user profile and measured physiological state by altering at least one among an audio volume, a video sequence, a sound effect, a video effect, a difficulty level, a sequence of media presentation.

A see-through, head mounted display and sensing devices cooperating with the display detect audible and visual behaviors of a subject in a field of view of the device are described in U.S. Pat. No. 9,019,174 to Jerauld entitled: "Wearable emotion detection and feedback system", which is incorporated in its entirety for all purposes as if fully set forth herein. A processing device communicating with display and the sensors monitors audible and visual behaviors of the subject by receiving data from the sensors. Emotional states are computed based on the behaviors and feedback provided to the wearer indicating computed emotional states of the subject. During interactions, the device, recognizes emotional states in subjects by comparing detected sensor input against a database of human/primate gestures/expressions, posture, and speech. Feedback is provided to the wearer after interpretation of the sensor input.

Method and devices for creating a sedentary virtual-reality system are provided in U.S. Pat. No. 9,298,283 to Chau-Hsiung Lin, et al. entitled: "Sedentary virtual reality method and systems", which is incorporated in its entirety for all purposes as if fully set forth herein. A user interface is provided that allows for the intuitive navigation of the sedentary virtual-reality system based on the position of the users head. The sedentary virtual-reality system can render a desktop computing environment. The user can switch the virtual-reality system into an augmented reality viewing mode or a real-world viewing mode that allow the user to control and manipulate the rendered sedentary environment. The modes can also change to allow the user greater situational awareness and a longer duration of use.

HMD. A Head-Mounted Display (or Helmet-Mounted Display, for aviation applications), both abbreviated HMD, is a display device, worn on the head or as part of a helmet, that has a small display optic in front of one (monocular HMD) or each eye (binocular HMD). There is also an Optical head-mounted display (OHMD), which is a wearable display that has the capability of reflecting projected images as well as allowing the user to see through it. A typical HMD has either one or two small displays with lenses and semi-transparent mirrors embedded in a helmet, eyeglasses (also known as data glasses) or visor. The display units are miniaturized and may include CRT, LCDs, Liquid crystal on silicon (LCos), or OLED. Some vendors employ multiple micro-displays to increase total resolution and field of view.

HMDs differ in whether they can display just a Computer Generated Image (CGI), show live images from the real world or a combination of both. Most HMDs display only a computer-generated image, sometimes referred to as a virtual image. Some HMDs allow a CGI to be superimposed on a real-world view. This is sometimes referred to as augmented reality or mixed reality. Combining real-world view with CGI can be done by projecting the CGI through a partially reflective mirror and viewing the real world directly. This method is often called Optical See-Through. Combining real-world view with CGI can also be done electronically by accepting video from a camera and mixing it electronically with CGI. This method is often called Video See-Through.

An optical head-mounted display uses an optical mixer, which is made of partly silvered mirrors. It has the capability of reflecting artificial images as well as letting real images to cross the lens and let the user to look through it. Various techniques have existed for see-through HMD's. Most of these techniques can be summarized into two main families: "Curved Mirror" based and "Waveguide" based. Various waveguide techniques have existed for some time. These techniques include diffraction optics, holographic optics, polarized optics, and reflective optics. Major HMD applications include military, governmental (fire, police, etc.) and civilian/commercial (medicine, video gaming, sports, etc.).

The Virtual Reality (VR) technology most fundamental to the proposed research is the Head-Mounted Display (HMD). An HMD is a helmet or visor worn by the user with two screens, one for each eye, so that a stereoscopic "true 3D" image may be displayed to the user. This is achieved by displaying the same image in each screen, but offset by a distance equal to the distance between the user's eyes, mimicking how human vision perceives the world. HMDs can be opaque or see-through. In a see-through HMD, the screens are transparent so that the user can see the real world as well as what is being displayed on the screens. However, see-through HMDs often suffer from brightness problems that make them difficult to use in variable lighting conditions. Most opaque HMD designs block out the real world so that the user can only see the screens, thereby providing an immersive experience.

Some HMDs are used in conjunction with tracking systems. By tracking the user's position or orientation (or both), the system can allow the user to move naturally via locomotion and by turning their head and body, and update the graphical display accordingly. This allows for natural exploration of virtual environments without needing to rely on a keyboard, mouse, joystick, and similar interface hardware. Positional tracking is often accomplished by attaching markers (such as infrared markers) to the HMD or the user's body and using multiple special cameras to track the location of these markers in 3D space. Orientation tracking can be accomplished using an inertial tracker, which uses a sensor to detect velocities on three axes. Some systems use a combination of optical and inertial tracking, and other tracking techniques (e.g., magnetic) also exist. The output from the tracking systems is fed into the computer rendering the graphical display so that it can update the scene. Filtering is usually necessary to make the data usable since it comes in the form of noisy analog measurements. An HMD 31 is pictorially depicted in FIG. 3b, and includes a horizontal strap 34a and a vertical strap 34b for head wearing by a person. A wireless-capable HMD 31a may include an antenna 33a and an antenna 33b for wireless communication. The wireless-capable HMD 31a is shown worn by a person 32 in a view 35 shown in FIG. 3b.

Methods and systems for capturing an image are provided in U.S. Patent Application Publication No. 2013/0222638 to Wheeler et al. entitled: "Image Capture Based on Gaze Detection", which is incorporated in its entirety for all purposes as if fully set forth herein. In one example, a head-mounted device (HMD) having an image capturing device, a viewfinder, a gaze acquisition system, and a controller may be configured to capture an image. The image capturing device may be configured to have an imaging field of view including at least a portion of a field of view provided by the viewfinder. The gaze acquisition system may be configured to acquire a gaze direction of a wearer. The controller may be configured to determine whether the acquired gaze direction is through the viewfinder and generate an image capture instruction based on a determination that the acquired gaze direction indicates a gaze through the viewfinder. The controller may further be configured to cause the image capturing device to capture an image.

Methods and systems for capturing and storing an image are provided in U.S. Pat. No. 8,941,561 to Starner entitled: "Image Capture", which is incorporated in its entirety for all purposes as if fully set forth herein. In one example, eye-movement data associated with a head-mountable device (HMD) may be received. The HMD may include an image-capture device arranged to capture image data corresponding to a wearer-view associated with the HMD. In one case, the received eye-movement data may indicate sustained gaze. In this case, a location of the sustained gaze may be determined, and an image including a view of the location of the sustained gaze may be captured. At least one indication of a context of the captured image, such as time and/or geographic location of the HMD when the image was captured may be determined and stored in a data-item attribute database as part of a record of the captured image. In a further example, movements associated with the HMD may also be determined and based on to determine sustained gaze and the location of the sustained gaze.

A head mountable display (HMD) system is disclosed in U.S. Patent Application Publication No. 2014/0362446 to Bickerstaff et al. entitled: "Electronic Correction Based on Eye Tracking", which is incorporated in its entirety for all purposes as if fully set forth herein. The head mountable display (HMD) system comprises an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

Methods and systems are described that involve a head-mountable display (HMD) or an associated device determining the orientation of a person's head relative to their body, are described in U.S. Pat. No. 9,268,136 to Patrick et al. entitled: "Use of Comparative Sensor Data to Determine Orientation of Head Relative to Body", which is incorporated in its entirety for all purposes as if fully set forth herein. To do so, example methods and systems may compare sensor data from the HMD to corresponding sensor data from a tracking device that is expected to move in a manner that follows the wearer's body, such a mobile phone that is located in the HMD wearer's pocket.

A Head Mountable Display (HMD) system in which images are generated for display to the user is described in Patent Cooperation Treaty (PCT) International Application (IA) Publication No. WO 2014/199155 to Ashforth et al. entitled: "Head-Mountable Apparatus and Systems", which is incorporated in its entirety for all purposes as if fully set forth herein. The head mountable display (HMD) system comprises a detector configured to detect the eye position and/or orientation and/or the head orientation of the HMD wearer, and a controller configured to control the generation of images for display, at least in part, according to the detection of the eye position and/or orientation and/or the head orientation of the HMD wearer; in which the controller is configured to change the display of one or more image features according to whether or not the user is currently looking at those image features, the image features are menu items or information items, by rendering an image feature so as to be more prominent on the display if the user is looking at it, such that the image feature is enlarged, moved from a peripheral display position, replaced by a larger image feature and/or brought forward in a 3D display space if the user is looking at it.

An arrangement 40 of using a digital video camera 10 is shown in FIG. 4. The digital video camera 10, which may correspond to the camera 10 shown in FIG. 1, or may include part or all of the elements shown in the camera 10 shown in FIG. 1, and is used to capture an image or a scene 45, typically situated in front of the digital video camera 10. A video data stream 43 that represents the captured image or scene 45 is output by digital video camera 10. The digital video stream 43 may be further used or processed by a Combiner 41. In one example, the video data stream 43 is combined with another data stream 42 by the combiner 41, to produce a combined output 44. For example, various information layers may be added to the captured video stream 43, for producing the output signal 44.

However, due to various latencies induced in the digital video camera 10, by any additional processing, or by communication of the signals, the digital data stream 43 received at the combiner 41 may be delayed by a time delay Δ't, so if the actual digital video stream upon real-time capturing with no delays is described as f1(t), the inducement of the time delay Δ't results in a delayed digital video stream signal f1(t-Δ't) at the input of the combiner 41. In one example, the additional data 42 added to the captured digital data stream 43 may be associated with timing (or timing related attributes such as position), such as real-time information or time-variant information. In such a case, the combiner 41 may improperly combine the incoming time-shifted signals, resulting non-accurate or wrong results.

The image processing may further include video enhancement such as video denoising, image stabilization, unsharp masking, and super-resolution. Further, the image processing may include a Video Content Analysis (VCA), where the video content is analyzed to detect and determine temporal events based on multiple images, and is commonly used for entertainment, healthcare, retail, automotive, transport, home automation, safety and security. The VCA functionalities include Video Motion Detection (VMD), video tracking, and egomotion estimation, as well as identification, behavior analysis, and other forms of situation awareness. A dynamic masking functionality involves blocking a part of the video signal based on the video signal itself, for example because of privacy concerns. The egomotion estimation functionality involves the determining of the location of a camera or estimating the camera motion relative to a rigid scene, by analyzing its output signal. Motion detection is used to determine the presence of a relevant motion in the observed scene, while an object detection is used to determine the presence of a type of object or entity, for example, a person or car, as well as fire and smoke detection. Similarly, face recognition and Automatic Number Plate Recognition may be used to recognize, and therefore possibly identify persons or cars. Tamper detection is used to determine whether the camera or the output signal is tampered with, and video tracking is used to determine the location of persons or objects in the video signal, possibly with regard to an external reference grid. A pattern is defined as any form in an image having discernible characteristics that provide a distinctive identity when contrasted with other forms. Pattern recognition may also be used, for ascertaining differences, as well as similarities, between patterns under observation and partitioning the patterns into appropriate categories based on these perceived differences and similarities; and may include any procedure for correctly identifying a discrete pattern, such as an alphanumeric character, as a member of a predefined pattern category. Further, the video or image processing may use, or be based on, the algorithms and techniques disclosed in the book entitled: "Handbook of Image & Video Processing", edited by Al Bovik, published by Academic Press, [ISBN: 0-12-119790-5], and in the book published by Wiley-Interscience [ISBN: 13-978-0-471-71998-4] (2005) by Tinku Acharya and Ajoy K. Ray entitled: *"Image Processing-Principles and Applications"*, which are both incorporated in their entirety for all purposes as if fully set forth herein.

A system that can parse both telemetry data and corresponding encoded video data wherein the telemetry and video data are subsequently synchronized based upon temporal information, such as a time stamp, is described in U.S. Patent Application Publication No. 2011/0090399 to Whitaker et al. entitled: "Data Search, Parser, and Synchronization of Video and Telemetry Data", which is incorporated in its entirety for all purposes as if fully set forth herein. The telemetry data and the video data are originally unsynchronized and the data for each is acquired by a separate device. The acquiring devices may be located within or attached to an aerial vehicle. The system receives the telemetry data stream or file and the encoded video data stream or file and outputs a series of synchronized video images with telemetry data. Thus, there is telemetry information associated with each video image. The telemetry data may be acquired at a different rate than the video data. As a result, telemetry data may be interpolated or extrapolated to create telemetry data that corresponds to each video image. The present system operates in real-time, so that data acquired from aerial vehicles can be displayed on a map.

A system, apparatus, and method for combining video with telemetry data is described in international application published under the Patent Cooperation Treaty (PCT) as WIPO PCT Publication No. WO 17214400 A1 to AGUILAR-GAMEZ et al. entitled: "Networked apparatus for real-time visual integration of digital video with telemetry data feeds", which is incorporated in its entirety for all purposes as if fully set forth herein. The video is received from a camera associated with a user at a wireless device. Telemetry data associated with the video is received at the wireless device. The telemetry data is time stamped as received. The video is overlaid with the telemetry data to generate integrated video utilizing the wireless device. The integrated video is communicated from the wireless device to one or more users.

A positional recording synchronization system is described in U.S. Patent Application Publication No. 2017/0301373 to Dat Tran et al. entitled: "Positional Recording Synchronization System", which is incorporated in its entirety for all purposes as if fully set forth herein. The system can include: creating a time stamped telemetry point for an unmanned aerial vehicle; creating a time stamped recording; creating transformed data from the time stamped recording, the transformed data being tiles for zooming or thumbnails; creating a flightpath array, an image metadata array, and a video metadata array; determining whether entries of the video metadata array match with the flightpath array; determining whether entries of the image metadata array match with the flightpath array; synchronizing the time stamped telemetry point with the time stamped recording based on either the entries of the image metadata array matching the flightpath array, the entries of the visualizer module matching the flightpath array, or a combination thereof; and displaying the time stamped telemetry point as a selection tool for calling, viewing, or manipulating the time stamped recording on a display.

Condition detection using image processing may include receiving telemetry data related to movement of a vehicle along a vehicle path is described in U.S. Patent Application Publication No. 2018/0218214 to PESTUN et al. entitled: "Condition detection using image processing", which is incorporated in its entirety for all purposes as if fully set forth herein. Condition detection using image processing may further include receiving images captured by the vehicle, and generating, based on the telemetry data and the images, an altitude map for the images, and world coordinates alignment data for the images. Condition detection using image processing may further include detecting the entities in the images, and locations of the entities detected in the images, consolidating the locations of the entities detected in the images to determine a consolidated location for the entities detected in the images, generating, based on the consolidated location, a mask related to the vehicle path and the entities detected in the images, and reconstructing three-dimensional entities model for certain types of entities, based on the entities masks and world coordinates alignment data for the images.

A flight training image recording apparatus that includes a housing comprising one or more cameras is described in U.S. Patent Application Publication No. 2016/0027335 to Schoensee et al. entitled: "Flight training image recording apparatus", which is incorporated in its entirety for all purposes as if fully set forth herein. The housing and/or separate cameras in a cockpit are mounted in locations to capture images of the pilot, the pilot's hands, the aircraft instrument panel and a field of view to the front of the aircraft. The recorded images are date and time synced along with aircraft location, speed and other telemetry signals and cockpit and control tower audio signals into a multiplexed audio and visual stream. The multiplexed audio and video stream is downloaded either wirelessly to a remote processor or to a portable memory device which can be input to the remote processor. The remote processor displays multiple camera images that are time-stamped synced along with cockpit audio signals and aircraft telemetry for pilot training.

An observation system that comprises at least one platform means and a video or image sensor installed on said platform means is described in international application published under the Patent Cooperation Treaty (PCT) as WIPO PCT Publication No. WO 2007/135659 to Shechtman et al. entitled: "Clustering-based image registration", which is incorporated in its entirety for all purposes as if fully set forth herein. The system is used in order to produce several images of an area of interest under varying conditions and a computer system in order to perform registration between said images and wherein said system is characterized by a clustering-based image registration method implemented in said computer system, which includes steps of inputting images, detecting feature points, initial matching of feature points into pairs, clustering feature point pairs, outlier rejection and defining final correspondence of pairs of points.

Condition detection using image processing may include receiving a mask generated from images and telemetry data captured by a vehicle, an altitude map, and alignment data for the mask, is described in U.S. Patent Application Publication No. 2018/0260626 to PESTUN et al. entitled: "Condition detection using image processing", which is incorporated in its entirety for all purposes as if fully set forth herein. The images may be related to movement of the vehicle along a vehicle path and non-infrastructure entities along an infrastructure entity position of a corresponding infrastructure entity, and the telemetry data may include movement log information related to the movement of the vehicle along the vehicle path. Condition detection using image processing may further include using the mask related to the vehicle path and the non-infrastructure entities, and an infrastructure rule to detect a risk related to the infrastructure entity by analyzing the mask related to the vehicle path and the non-infrastructure entities, and the infrastructure rule, and determining whether the infrastructure rule is violated.

An Ethernet-compatible synchronization process between isolated digital data streams assures synchronization by embedding an available time code from a first stream into data locations in a second stream that are known a priori to be unneeded, is described in U.S. Patent Application Publication No. 2010/0067553 to McKinney et al. entitled: "Synchronization of video with telemetry signals method and apparatus", which is incorporated in its entirety for all purposes as if fully set forth herein. Successive bits of time code values, generated as a step in acquiring and digitizing analog sensor data, are inserted into least-significant-bit locations in a digitized audio stream generated along with digitized image data by a digital video process. The overwritten LSB locations are shown to have no discernable effect on audio reconstructed from the Ethernet packets. Telemetry recovery is the reverse of the embedment process, and the data streams are readily synchronized by numerical methods.

A method for producing images is described in U.S. Patent Application Publication No. 2007/0285438 to Kanowitz entitled: "Frame grabber", which is incorporated in its entirety for all purposes as if fully set forth herein. The method involves acquiring images, acquiring data corresponding to the location of the acquired images, and transferring the images and data to a frame grabber. The method also involves combining the images and data within the frame grabber to provide a plurality of imagery products.

An optical device is described in U.S. Patent Application Publication No. 2004/0155993 to Cueff et al. entitled: "Optical device, particularly a liquid-crystal imaging device, and mirror therefor", which is incorporated in its entirety for all purposes as if fully set forth herein. The invention described relates to the field of optical devices, in particular liquid crystal imagers, as well as the mirrors associated with these optical devices. The optical device is angled, and includes at least one lamp (3) and a channel (9) guiding at least some of the light coming from the lamp (3), as well as a mirror (12) in an angled part of the optical device, consisting of a sheet which is folded so that, on the one hand, it can be partially introduced into the channel (9), and, on the other hand, once introduced into the channel (9) and immobilized therein, it can reflect some of the light coming from the lamp (3) into a determined direction. The invention may, in particular, be applied to liquid crystal imagers for military aircraft.

Systems and methods for analyzing a game application are disclosed in U.S. Patent Application Publication No. 2017/0266568 to Lucas et al. entitled: "Synchronized video with in game telemetry", which is incorporated in its entirety for all purposes as if fully set forth herein. While the game application is executed in a gameplay session, embodiment of the systems and methods can acquire data associated with the game application. The data acquired during the gameplay session may be associated with a session identifier. Different types of data (such as telemetry data and video data) can be linked together using the timestamps of the gameplay session. A user can choose a timestamp of the gameplay session to view the data associated with that timestamp. In certain embodiments, the systems and methods can associate an event with one or more timestamps. When a user chooses the event, the systems and methods can automatically display event data starting from the beginning of the event.

A video recording method capable of synchronously merging information of a barometer and positioning information into a video in real time is disclosed in Chinese Patent Application Publication No. CN105163056A entitled: "Video recording method capable of synchronously merging information of barometer and positioning information into video in real time", which is incorporated in its entirety for all purposes as if fully set forth herein. According to the method, video information, audio information, and air pressure information, altitude information, grid location coordinate information and speed information of a motion camera in real time are acquired, coding processing on the video information is carried out to output a first video flow, coding processing on the audio information is carried out to output an audio flow synchronization with the first video flow, coding processing on the air pressure information, the altitude information, the grid location coordinate information and the speed information is carried out to output an air pressure altitude data flow synchronization with the first video flow and a coordinate speed data flow, through synthesis, a second video flow containing synchronization air pressure, altitude, grid location coordinate and speed information is outputted, and an audio and video file containing the second video flow and the audio flow are finally outputted. Through the method, the air pressure information, the altitude information, the grid location coordinate information and the speed information of the motion camera are merged in real time into the video through synchronization coding, so subsequent edition, management and analysis on the video are conveniently carried out.

Electronic circuits and components are described in a book by Wikipedia entitled: "Electronics" downloaded from en.wikibooks.org dated Mar. 15, 2015, which is incorporated in its entirety for all purposes as if fully set forth herein.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, the components, systems, devices or elements described in the publications that are incorporated in their entirety herein.

In consideration of the foregoing, it would be an advancement in the art to provide methods and systems for estimating the latency or delay, either absolutely or relatively, or to use the estimation for synchronization of a delayed digital video stream for low-error time alignment, that are simple, intuitive, small, secure, cost-effective, reliable, provide lower power consumption, provide lower CPU and/or memory usage, easy to use, reduce latency, faster, has a minimum part count, minimum hardware, and/or uses existing and available components, protocols, programs and applications for providing better quality of service, better or optimal resources allocation, and provides a better user experience.

SUMMARY

A method for estimating a delay of a video data stream from a Digital Video Camera (DVC) may be used with a physical phenomenon that may affect the video camera or the scene captured by the video camera. Any method herein may comprise receiving, from the digital video camera, the video data stream; producing, by a video processor, a first signal that estimates the physical phenomenon value, by processing the video data stream for detecting the effect of the physical phenomenon on the captured video; receiving, from a sensor, a second signal that is responsive to the physical phenomenon value; estimating a positive or negative time delay value between the first and second signals by comparing therebetween; and combining the video data stream with additional data by synchronizing using the estimated time delay value.

A non-transitory tangible computer readable storage media may comprise a code to perform part of, or whole of, the steps of any method herein. Alternatively or in addition, any device herein may be housed in a single enclosure and may comprise the digital camera, a memory for storing computer-executable instructions, and a processor for executing the instructions, and the processor may be configured by the memory to perform acts comprising part of, or whole of, any method herein. Any apparatus, device, or enclosure herein may be a portable or a hand-held enclosure, and the may be battery-operated, such as a notebook, a laptop computer, a media player, a cellular phone, a Personal Digital Assistant (PDA), or an image processing device. Any method herein may be used with a memory or a non-transitory tangible computer readable storage media for storing computer executable instructions that may comprise at least part of the method, and a processor for executing part of, or all of, the instructions. Any non-transitory computer readable medium may be having computer executable instructions stored thereon, and the instructions may include the steps of any method herein.

Any time delay value herein may be estimated in response to an event, and the time delay value may be continuously used for any combining or other manipulation herein. Any time delay value herein may be estimated in response to a user control, in response to a power-up process, or may be continuously estimated and used for any combining or manipulating. Any time delay value herein may be periodically estimated, such as every at least 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, or 1 months, or every no more than 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, or 1 months.

Any comparing herein may comprise comparing of the first and second signals during a time interval, and the time-interval may be less than 1 millisecond, 2 milliseconds, 5 milliseconds, 10 milliseconds, 20 milliseconds, 30 milliseconds, 50 milliseconds, 100 milliseconds, 200 milliseconds, 500 milliseconds, 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, or 10 hours, or the time-interval may be more than 1 millisecond, 2 milliseconds, 5 milliseconds, 10 milliseconds, 20 milliseconds, 30 milliseconds, 50 milliseconds, 100 milliseconds, 200 milliseconds, 500 milliseconds, 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, or 10 hours.

Any comparing herein may comprise, may be based on, or may use, convolution, correlation, or a cross-correlation operation on the first and second signals, and any comparing herein may comprise, may consist of, may be based on, or may use, calculating or estimating a cross-correlation coefficient of the first and second signals. Any estimating herein of any time delay value may comprises, may consist of, may be based on, or may use, selecting a time delay value that results in a maximum value of the cross-correlation coefficient value when time shifting the first or second signal by the time delay value. Further, any comparing herein may comprise, may consist of, may be based on, or may use, Cross-Correlation (CC), Phase Transform (PHAT), Maximum Likelihood estimator (ML), Adaptive Least Mean Square filter (LMS), or Average Square Difference Function (ASDF).

Any method herein may be used with a third signal that may be based on, may be a function of, may be in response, may be equal to, or may be the same as, the first signal. Alternatively or in addition, any method herein may be used with a fourth signal that may be based on, may be a function of, may be in response, may be equal to, or may be the same as, the second signal. Any comparing herein may comprise detecting or identifying a first event in the third signal at a first time point and detecting or identifying a second event in the fourth signal at a second time point. Any time delay value herein may be estimated based on, equal to, or a function of, of a time different between the first and second time points. The first event or the second event may comprise detecting or identifying a peak value in the respective third or fourth signal. Alternatively or in addition, any method herein may be used with a threshold value, and the first event or the second event may comprise detecting or identifying a threshold value crossing in the respective third or fourth signal. The third signal may be the first signal and the fourth signal may be the second signal. Any method herein may further comprise producing the third signal by applying a time-domain analysis or manipulation to the first signal, and producing the fourth signal by applying a time-domain analysis or manipulation to the second signal.

Any time-domain analysis or manipulation herein may comprise detecting zero crossings, peak amplitude, rise-time, energy, a Mel-Frequency Analysis, calculating Mel-Frequency Cepstral Coefficients (MFCC), using a Linear Predictive Coding (LPC), calculating LPC coefficients, a discrete, continuous, monotonic, non-monotonic, elementary, algebraic, linear, polynomial, quadratic, Cubic, Nth-root based, exponential, transcendental, quintic, quartic, logarithmic, hyperbolic, or trigonometric function. Any method herein may further comprise producing the third signal by applying a frequency-domain analysis or manipulation to the first signal and producing the fourth signal by applying a frequency-domain analysis or manipulation to the second signal, and any frequency-domain analysis or manipulation herein may comprise Fourier series, Fourier transform, Laplace transform, Z transform, or Wavelet transform.

Any digital video camera herein may comprise an optical lens for focusing received light, the lens being mechanically oriented to guide a captured image; a photosensitive image sensor array disposed approximately at an image focal point plane of the optical lens for capturing the image and producing an analog signal representing the image; and an analog-to-digital (A/D) converter coupled to the image sensor array for converting the analog signal to the video data stream. Any camera or image sensor array herein may be operative to respond to a visible or non-visible light, and any invisible light herein may be infrared, ultraviolet, X-rays, or gamma rays. Any image sensor array herein may comprise, may use, or may be based on, semiconductor elements that use the photoelectric or photovoltaic effect, such as Charge-Coupled Devices (CCD) or Complementary Metal-Oxide-Semiconductor Devices (CMOS) elements. Any video camera herein may consist of, may comprise, or may be based on, a Light Detection And Ranging (LIDAR) camera or scanner, or a thermal camera.

Any digital video camera herein may further comprise an image processor coupled to the image sensor array for providing the video data stream according to a digital video format, which may use, may be compatible with, may be according to, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. Further, any video data stream herein may be in a High-Definition (HD) or Standard-Definition (SD) format. Alternatively or in addition, any video data stream herein may be based on, may be compatible with, or may be according to, ISO/IEC 14496 standard, MPEG-4 standard, or ITU-T H.264 standard.

Any method herein may be used with a video compressor coupled to the digital video camera for compressing the video data stream, and any video compressor herein may perform a compression scheme that may uses, or may be based on, intraframe or interframe compression, and wherein the compression is lossy or non-lossy. Further, any compression scheme herein may use, may be compatible with, or may be based on, at least one standard compression algorithm which is selected from a group consisting of: JPEG (Joint Photographic Experts Group) and MPEG (Moving Picture Experts Group), ITU-T H.261, ITU-T H.263, ITU-T H.264 and ITU-T CCIR 601.

Any producing of the first signal herein may comprise, may be based on, or may use, a Video Content Analysis (VCA) algorithm, which may include Video Motion Detection (VMD), video tracking, egomotion estimation, identification, behavior analysis, situation awareness, dynamic masking, motion detection, object detection, face recognition, automatic number plate recognition, tamper detection, video tracking, or pattern recognition.

Any sensor herein may respond to an object that may be a gas, an air, a liquid, or a solid, and may consist of, may be based on, or may comprise, a nanosensor, a crystal, a Micro Electro-Mechanical Systems (MEMS), or a semiconductor. Further, any sensor herein may respond to a time-dependent characteristic of the phenomenon that may be a time-integrated, an average, an RMS (Root Mean Square) value, a frequency, a period, a duty-cycle, a time-integrated, or a time-derivative of the phenomenon value. Alternatively or in addition, any sensor herein may respond to a space-dependent characteristic of the phenomenon that may be a pattern, a linear density, a surface density, a volume density, a flux density, a current, a direction, a rate of change in a direction, or a flow. Further, any sensor herein may be a piezoelectric sensor that may include single crystal material or a piezoelectric ceramics and uses a transverse, longitudinal, or shear effect mode of the piezoelectric effect. Any method herein may be used with multiple sensors that may be arranged as a directional sensor array and may be operative to estimate the number, magnitude, frequency, Direction-Of-Arrival (DOA), distance, or speed of the phenomenon impinging the sensor array.

Any sensor herein and any video camera herein may be mechanically coupled so that they are jointly affected by a movement or motion. Further, any sensor herein may be directly mechanically attached to any video camera herein, or may be included in an enclosure of any video camera herein. Alternatively or in addition, the sensor and the video camera may be mechanically attached to a structure or frame, such as to a structure or frame of a single enclosure housing the sensor and the video camera. Any physical phenomenon herein may comprise a positioning, orientation, movement, or motion of the video camera, such as an absolute or relative orientation or angular velocity of the video camera. Any physical phenomenon herein may comprise an absolute or relative yaw, pitch, roll, yaw rate, pitch rate, or roll rate, or alternatively absolute or relative location, position, speed or acceleration along a vertical, transverse, or longitudinal axis. Alternatively or in addition, any physical phenomenon herein may comprise absolute or relative pan, tilt, or zoom of the video camera. Alternatively or in addition, any physical phenomenon herein may comprise periodic or random mechanical vibration that may be free, forced, or damped vibration.

Any physical phenomenon herein may comprise a positioning, orientation, movement, or motion of the video camera, and any sensor herein may be mechanically attached to the video camera for sensing the positioning, orientation, movement, or motion of the video camera. Any sensor herein may use, may comprise, may consist of, or may be based on, a clinometer that may use, may comprise, may consist of, or may be based on, an accelerometer, a pendulum, or a gas bubble in liquid. Any sensor herein may use, may comprise, may consist of, or may be based on, an angular rate sensor, and any sensor herein may use, may comprise, may consist of, or may be based on, piezoelectric, piezoresistive, capacitive, MEMS, or electromechanical sensor. Alternatively or in addition, any sensor herein may use, may comprise, may consist of, or may be based on, an inertial sensor that may use, may comprise, may consist of, or may be based on, one or more accelerometers, one or more gyroscopes, one or more magnetometers, or an Inertial Measurement Unit (IMU).

Any sensor herein may use, may comprise, may consist of, or may be based on, a single-axis, 2-axis or 3-axis accelerometer, which may use, may comprise, may consist of, or may be based on, a piezoresistive, capacitive, Micro-mechanical Electrical Systems (MEMS), or electromechanical accelerometer. Any accelerometer herein may be operative to sense or measure the video camera mechanical orientation, vibration, shock, or falling, and may comprise, may consist of, may use, or may be based on, a piezoelectric accelerometer that utilizes a piezoelectric effect and comprises, consists of, uses, or is based on, piezoceramics or a single crystal or quartz. Alternatively or in addition, any sensor herein may use, may comprise, may consist of, or may be based on, a gyroscope that may use, may comprise, may consist of, or may be based on, a conventional mechanical gyroscope, a Ring Laser Gyroscope (RLG), or a piezoelectric gyroscope, a laser-based gyroscope, a Fiber Optic Gyroscope (FOG), or a Vibrating Structure Gyroscope (VSG).

Any physical phenomenon herein may comprise an environmental condition, and any video camera herein and any sensor herein may be closely located to be jointly affected by the environmental condition, and a distance between the video camera and the sensor may be less than 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, or 1 Km (kilometer). Alternatively or in addition, any sensor herein may be mechanically attached to any video camera herein, or may be included in the video camera enclosure, such as where the sensor and the video camera, are housed within a single enclosure. Any physical phenomenon herein may comprise, or may consist of, a temperature, and any sensor herein may comprise, may consist of, may use, or may be based on, a thermoelectric sensor that may respond to a temperature or to a temperature gradient of an object using conduction, convection, or radiation. Any thermoelectric sensor herein may comprise, may consist of, may use, or may be based on, a Positive Temperature Coefficient (PTC) thermistor, a Negative Temperature Coefficient (NTC) thermistor, a thermocouple, a quartz crystal, or a Resistance Temperature Detector (RTD).

Any environmental condition herein may comprise, or may consist of, a radiation, and any sensor herein may comprise, may consist of, may use, or may be based on, a radiation sensor that may respond to radioactivity, nuclear radiation, alpha particles, beta particles, or gamma rays, and may comprise, may consist of, may use, or may be based on, gas ionization. Alternatively or in addition, any environmental condition herein may comprise, or may consist of, an ambient light, and any sensor herein may comprise, may consist of, may use, or may be based on, a photoelectric sensor that may respond to a visible or an invisible light, and the invisible light may be infrared, ultraviolet, X-rays, or gamma rays. Further, any photoelectric sensor herein may comprise, may consist of, may use, or may be based on, a photoelectric or photovoltaic effect, and may consist of, or may comprise, a semiconductor component that may consist of, or may comprise, a photodiode, a phototransistor, or a solar cell. Further, any photoelectric sensor herein may comprise, may consist of, may use, or may be based on, Charge-Coupled Device (CCD) or a Complementary Metal-Oxide Semiconductor (CMOS) element. Alternatively or in addition, any environmental condition herein may comprise, or may consist of, humidity, and any sensor herein may comprise, may consist of, may use, or may be based on, a humidity sensor. Further, any humidity sensor herein may comprise, may consist of, may use, or may be based on, a hygrometer or a humidistat, and may respond to an absolute, relative, or specific humidity. Alternatively or in addition, any environmental condition herein may comprise, or may consist of, an atmospheric condition, and any sensor herein may comprise, may consist of, may use, or may be based on, an atmospheric sensor.

Any physical phenomenon herein may affect the scene captured by the video camera, such as a motion or a position of an element in the scene that may be captured by the video camera. Any producing herein of the first signal may comprise, may be based on, or may use, a Video Content Analysis (VCA) algorithm that may comprise detecting or estimating the motion or the position of the element in the scene. Further, the physical phenomenon may comprise a wind, and any sensor herein may be operative to sense, detect, or measure the wind speed or direction.

Any digital camera herein and any sensor herein may be housed in a first single enclosure. Any video processor herein may be housed in the first single enclosure, the producing of the first signal may be performed in the first single enclosure, the estimating of the time delay value may be performed in the first single enclosure, or the combining of the video data stream with the additional data may be performed in the first single enclosure. Alternatively or in addition, any combining herein of the video data stream with the additional data may be performed in a second single enclosure that is distinct and separate from the first single enclosure, and any estimating herein of the time delay value may be performed in the second single enclosure. Further, any video processor herein may be housed in the second single enclosure, or any producing herein of the first signal may be performed in the second single enclosure.

Any method herein may be used with a device having a single enclosure, and the single enclosure may comprise any digital camera herein and any sensor herein. Any video processor herein may be part of the device, the producing herein of the first signal may be performed in the device, the estimating herein of the time delay value may be performed in the device, or any combining herein of the video data stream with the additional data may be performed in the device.

Any single enclosure herein may be a hand-held enclosure or a portable enclosure, or may be a surface mountable enclosure. Further, any device or enclosure herein may consist or, may comprise, or may be part of, at least one of a wireless device, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Furthermore, any device or enclosure herein may consist or, may comprise, or may be part of, a smartphone that comprises, or is based on, an Apple iPhone 6 or a Samsung Galaxy S6. Any method herein may comprise operating of an operating system that may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Alternatively or in addition, any operating system may be a Real-Time Operating System (RTOS), such as FreeRTOS, SafeRTOS, QNX, VxWorks, or Micro-Controller Operating Systems (μC/OS).

Any device herein may be wearable on a person, such as on an organ of the person head, and the organ may be an eye, ear, face, cheek, nose, mouth, lip, forehead, or chin. Any device herein may include an enclosure that may be constructed to have a form substantially similar to, may be constructed to have a shape allowing mounting or wearing identical or similar to, or may be constructed to have a form to at least in part substitute for, headwear, eyewear, or earpiece.

Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Any enclosure herein may be permanently or releasably attachable to, or is part of, a clothing piece of a person, and any attaching herein may use taping, gluing, pinning, enclosing, encapsulating, a pin, or a latch and hook clip. Any clothing piece herein may be a top, bottom, or full-body underwear, or a headwear, a footwear, an accessory, an outwear, a suit, a dress, a skirt, or a top. Any device herein may comprise an annular member defining an aperture therethrough that is sized for receipt therein of a part of a human body. Any human body part herein may be part of a human hand that may consist of, or may comprise, an upper arm, elbow, forearm, wrist, or a finger. Alternatively or in addition, any human body part herein may be part of a human head or neck that may consist of, or may comprise, a forehead, ear, skull, or face. Alternatively or in addition, any human body part herein may be a part of a human thorax or abdomen that may consist of, or may comprise, a waist or hip. Alternatively or in addition, any human body part herein may be part of a human leg or foot that may consist of, or may comprise, a thigh, calf, ankle, instep, knee, or toe.

Any digital camera herein and any sensor herein may be part of, may be mounted in, or may be attached to, a vehicle. Further, any video processor herein may be part of the vehicle, any producing herein of the first signal may be performed in the vehicle, any estimating herein of the time delay value may be performed in the vehicle, or any combining herein of the video data stream with the additional data may be performed in the vehicle.

Any method herein may be used with an automotive navigation system in a vehicle, and any device herein may be part of, or may comprise, automotive navigation system and is installable, or mountable, in a vehicle, and any user herein may be a driver, operator, or a passenger, in the vehicle. Any device herein may be mounted onto, may be attached to, may be part of, or may be integrated in, the vehicle. Any vehicle herein may be a ground vehicle adapted to travel on land, and may be selected from the group consisting of a bicycle, a car, a motorcycle, a train, an electric scooter, a subway, a train, a trolleybus, and a tram. Further, any ground vehicle herein may consist of, or may comprise, an autonomous car. Any autonomous car herein may be according to levels 0, 1, or 2 of the Society of Automotive Engineers (SAE) J3016 standard, or may be according to levels 3, 4, or 5 of the Society of Automotive Engineers (SAE) J3016 standard. Any vehicle herein may be a buoyant or submerged watercraft adapted to travel on or in water, and any watercraft herein may be selected from the group consisting of a ship, a boat, a hovercraft, a sailboat, a yacht, and a submarine. Alternatively or in addition, any vehicle herein may be an aircraft adapted to fly in air, and any aircraft herein may be a fixed wing or a rotorcraft aircraft, and may be selected from the group consisting of an airplane, a spacecraft, a glider, a drone, or an Unmanned Aerial Vehicle (UAV).

Any receiving herein of any video data stream may comprise receiving of the video data stream over a wireless network by a first wireless transceiver via a first antenna from the video camera. Further, any receiving herein of any second signal may comprise receiving of the second signal over a wireless network by a first wireless transceiver via a first antenna from the sensor. Any method herein may further comprise transmitting the video data stream over a wireless network by a second wireless transceiver via a second antenna from the video camera. Further, any method herein may further comprise transmitting of the second signal over a wireless network by a second wireless transceiver via a second antenna from the sensor. Any method herein may be used with a received multiplexed signal that may comprise the video data stream and the second signal, and any method herein may further comprise de-multiplexing the received multiplexed signal into the video data stream and the second signal. Furthermore, any method herein may further comprise multiplexing the video data stream and the second signal into the received multiplexed signal, and any multiplexing herein may be based on, or may use, Frequency Division/Domain Multiplexing (FDM) or Time Domain/Division Multiplexing (TDM).

Any wireless network herein may comprise a Wireless Wide Area Network (WWAN), any wireless transceiver herein may comprise a WWAN transceiver, and any antenna herein may comprise a WWAN antenna. Any WWAN herein may be a wireless broadband network. Any WWAN herein may be a WiMAX network, any antenna herein may be a WiMAX antenna and any wireless transceiver herein may be a WiMAX modem, and the WiMAX network may be according to, compatible with, or based on, Institute of Electrical and Electronics Engineers (IEEE) IEEE 802.16-2009. Alternatively or in addition, the WWAN may be a cellular telephone network, any antenna herein may be a cellular antenna, and any wireless transceiver herein may be a cellular modem, where the cellular telephone network may be a Third Generation (3G) network that uses Universal Mobile Telecommunications System (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), or Global System for Mobile communications (GSM), Enhanced Data rates for GSM Evolution (EDGE) EDGE-Evolution, or the cellular telephone network may be a Fourth Generation (4G) network that uses Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or is based on IEEE 802.20-2008.

Any wireless network herein may comprise a Wireless Personal Area Network (WPAN), any wireless transceiver herein may comprise a WPAN transceiver, and any antenna herein may comprise an WPAN antenna. The WPAN may be according to, compatible with, or based on, Bluetooth™, Bluetooth Low Energy (BLE), or IEEE 802.15.1-2005 standards, or the WPAN may be a wireless control network that may be according to, or may be based on, Zigbee™, IEEE 802.15.4-2003, or Z-Wave™ standards. Any wireless network herein may comprise a Wireless Local Area Network (WLAN), any wireless transceiver herein may comprise a WLAN transceiver, and any antenna herein may comprise a WLAN antenna. The WLAN may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band that may be an Industrial, Scientific and Medical (ISM) radio band.

Any wireless network herein may be using, or may be based on, Dedicated Short-Range Communication (DSRC) that may be according to, may be compatible with, or may be based on, European Committee for Standardization (CEN) EN 12253:2004, EN 12795:2002, EN 12834:2002, EN 13372:2004, or EN ISO 14906:2004 standard. Alternatively or in addition, the DSRC may be according to, may be compatible with, or may be based on, IEEE 802.11p, IEEE 1609.1-2006, IEEE 1609.2, IEEE 1609.3, IEEE 1609.4, or IEEE1609.5.

Any enclosure herein, such as each of the first enclosure and the second enclosure may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top. Any enclosure herein, such as the third enclosure, may be a portable or a hand-held enclosure. Any power source herein, such as the third power source, may be a primary or rechargeable battery.

Any device, component, or apparatus herein, such as the third device or the component, may consist of, or may comprise, a notebook, a laptop computer, a media player, a cellular phone, a smartphone, a Personal Digital Assistant (PDA), and may comprise a memory for storing software, and a processor for executing the software. Any smartphone herein may consist of, may be based on, or may comprise, an Apple iPhone 6 or a Samsung Galaxy S6. Any software herein may comprise an operating system that may be a mobile operating system, which may comprise, may use, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any digital camera herein may comprise an optical lens for focusing received light, the lens may be mechanically oriented to guide the captured images; a photosensitive image sensor array that may be disposed approximately at an image focal point plane of the optical lens for capturing the image and producing an analog signal representing the image; and an analog-to-digital (A/D) converter that may be coupled to the image sensor array for converting the analog signal to a digital data representation of the captured image.

The image sensor array may be operative to respond to visible or non-visible light, such as infrared, ultraviolet, X-rays, or gamma rays. The image sensor array may use, or may be based on, semiconductor elements that may use the photoelectric or photovoltaic effect. The image sensor array may use, may comprise, or may be based on, Charge-Coupled Devices (CCD) or Complementary Metal-Oxide-Semiconductor Devices (CMOS) elements.

Any digital camera herein may further comprise an image processor that may be coupled to the image sensor array for providing a digital video data signal according to a digital video format, the digital video signal may be carrying digital data video that may comprise, may be compatible with, or may be based on, the captured images. Any digital video format herein may use, may be compatible with, or may be based on TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standards. Any digital camera herein may further comprise a video compressor coupled to the image sensor array for compressing the digital data video, and the video compressor may perform a compression scheme that may use, or may be based on, intraframe or interframe compression. The compression scheme may be lossy or non-lossy, and may use, may be compatible with, or may be based on, JPEG (Joint Photographic Experts Group) and MPEG (Moving Picture Experts Group), ITU-T H.261, ITU-T H.263, ITU-T H.264, or ITU-T CCIR 601.

Any system, device, component, or apparatus herein may be used with a wireless network. The first, second, and third devices may respectively comprise a first, second, and third wireless transceivers and may communicate over the wireless network respectively using the first, second, and third wireless transceivers. The first wireless transmitter may be part of the first wireless transceiver, the second wireless transmitter may be part of the second wireless transceiver, and the wireless receiver may be part of the third wireless transceiver.

Any system, device, component, or apparatus herein may be used with a vehicle operative to travel in a travel direction under control of a driver. Any system, device, component, or apparatus herein may be mountable on, attachable to, or part of, the vehicle. The third antenna or any antenna, the third device or any device herein, or any other element herein may be mountable on, attachable to, or part of, the vehicle, and may be located along the travel direction or along a line of sight to the road of the driver. Any component, device, or apparatus herein may consist of, may comprise, may be integrated with, may be connectable to, or may be part of, an Electronic Control Unit (ECU), which may be an Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module.

Any vehicle herein may further comprise an Advanced Driver Assistance Systems (ADAS) functionality, system, or scheme, and any device, system, component, or apparatus herein, such as the third device, may be part of, integrated with, communicating with, or coupled to, the ADAS functionality, system, or scheme. The ADAS functionality, system, or scheme may consist of, may comprise, or may use, Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

Video files that are received from aerial platforms may incorporate telemetries stream describing the position, orientation, or motion of the aircraft and camera, for the purpose of status report and control over the equipment by remote operator. The correlation between the two information sources, namely visual and telemetries, may be utilized. Visual may be visible light video, other bandwidth video (IR, thermal, radio imaging, CAT scan, etc.), ELOP imagery (LIDAR, SONAR, RADAR etc.). Telemetry may include any information regarding the visual source state, such as its position, speed, acceleration, temperature etc.

The streams may be time-synchronized to each other or not. If they are synchronized, the level of synchronization, such as the time gap between the representations of a specific event in the two streams, may vary. The telemetries and video streams may be loosely synchronized, may be reported at different frequencies, and may be usually reported with a time offset between them, where the time difference may be up to several seconds in magnitude. In order to use the telemetries stream for augmenting virtual features over the video, the telemetries should be time-synchronized to the video as closely as possible, for allowing the time offset should be minimized.

The correlated information may include changes to the video source, camera position, camera velocity, camera acceleration, FOV (Field of View) or Zoom, payload operation (such as moving from one camera to another or moving from visible to IR sensor), satellite navigation system (such as GPS) reception level, ambient light level, wind speed (such as identifying wind gusts from movement of trees in the captured video), or vibrations. The correlation may use time spans during which the telemetries and video do not change, based on their length.

The correlation between information in the two streams may be used to achieve high quality synchronization and low-error time alignment) between them. For example, the system may correlate changes without relating to their specific nature, such as allowing any video abrupt change to correlate to any telemetry abrupt change. Further, a method may comprise analyzing the video and identifying an aircraft and a camera motion in it, finding corresponding motion reports in the telemetries stream, and using the correspondence to derive the time offset between the two streams. The resulted information may be used to align the video and telemetries streams so that the time difference is minimized. The system could attempt to re-synch the streams with any new change detected, at a given frequency, when it is suspected that the streams are not aligned, or only once. The previous alignment could be the used for next alignment search algorithm. Corresponding motions could be, for example, rotation of the aircraft, zoom in of the camera, weight-on-wheels of the aircraft, or switching between camera sensors. Further, the video and telemetries with minimized time offset may be used for augmenting (virtual) features to the video stream.

Any method or system herein may be used for adding Augmented Reality layers over video, both in real time and after the fact, for vehicle navigation, where vehicle could be airborne, terrestrial, marine or submarine, for analysis of the communication channels carrying the Video and telemetry, i.e for detection of introduced latency and tampering, for aligning video and telemetries for later analysis of recorded material, i.e inspection, surveying, monitoring in agriculture, mining, building, or for 3D object analysis (such as SLAM or in drone deployment).

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein. A non-transitory computer readable medium containing computer instructions that, when executed by a computer processor, cause the processor to perform at least part of the steps described herein.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments and are not therefore to be considered limiting in scope:

FIG. 2a illustrates a table of the various classification levels of autonomous car is according to the Society of Automotive Engineers (SAE) J3016 standard;

FIG. 8 illustrates schematically a simplified schematic block diagram arrangement of two enclosures communicating over a wireless network.

DETAILED DESCRIPTION

Figure 1:
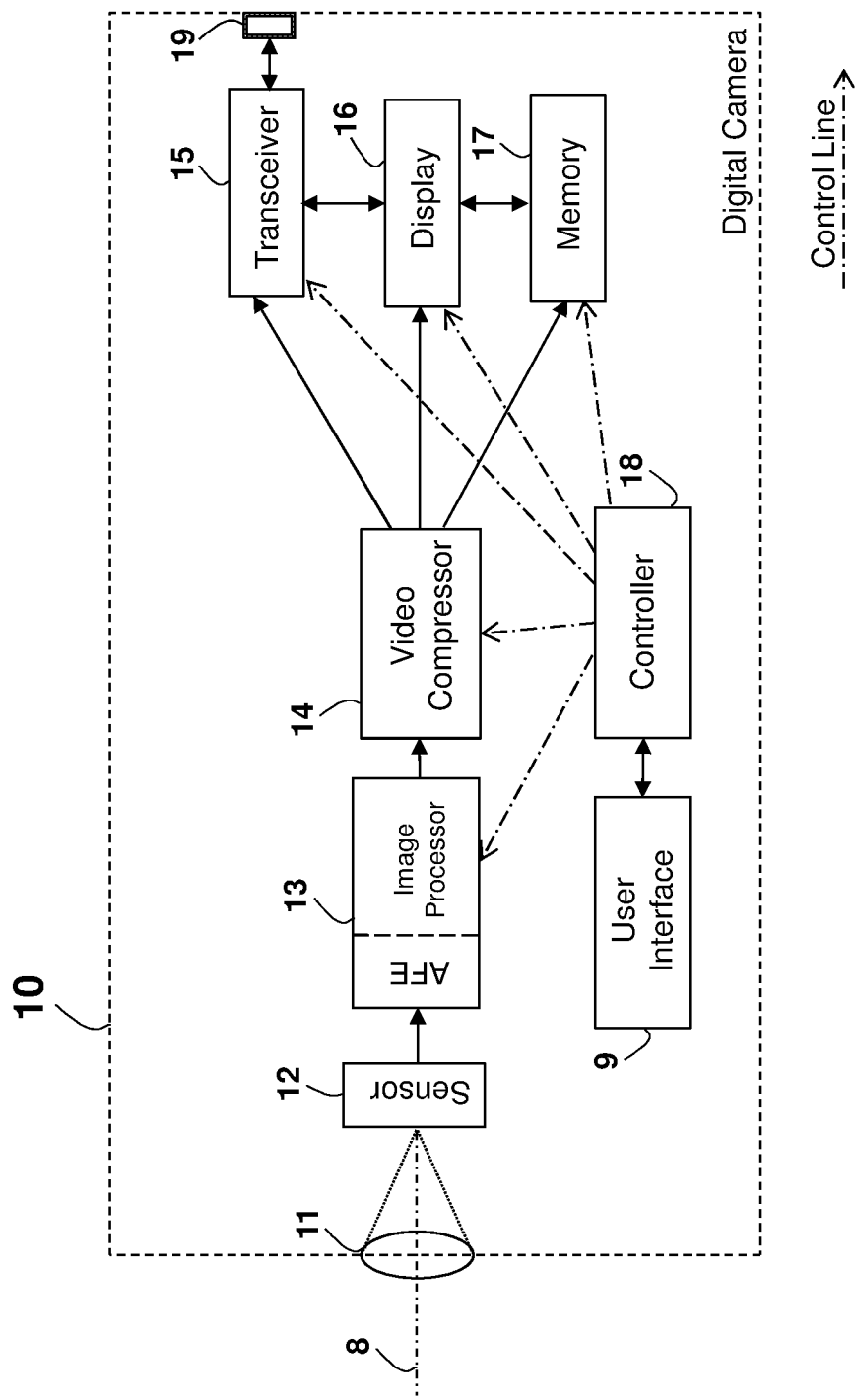
FIG. 1 illustrates schematically a simplified schematic block diagram of a prior-art digital video camera.
Figure 2:
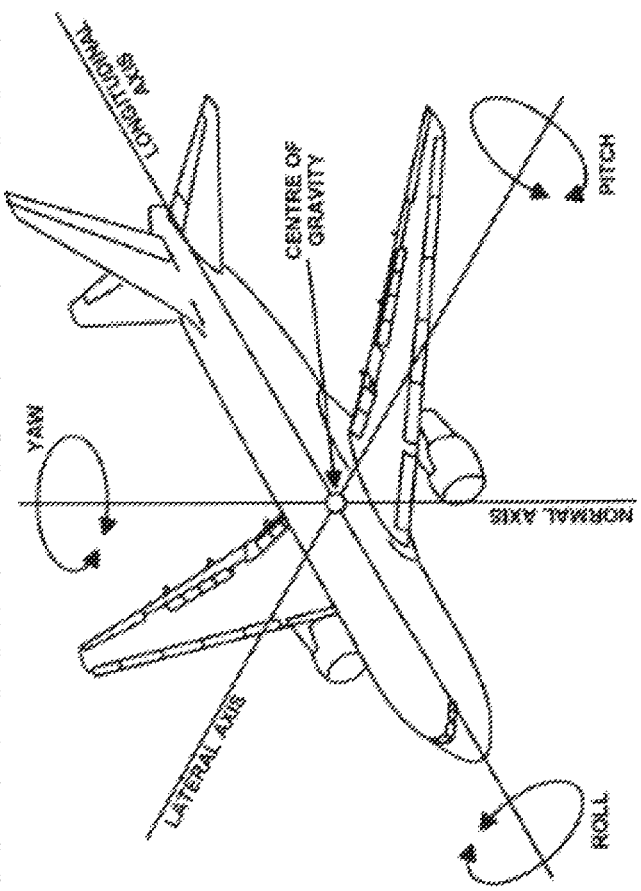
FIG. 2 depicts pictorially definitions of an aircraft axes and motion around the axes.
Figure 3A:
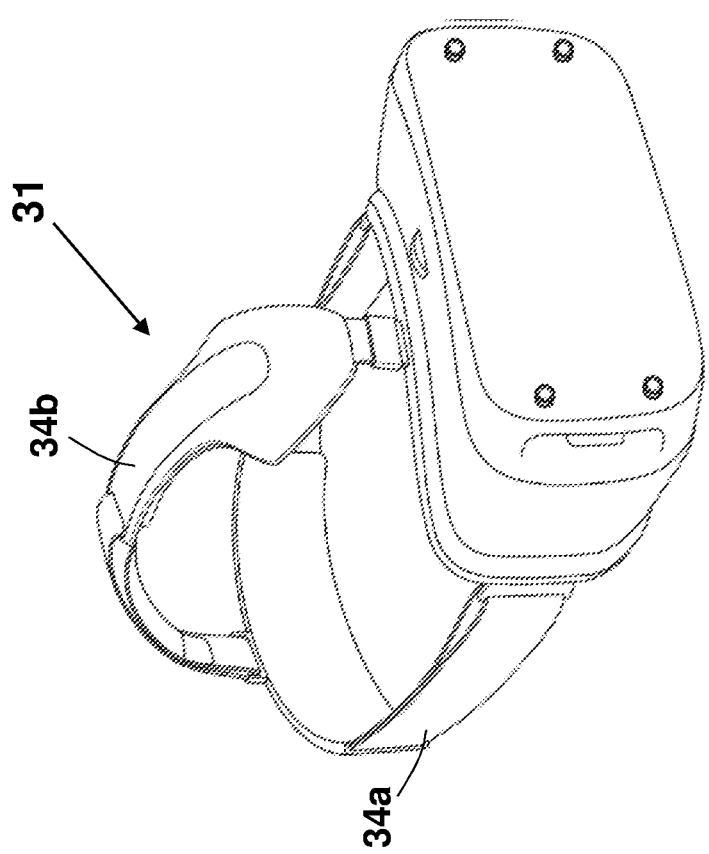
FIG. 3a depicts schematically an HMD for a VR application.
Figure 3B:
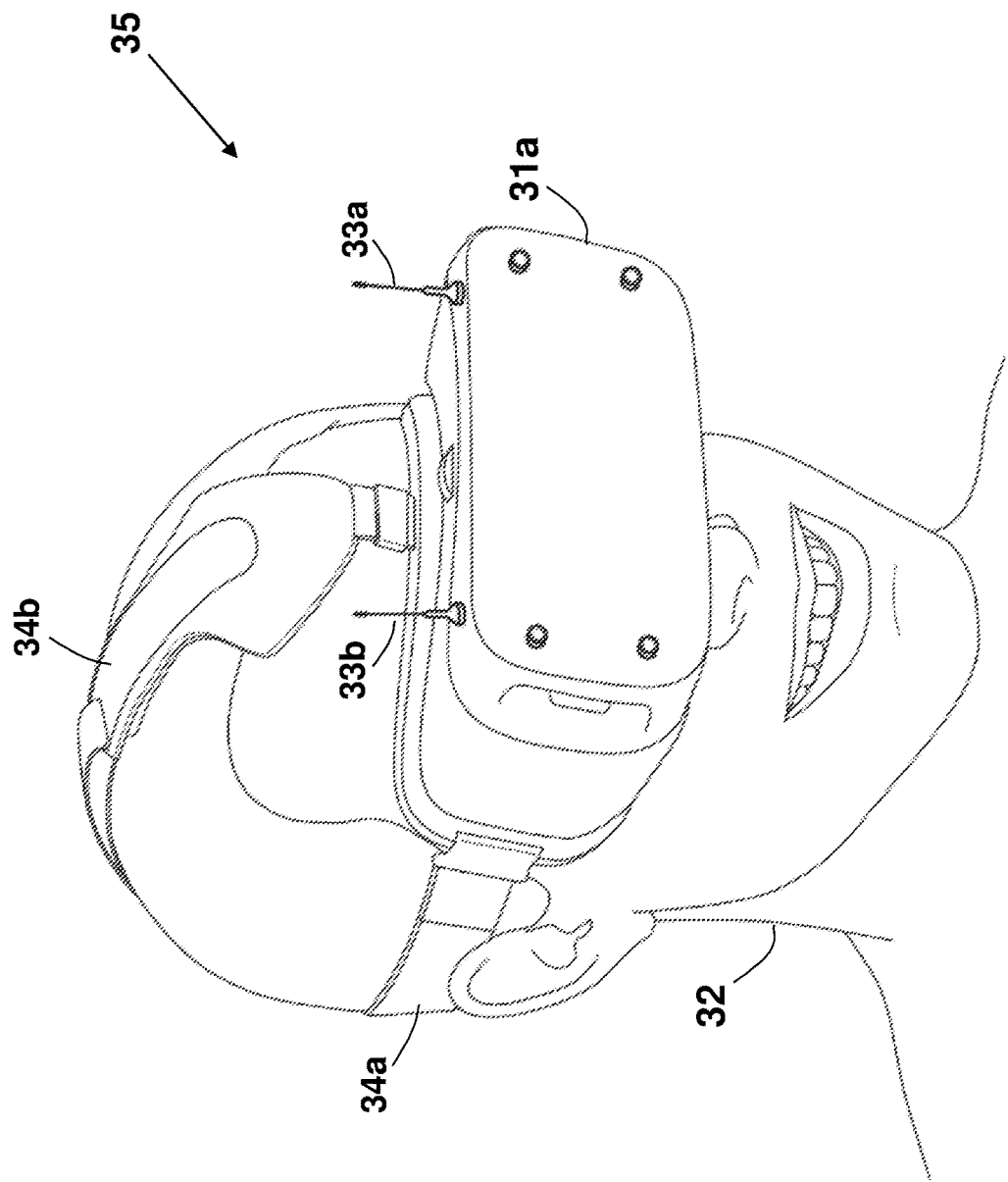
FIG. 3b depicts schematically a person wearing an HMD.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, similar, or having similar functionality. It is readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a", "an", and "the" herein include plural referents unless the context clearly dictates otherwise. Thus, for example, a reference to "a component surface" includes a reference to one or more of such surfaces. By the term "substantially" it is meant that the recited characteristic, parameter, feature, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention. Spatially relative terms, such as "inner," "outer," "beneath", "below", "right", "left", "upper", "lower", "above", "front", "rear", "left", "right" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term 'Horizontal' herein refers to include a direction, line, surface, or plane that is parallel or substantially parallel to the plane of the horizon. The term 'substantially horizontal' includes a direction, line, surface, or plane that is forming an angle of less than 20°, 18°, 15°, 13°, 10°, 8°, 5°, 3°, 2°, 1°, 0.8°, 0.5°, 0.3°, 0.2°, or 0.1° from an ideal horizontal line. The term 'Vertical' herein refers to include a direction, line, surface, or plane that is an upright or parallel or at right angles to a horizontal plane. The term 'substantially vertical' includes a direction, line, surface, or plane that is forming an angle of less than 20°, 18°, 15°, 13°, 10°, 8°, 5° 3° 2°, 1°, 0.8°, 0.5°, 0.3°, 0.2°, or 0.1° from an ideal vertical.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

Figure 4:
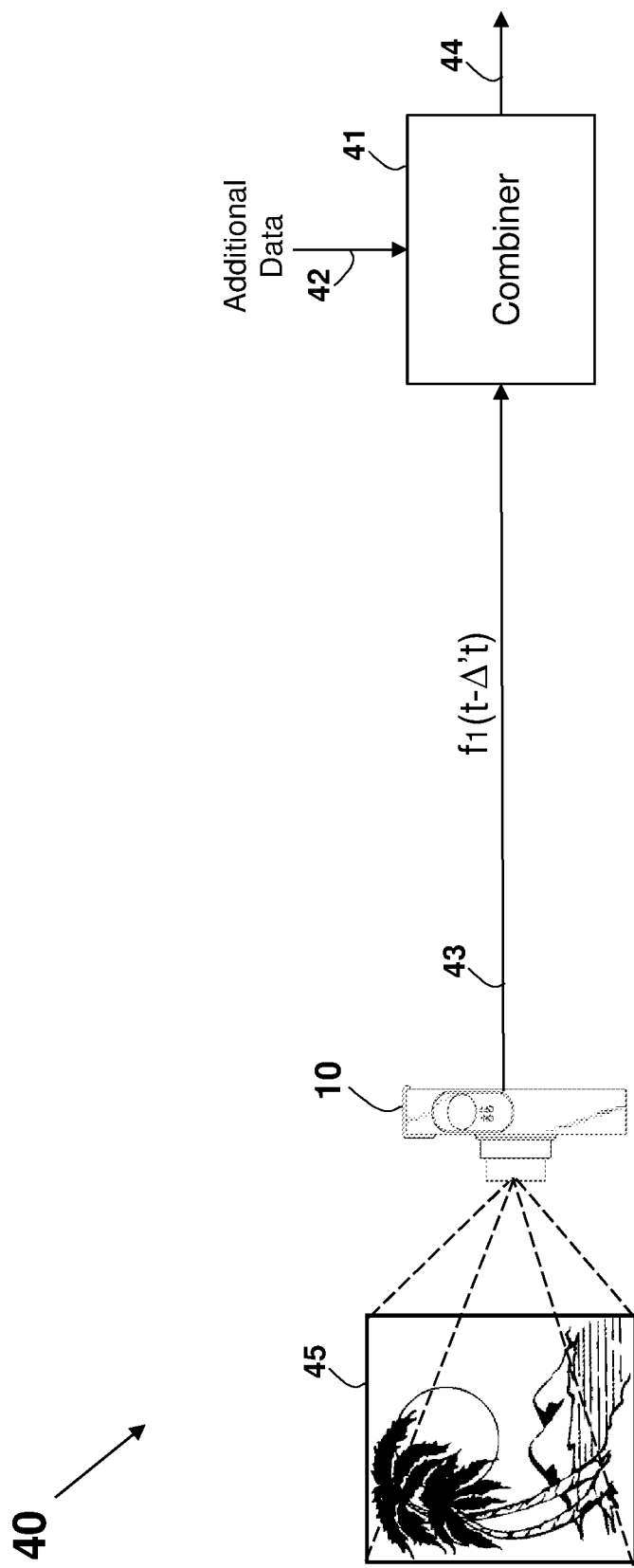
FIG. 4 illustrates schematically a prior-art simplified schematic block diagram arrangement of capturing an image by a digital video camera and using the resulted video data stream.
Figure 5:
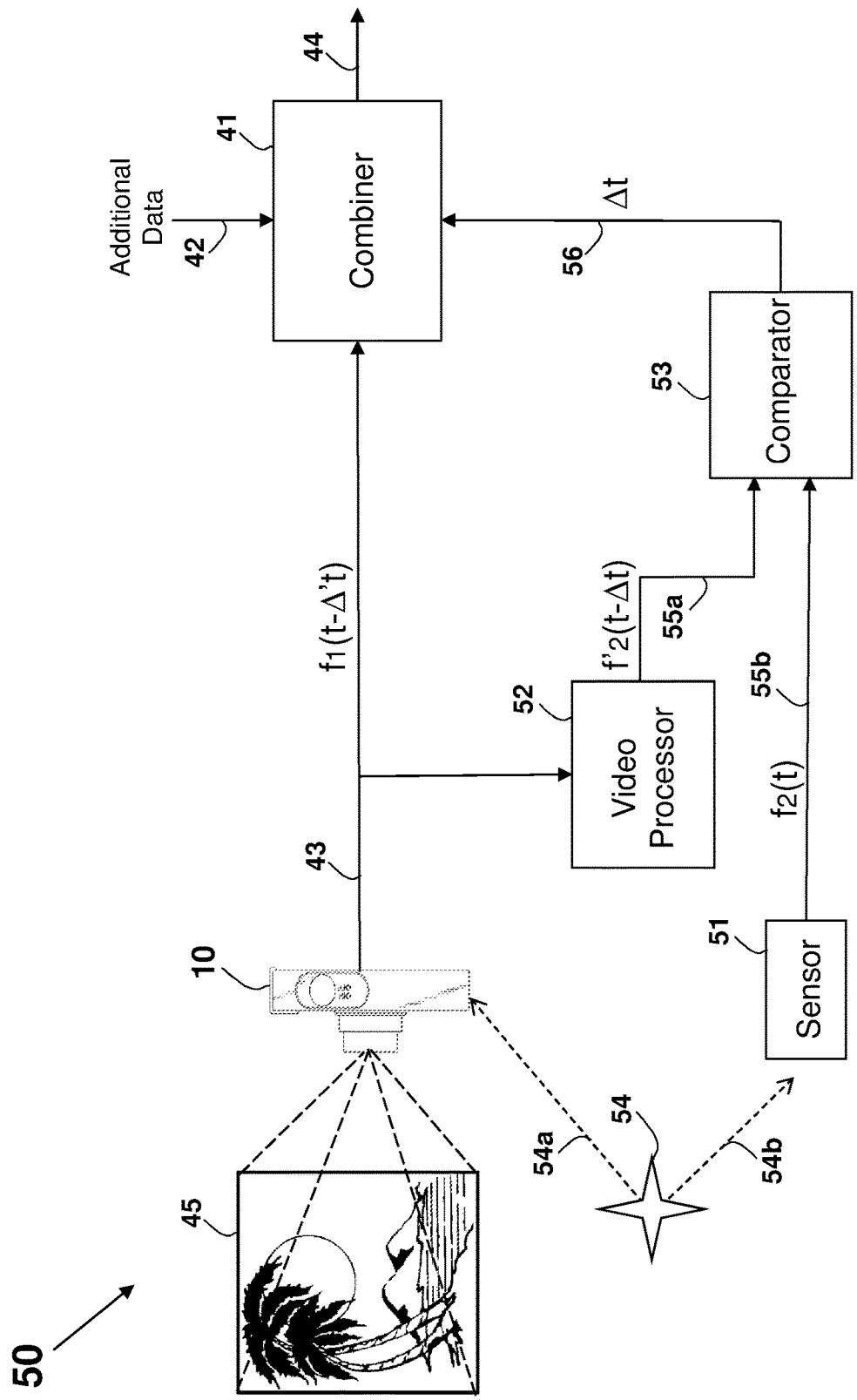
FIG. 5 illustrates schematically a simplified schematic block diagram arrangement of estimating and using a delay associated with a video data stream based on physical phenomenon affecting a sensor and a camera.

An example of an arrangement 50 that may be used to estimate or measure an actual delay of a video data stream is shown in FIG. 5, and is based on the arrangement 40 shown in FIG. 4. The arrangement 50 includes a physical phenomenon 54, pictorially illustrated as a 'star' shape. A sensor 51 may be used for sensing the physical phenomenon 54, and may produce an output signal f2(t) 55b that represents, or is associated with, the time changing characteristic or value of the physical phenomenon 54. For example, output signal f2(t) 55b may be a measurement, an estimation, or an indication of the status or magnitude of the sensed or detected physical phenomenon 54. It is assumed that the delay or latency induced from the actual physical phenomenon affect or value until outputted by the sensor 51 is negligible, and is thus assumed zero.

The video camera 10 and the sensor 51 are assumed to be both affected similarly or differently by the physical phenomenon 54, as illustrated by respective dashed lines 54a and 54b. For example, the video camera 10 and the sensor 51 may be mechanically attached (or otherwise coupled) so that both may sense a mechanical related physical phenomenon 54, or they may be in the same location or in vicinity of each other (such as in a same enclosure) so they are both affected by the same physical phenomenon 54.

A video processor 52 received the video data stream 43 and applies an video processing algorithm for extracting the effect of the physical phenomenon 54, and produces a signal 55a f'2(t-Δt) that represents the effect of the physical phenomenon 54. In one example, the signal 55a f'2(t-Δt) may comprise an estimation, a calculation, or an indication of the change in time of a magnitude or value of the physical phenomenon 54, based on analyzing the video data stream 43. Preferably, the output signal 55a f'2(t-Δt) may be similar to the representation of the physical phenomenon 54 as sensed by the sensor 51 and represented by the signal f2(t) 55b that is output from the sensor 51. The time delay Δt represents the delay at the video processor 52 output from the actual occurrence of the physical phenomenon 54. In one example, the delay induced by the video processor 52 itself in ineligible, thus can be assumed as zero, so that Δt=Δ't. In another example, the delay induced by the video processor 52 itself is fixed in time, such as δt, so that Δt=Δ't+δt. In any case, the value of Δt may be used to calculate or estimate Δ't, such as by Δ't=Δt−δt.

In one example, the output signals f'2(t-Δt) 55a and f2(t) 55b are identical or somewhat similar, since they are both derived from, are associated with, or represents in some way, the same physical phenomenon 54, with the exception of one signal being delayed by Δt from the other. A comparator 53 compares the two signals to each other, and estimates the delay time Δt 56 at its output. The estimated delay time Δt 56 may be fed to the combiner 41, to be used therein for synchronizing the additional data 42 with the video data stream 43, for obtaining low-error time alignment at the output 44.

The video camera 10 may correspond to the digital camera shown in FIG. 1, and may comprises an optical lens for focusing received light, the lens being mechanically oriented to guide a captured image; a photosensitive image sensor array disposed approximately at an image focal point plane of the optical lens for capturing the image and producing an analog signal representing the image; and an analog-to-digital (A/D) converter coupled to the image sensor array for converting the analog signal to the digital video stream. Further, the image sensor array may operative to respond to a visible or non-visible light, which may be infrared, ultraviolet, X-rays, or gamma rays. The image sensor array may comprise, use, or may be based on, semiconductor elements that use the photoelectric or photovoltaic effect, such as Charge-Coupled Devices (CCD) or Complementary Metal-Oxide-Semiconductor Devices (CMOS) elements.

Further, the digital video camera further comprises an image processor coupled to the image sensor array for providing the video data stream according to a digital video format, that may use, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standards. Further, the video data stream may be in a High-Definition (HD) or Standard-Definition (SD) format, and may further be based on, may be compatible with, or may be according to, ISO/IEC 14496 standard, MPEG-4 standard, or ITU-T H.264 standard.

In one example, the time delay value Δt 56 is estimated continuously by the comparator 53, providing a continuous and time-changing updated value to be used by the combiner 41. Alternatively or in addition, the time delay value Δt 56 may be estimated once or in response to an event, and thereafter last estimated value is used by the combiner 41. For example, the time delay value Δt 56 may be estimated as part of a power-up process (or software boot process) of a device or upon a request or a user, and the unchanged value is used afterwards. Alternatively or in addition, the time delay value Δt 56 may be periodically estimated, where an estimated value is used until the next estimation process is concluded, and then the updated value is used. The time period between consecutive value estimation may be equal to, less than, or more than 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, or 1 months. The periodically or continuously updating the estimation of the time delay value Δt 56 may be useful in configurations where the delay Δ't may change over time due to environmental or operational changes in the system.

Any technique or method for estimating the time delay value Δt 56 may be used by the comparator 53. In one example, a convolution or correlation technique is used for comparing the two incoming signals f'2(t-Δt) 55a and f2(t) 55b for estimating the resulting time delay value Δt 56. A cross-correlation operation may be used, where one of signals is time shifted using a varied delay, and a cross-correlation coefficient of the time shifted signal and the second incoming signals is calculated. The time shift that results in the maximum value of the cross-correlation coefficient, such as by using peak-detection mechanism, may be used as the estimated time delay value Δt 56.

Alternatively or in addition, the comparator 53 may use any of the various methods for Time-Delay Estimation (TDE) in linear dynamic systems that are described in a thesis by "*A Survey and Comparison of Time-Delay Estimation Methods in Linear Systems*" by Svante Bjorklund, published 2003 by the Department of Electrical Engineering, Linkopings Universitet, Linkoping, Sweden [ISBN-91-7373-870-0], or the comparator 53 may use any of the various methods for Time-Delay Estimation (TDE) in linear dynamic systems that are described in a Report no.: LiTH-ISY-R-2554 entitled: "A Review of Time-Delay Estimation Techniques" and published Dec. 30, 2003, by Svante Bjorklund and Lennart Ljung of the Control & Communication, Department of Electrical Engineering, Linkopings Universitet, SE-58183 Linkoping, Sweden, which are both incorporated in their entirety for all purposes as if fully set forth herein. A classification according to underlying principles of TDE methods is described, where the main classes are: 1) Time-Delay Approximation Methods: The time-delay is estimated from a relation (a model) between the input and output signals expressed in a certain basis. The time delay is not an explicit parameter in the model. 2) Explicit Time-Delay Parameter Methods: The time-delay is an explicit parameter in the model. 3) Area and Moment Methods: The time-delay is estimated from certain integrals of the impulse and step responses. 4) Higher Order Statistics Methods.

Alternatively or in addition, the comparator 53 may use any of the various techniques which are useful for time alignment that are described in a paper entitled: "*Time Alignment Techniques for Experimental Sensor Data*" by Matthew Rhudy of Lafayette College, Easton, PA, 18042, USA [DOI: 10.5121/ijcses.2014.5201], presented on April 2014 at International Journal of Computer Science & Engineering Survey (IJCSES) Vol. 5, No. 2, which is incorporated in its entirety for all purposes as if fully set forth herein.

Alternatively or in addition, the comparator 53 may use any of the five different time delay estimation methods are described in a paper entitled "*A Comparative Study of Time-Delay Estimation Techniques Using Microphone Arrays*" by Yushi Zhang and Waleed H. Abdulla, published 2005 as 'School of Engineering Report No. 619' by Department of Electrical and Computer Engineering, The University of Auckland, Private Bag 92019, Auckland, New Zealand, which is incorporated in its entirety for all purposes as if fully set forth herein. These methods are cross-correlation (CC), phase transform (PHAT), maximum likelihood estimator (ML), adaptive least mean square filter (LMS) and average square difference function (ASDF). Their simulation results are compared in terms of computation complexity, hardware implementation, precision, and accuracy. Since the performances of the TDE methods are considerably degraded by the signal-to-noise ratio (SNR) level, this factor has been taken as a prime factor in benchmarking the different methods Alternatively or in addition, the comparator 53 may use the MATLAB function 'finddelay' used for estimating delay(s) between signals, described in https://www.mathworks.com/help/signal/ref/finddelay.html downloaded from the Internet on January 2019 provided by The MathWorks®, Inc., which is incorporated in its entirety for all purposes as if fully set forth herein.

Alternatively or in addition, the comparator 53 may use, or may be based on, a system and process for estimating the time delay of arrival (TDOA) between a pair of audio sensors of a microphone array, which is presented in U.S. Pat. No. 7,113,605 to Rui et al. entitled: "System and process for time delay estimation in the presence of correlated noise and reverberation", which is incorporated in its entirety for all purposes as if fully set forth herein. Generally, a generalized cross-correlation (GCC) technique is employed. However, this technique is improved to include provisions for both reducing the influence (including interference) from correlated ambient noise and reverberation noise in the sensor signals prior to computing the TDOA estimate. Two unique correlated ambient noise reduction procedures are also proposed. One involves the application of Wiener filtering, and the other a combination of Wiener filtering with a Gnn subtraction technique. In addition, two unique reverberation noise reduction procedures are proposed. Both involve applying a weighting factor to the signals prior to computing the TDOA which combines the effects of a traditional maximum likelihood (TML) weighting function and a phase transformation (PHAT) weighting function.

In one example, the two incoming signals f'2(t-Δt) 55a and f2(t) 55b are carried or represented as analog or digital electrical signals. Alternatively or in addition, then the comparator 53 may use, or may be based on, evaluating a delay between the first signal and the second signal by deriving from the first signal substantially aperiodic events, possibly by using a zero-crossing detector on a random signal, and using these events to define respective segments of the second signal, as presented in U.S. Pat. No. 6,539,320 to Szajnowski et al. entitled: "Time delay determination and determination of signal shift", which is incorporated in its entirety for all purposes as if fully set forth herein. The segments are combined, e.g., by averaging, to derive a waveform which includes a feature representing coincidences of parts of the second signal associated with the derived events. The delay is determined from the position within the waveform of this feature.

Alternatively or in addition, the comparator 53 may use, or may be based on, plural independent delay lines are connected in parallel and receive a first signal taken from a first point, as described in U.S. Pat. No. 4,779,215 to Moisan et al. entitled: "Method and device for measuring by correlation, in real time, the delays between matching electrical signals", which is incorporated in its entirety for all purposes as if fully set forth herein. Samples of the first signal are taken at different sampling frequencies and are respectively stored in the several delay lines. Samples of a second signal are taken from a second point and are stored in a direct line at one of the frequencies. The correlation function between the samples of the direct line and the samples of one of the delay lines is calculated. Exemplary applications include measuring the speed of a linearly translating object, such as a web of paper.

It may practically beneficial to compare the two incoming signals f2(t-Δt) 55*a* and f2(t) 55*b* for estimating the resulting time delay value Δt 56 during a pre-set time-interval. Such time interval may be equal to, less than, or more than, 1 millisecond, 2 milliseconds, 5 milliseconds, 10 milliseconds, 20 milliseconds, 30 milliseconds, 50 milliseconds, 100 milliseconds, 200 milliseconds, 500 milliseconds, 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, or 10 hours.

Any timing information or time related measurements may use timers that may be implemented as a monostable circuit, producing a pulse of set length when triggered. In one example, the timers are based on RC based popular timers such as 555 and 556, such as ICM7555 available from Maxim Integrated Products, Inc. of Sunnyvale, California, U.S.A., described in the data sheet "General Purpose Timers" publication number 19-0481 Rev. 2 11/92, which is incorporated in its entirety for all purposes as if fully set forth herein. Examples of general timing diagrams as well as monostable circuits are described in application Note AN170 "NE555 and NE556 applications" from Philips semiconductors dated December 1988, which is incorporated in its entirety for all purposes as if fully set forth herein. Alternatively, a passive or active delay line may be used. Further, a processor based delay line can be used, wherein the delay is set by its firmware, typically as a service of the operation system.

The comparator 53 may be based on comparing timings of two corresponding discrete events respectively in the two incoming signals f2(t-Δt) 55*a* and f2(t) 55*b*, for estimating the resulting time delay value Δt 56 during a pre-set time-interval.

Figure 7:
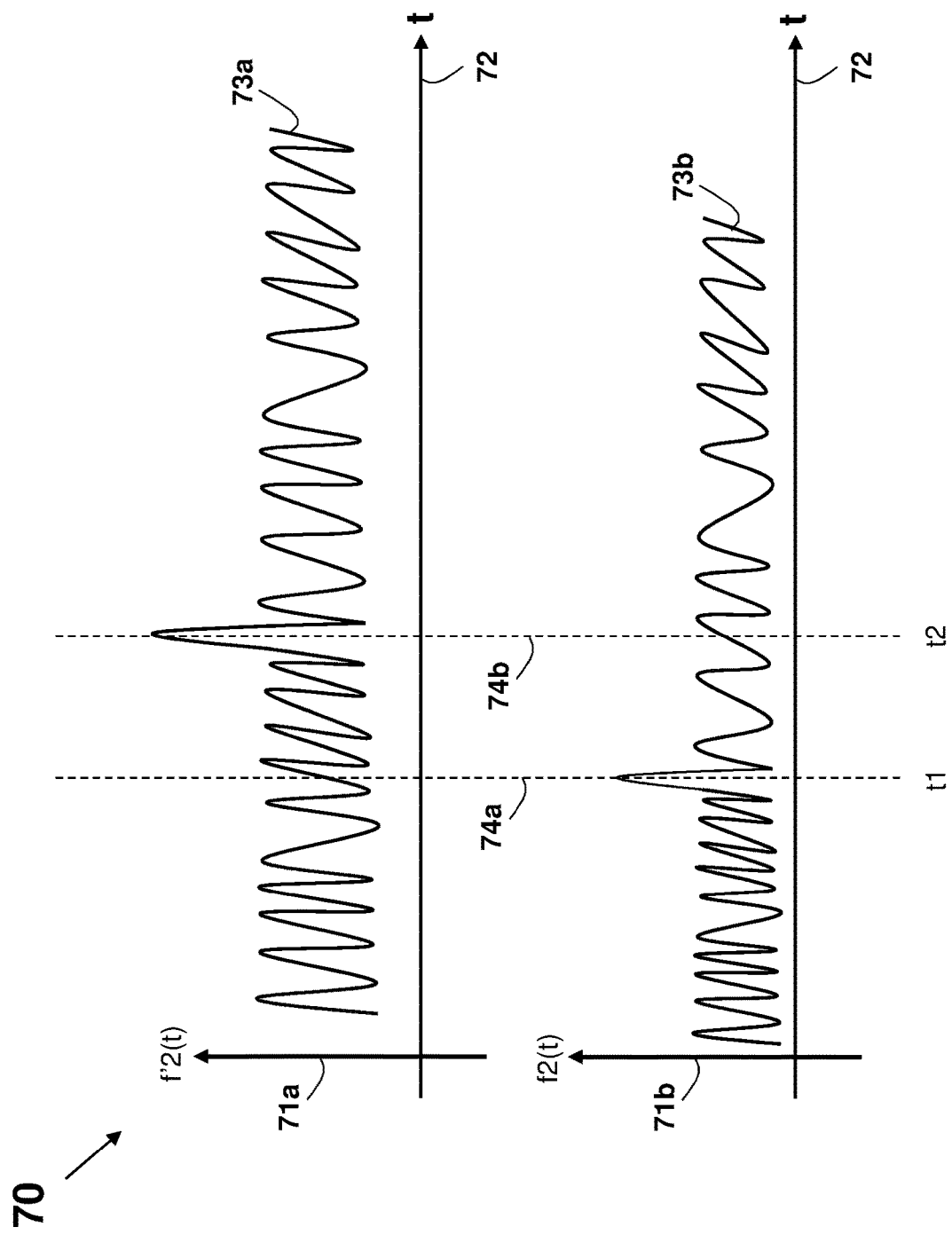
FIGS. 7 and 7a illustrate schematically two compared graphs corresponding to two signals.

Such an example is shown in a view 70 shown in FIG. 7. The lower graph includes a magnitude axis 71*b* versus a time axis 72, showing a magnitude 73*b* (such as an amplitude) of the f2(t) signal 55*b*. The higher graph includes a magnitude axis 71*a* versus the same time axis 72, showing a magnitude 73*a* (such as an amplitude) of the f2(t) signal 55*a*. A defined event may be a peak detection in the signals. A peak value regarding the signal 73*b* (corresponding to the signal f2(t) 55*b*) is detected in a time point t1 74*a*, and a peak value regarding the signal 73*a* (corresponding to the signal f2(t) 55*a*) is detected in a time point t2 74*b*. In such a case, the estimated time delay Δt 56 may be calculated or estimated as Δt=t2−t1.

Figure 7A:
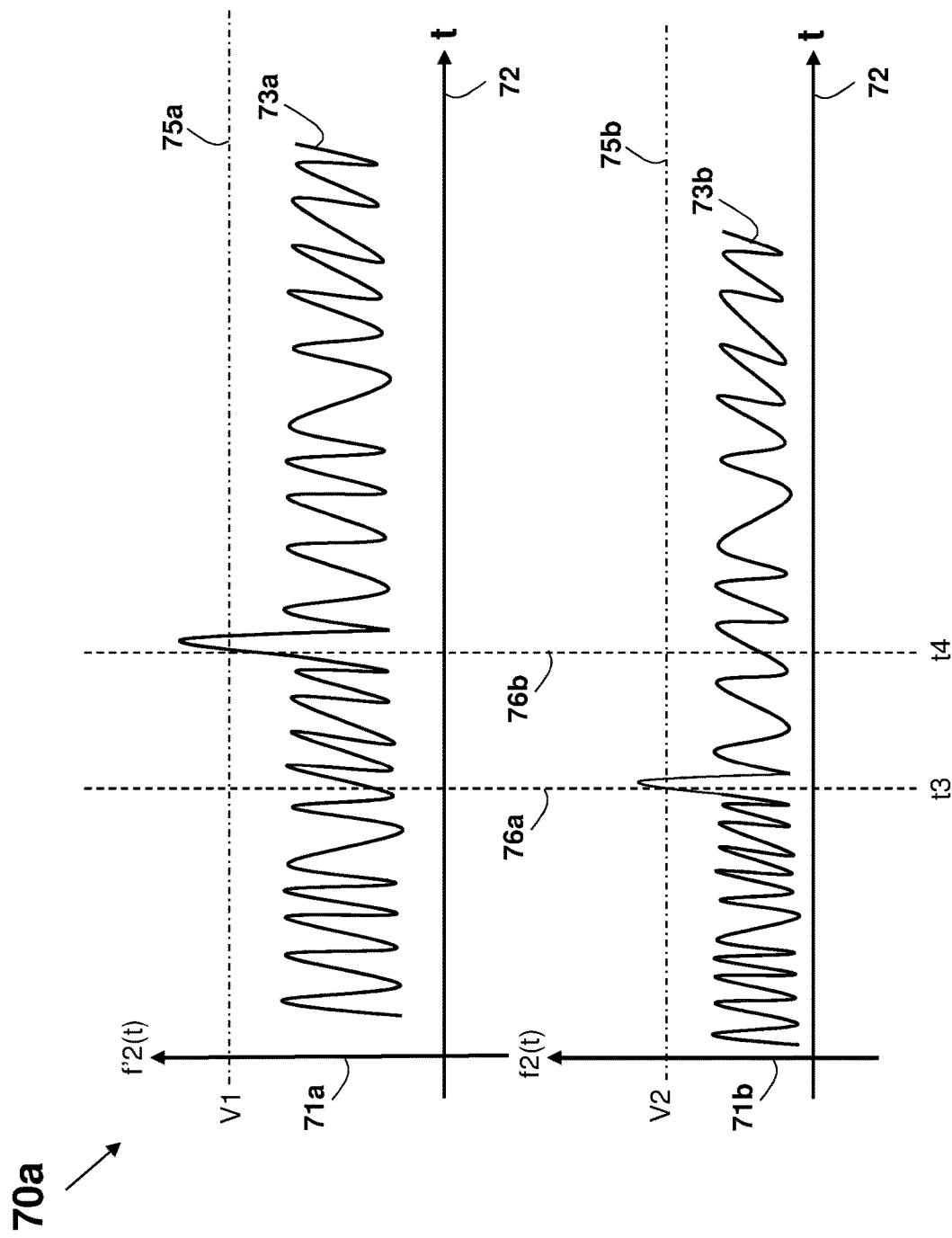

In another example, the event may be associated with a pre-defined threshold, as shown in a view 70*a* shown in FIG. 7*a*. The lower graph includes the magnitude axis 71*b* versus the time axis 72, showing a magnitude 73*b* (such as an amplitude) of the f2(t) signal 55*b*. The higher graph includes the magnitude axis 71*a* versus the same time axis 72, showing the magnitude 73*a* (such as an amplitude) of the f2(t) signal that corresponds to signal f2(t-Δt) 55*a* in FIG. 5. A defined event may be crossing a threshold value. A threshold value V2 75*b* is associated with the f2(t) signal 55*b*, and the signal 73*b* exceeds the threshold V2 75*b* at a time point t3 76*a*. A threshold value V1 75*a* is associated with the f2(t) signal 55*a*, and the signal 73*a* exceeds the threshold V1 75*a* at a time point t4 76*b*. In such a case, the estimated time delay Δt 56 may be calculated or estimated as Δt=t4−t3.

The peak detection mechanism as shown in the view 70 in FIG. 7, or the threshold crossing mechanism as shown in the view 70*a* in FIG. 7*a*, may be applied directly to the signal at the output of the video processor 52, or to the sensor 51 output, or to both. Further, any other signal analysis may be equally applied. Alternatively or in addition, the peak detection mechanism, the threshold crossing mechanism, or any other time delay estimation mechanism, may be applied to any function of the video processor 52, to the sensor 51 output, or to both.

Any function, discrete or continuous, monotonic or non-monotonic, may be used to manipulate the video processor 52, the sensor 51 output, or both, before applying any time delay estimation or comparing. The function may be an elementary function that is built from basic operations (e.g. addition, exponentials, and logarithms) such as an Algebraic function that can be expressed as the solution of a polynomial equation with integer coefficients, Polynomials that may be addition, multiplication, and exponentiation, such as Linear function (First degree polynomial, graph is a straight line), Quadratic function (Second degree polynomial, graph is a parabola), Cubic function (Third degree polynomial), Quartic function (Fourth degree polynomial), Quintic function (Fifth degree polynomial), Sextic function (Sixth degree polynomial), or Rational functions (A ratio of two polynomials). Similarly, the function may be an Nth root based, such as a Square root or a Cube root. Alternatively or in addition, a non-algebraic function may be used, such as a Transcendental function, that may be Exponential function that raises a fixed number to a variable power, Hyperbolic functions that uses trigonometric functions, Logarithmic function, or a Power function that raises a variable number to a fixed power. The function may be a periodic function such as a trigonometric functions, that may use or include sine, cosine, tangent, cotangent, secant, cosecant, exsecant, excosecant, versine, coversine, vercosine, covercosine, haversine, hacoversine, havercosine, or hacovercosine, typically used in geometry.

Time-frequency Analysis. A time-frequency analysis comprises those techniques that study a signal in both the time and frequency domains simultaneously, using various time-frequency representations. Rather than viewing a 1-dimensional signal (a function, real or complex-valued, whose domain is the real line) and some transform (another function whose domain is the real line, obtained from the original via some transform), time-frequency analysis studies a two-dimensional signal—a function whose domain is the two-dimensional real plane, obtained from the signal via a time-frequency transform. Time-Frequency analysis is described in an article by Rolf Hut (September 2004) entitled: "Time Frequency Analysis—a Comparison between cochlear modeling and existing methods", and in an article by Franz Hlawatsch and Gerald Matz (of the Institute of Communications and radio-Frequency Engineering, Vienna University of Technology) entitled: "Time-Frequency Signal Processing: A Statistical Perspective", which are both incorporated in their entirety for all purposes as if fully set forth herein. One of the most basic forms of time-frequency analysis is the Short-Time Fourier Transform (STFT), but more sophisticated techniques have been developed, such as wavelets.

There are several different ways to formulate a valid time-frequency distribution function, resulting in several well-known time-frequency distributions, such as: Short-time Fourier transform (including the Gabor transform); Wavelet transform; Bilinear time-frequency distribution function (Wigner distribution function, or WDF); and Modified Wigner distribution function or Gabor-Wigner distribution function.

Alternatively or in addition, a frequency-domain analysis is performed before applying further mechanism, such as peak detection or threshold crossing. A frequency-domain representation can also include information on the phase shift that must be applied to each sinusoid in order to be able to recombine the frequency components to recover the original time signal. An example for such conversion may be the Fourier transform, which converts the time-function into a sum of sine waves of different frequencies, each of which represents a frequency component. The 'spectrum' of frequency components is the frequency domain representation of the signal. The inverse Fourier transform converts the frequency domain function back to a time function. A spectrum analyzer is the tool commonly used to visualize real-world signals in the frequency domain. Some specialized signal processing techniques use transforms that result in a joint time-frequency domain, with the instantaneous frequency being a key link between the time domain and the frequency domain.

There are a number of different mathematical transforms that may be used to analyze time domain functions and are referred to as "frequency domain" methods. The most common transforms are Fourier series, Fourier transform, Laplace transform, Z transform, and Wavelet transform. The Fourier transform of a periodic signal only has energy at a base frequency and its harmonics. Another way of saying this is that a periodic signal can be analyzed using a discrete frequency domain. Dually, a discrete-time signal gives rise to a periodic frequency spectrum. Combining these two, if we start with a time signal that is both discrete and periodic, we get a frequency spectrum which is both periodic and discrete. This is the usual context for a discrete Fourier transform. Converting to frequency domain as part of any "Frequency-Domain" herein may include, may use, or may be based on, one or more of the methods described in articles by Boualem Boashash published in Proceedings of the IEEE, Vol. 80, No. 4, April 1992 (0018-9219/92$03.00, 1992 IEEE) entitled: "Estimating and Interpreting The Instantaneous Frequency of a Signal-Part 1: Fundamentals", and "Estimating and Interpreting The Instantaneous Frequency of a Signal-Part 2: Algorithms and Applications", and in an article by Jonatan Lerga (of University of Rijeka) entitled: "Overview of Signal Instantaneous Frequency Estimation Methods", which are all incorporated in their entirety for all purposes as if fully set forth herein.

Any function, discrete or continuous, monotonic or non-monotonic, may be applied to the signal at the output of the video processor 52, to the sensor 51 output, or to both. The function may be an elementary function that is built from basic operations (e.g. addition, exponentials, and logarithms) such as an Algebraic function that can be expressed as the solution of a polynomial equation with integer coefficients, Polynomials that may be addition, multiplication, and exponentiation, such as Linear function (First degree polynomial, graph is a straight line), Quadratic function (Second degree polynomial, graph is a parabola), Cubic function (Third degree polynomial), Quartic function (Fourth degree polynomial), Quintic function (Fifth degree polynomial), Sextic function (Sixth degree polynomial), or Rational functions (A ratio of two polynomials). Similarly, the function may be an Nth root based, such as a Square root or a Cube root. Alternatively or in addition, a non-algebraic function may be used, such as a Transcendental function, that may be Exponential function that raises a fixed number to a variable power, Hyperbolic functions that uses trigonometric functions, Logarithmic function, or a Power function that raises a variable number to a fixed power. The function may be a periodic function such as a trigonometric functions, that may use or include sine, cosine, tangent, cotangent, secant, cosecant, exsecant, excosecant, versine, coversine, vercosine, covercosine, haversine, hacoversine, havercosine, or hacovercosine, typically used in geometry.

Any element capable of measuring or responding to a physical phenomenon may be used as the sensor 51. An appropriate sensor may be adapted for a specific physical phenomenon, such as a sensor responsive to temperature, humidity, pressure, audio, vibration, light, motion, sound, proximity, flow rate, electrical voltage, and electrical current. The sensor 51 may be an analog sensor having an analog signal output such as analog voltage or current, or may have continuously variable impedance. Alternatively on in addition, the sensor 51 may have a digital signal output. The sensor 51 may serve as a detector, notifying only the presence of a phenomenon, such as by a switch, and may use a fixed or settable threshold level. The sensor 51 may measure time-dependent or space-dependent parameters of a phenomenon. The sensor 51 may measure time-dependencies or a phenomenon such as the rate of change, time-integrated or time-average, duty-cycle, frequency or time period between events. The sensor 51 may be a passive sensor, or an active sensor requiring an external source of excitation. The sensor 51 may be semiconductor-based, and may be based on MEMS technology.

The sensor 51 may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, a sensor may measure the flux (or flow) of a property through a cross-section or surface boundary, the flux density, or the current. In the case of a scalar field, a sensor may measure the quantity gradient. A sensor may measure the amount of property per unit mass or per mole of substance. A single sensor may be used to measure two or more phenomena.

The sensor 51 may provide an electrical output signal $f2(t)$ 55b in response to a physical, chemical, biological or any other phenomenon, serving as a stimulus to the sensor. The sensor may serve as, or be, a detector, for detecting the presence of the phenomenon. Alternatively or in addition, a sensor may measure (or respond to) a parameter of a phenomenon or a magnitude of the physical quantity thereof. For example, the sensor 51 may be a thermistor or a platinum resistance temperature detector, a light sensor, a pH probe, a microphone for audio receiving, or a piezoelectric bridge. Similarly, the sensor 51 may be used to measure pressure, flow, force or other mechanical quantities. The sensor 51 output may be amplified by an amplifier connected to the sensor output. Other signal conditioning may also be applied in order to improve the handling of the sensor output or adapting it to the next stage or manipulating, such as attenuation, delay, current or voltage limiting, level translation, galvanic isolation, impedance transformation, linearization, calibration, filtering, amplifying, digitizing, integration, derivation, and any other signal manipulation. Some sensors conditioning involves connecting them in a bridge circuit. In the case of conditioning, the conditioning circuit may added to manipulate the sensor output, such as filter or equalizer for frequency related manipulation such as filtering, spectrum analysis or noise removal, smoothing or de-blurring in case of image enhancement, a compressor (or de-compressor) or coder (or decoder) in the case of a compression or a coding/decoding schemes, modulator or demodulator in case of modulation, and extractor for extracting or detecting a feature or parameter such as pattern recognition or correlation analysis. In case of filtering, passive, active or adaptive (such as Wiener or Kalman) filters may be used. The conditioning circuits may apply linear or non-linear manipulations. Further, the manipulation may be time-related such as analog or digital delay-lines, integrators, or rate-based manipulation. A sensor 51 may have analog output, requiring an A/D to be connected thereto, or may have digital output. Further, the conditioning may be based on the book entitled: "*Practical Design Techniques for Sensor Signal Conditioning*", by Analog Devices, Inc., 1999 (ISBN-0-916550-20-6), which is incorporated in its entirety for all purposes as if fully set forth herein.

Alternatively or in addition, any sensor herein, any sensor technology herein, any sensor conditioning herein or handling circuits, or any sensor application herein, may be according to the book entitled: "*Sensors and Control Systems in manufacturing*", Second Edition 2010, by Sabrie Soloman, The McGraw-Hill Companies, ISBN: 978-0-07-160573-1, according to the book entitled: "*Fundamentals of Industrial Instrumentation and Process Control*", by William C. Dunn, 2005, The McGraw-Hill Companies, ISBN: 0-07-145735-6, or according to the book entitled: "*Sensor technology Handbook*", Edited by Jon Wilson, by Newnes-Elsevier 2005, ISBN: 0-7506-7729-5, which are all incorporated in their entirety for all purposes as if fully set forth herein. Further, the sensor 51 may be any sensor described in U.S. Patent Application Publication No. 2013/0201316 to Binder et al., entitled: "System and Method for Server Based Control", which is incorporated in its entirety for all purposes as if fully set forth herein.

The sensor 51 may directly or indirectly measure the rate of change of the physical quantity (gradient) versus the direction around a particular location, or between different locations. For example, a temperature gradient may describe the differences in the temperature between different locations. Further, a sensor may measure time-dependent or time-manipulated values of the phenomenon, such as time-integrated, average or Root Mean Square (RMS or rms), relating to the square root of the mean of the squares of a series of discrete values (or the equivalent square root of the integral in a continuously varying value). Further, a parameter relating to the time dependency of a repeating phenomenon may be measured, such as the duty-cycle, the frequency (commonly measured in Hertz—Hz) or the period. A sensor may be based on the Micro Electro-Mechanical Systems—MEMS (a.k.a. Micro-mechanical electrical systems) technology. A sensor may respond to environmental conditions such as temperature, humidity, noise, vibration, fumes, odors, toxic conditions, dust, and ventilation.

The sensor 51 may be an active sensor, requiring an external source of excitation. For example, resistor-based sensors such as thermistors and strain gages are active sensors, requiring a current to pass through them in order to determine the resistance value, corresponding to the measured phenomenon. Similarly, a bridge circuit based sensors are active sensors depending or external electrical circuit for their operation. Alternatively or in addition, the sensor 51 may be a passive sensor, generating an electrical output without requiring any external circuit or any external voltage or current. Thermocouples and photodiodes are examples or passive sensors.

The sensor 51 may measure the amount of a property or of a physical quantity or the magnitude relating to a physical phenomenon, body or substance. Alternatively or in addition, the sensor 51 may be used to measure the time derivative thereof, such as the rate of change of the amount, the quantity or the magnitude. In the case of space related quantity or magnitude, the sensor 51 may measure the linear density, relating to the amount of property per length, a sensor may measure the surface density, relating to the amount of property per area, or a sensor may measure the volume density, relating to the amount of property per volume. Alternatively or in addition, the sensor 51 may measure the amount of property per unit mass or per mole of substance. In the case of a scalar field, a sensor may further measure the quantity gradient, relating to the rate of change of property with respect to position. Alternatively or in addition, the sensor 51 may measure the flux (or flow) of a property through a cross-section or surface boundary. Alternatively or in addition, a sensor may measure the flux density, relating to the flow of property through a cross-section per unit of the cross-section, or through a surface boundary per unit of the surface area. Alternatively or in addition, the sensor 51 may measure the current, relating to the rate of flow of property through a cross-section or a surface boundary, or the current density, relating to the rate of flow of property per unit through a cross-section or a surface boundary. The sensor 51 may include or consists of a transducer, defined herein as a device for converting energy from one form to another for the purpose of measurement of a physical quantity or for information transfer. Further, a single sensor may be used to measure two or more phenomena. For example, two characteristics of the same element may be measured, each characteristic corresponding to a different phenomenon.

The sensor 51 output may have multiple states, where the sensor state is depending upon the measured parameter of the sensed phenomenon. The sensor 51 may be based on a two state output (such as '0' or '1', or 'true' and 'false'), such as an electric switch having two contacts, where the contacts can be in one of two states: either "closed" meaning the contacts are touching and electricity can flow between them, or "open", meaning the contacts are separated and the switch is non-conducting. The sensor 51 may be a threshold switch, where the switch changes its state upon sensing that the magnitude of the measured parameter of a phenomenon exceeds a certain threshold. For example, the sensor 51 may be a thermostat is a temperature-operated switch used to control a heating process. Another example is a voice operated switch (a.k.a. VOX), which is a switch that operates when sound over a certain threshold is detected. It is usually used to turn on a transmitter or recorder when someone speaks and turn it off when they stop speaking. Another example is a mercury switch (also known as a mercury tilt switch), which is a switch whose purpose is to allow or interrupt the flow of electric current in an electrical circuit in a manner that is dependent on the switch's physical position or alignment relative to the direction of the "pull" of earth's gravity, or other inertia. The threshold of a threshold based switch may be fixed or settable. Further, an actuator may be used in order to locally or remotely set the threshold level.

In some cases, the sensor 51 operation may be based on generating a stimulus or an excitation to generate influence or create a phenomenon. The entire or part of the generating or stimulating mechanism may be in this case an integral part of the sensor, or may be regarded as independent actuators, and thus may be controlled by the controller.

Further, a sensor and an actuator, independent or integrated, may be cooperatively operating as a set, for improving the sensing or the actuating functionality. For example, a light source, treated as an independent actuator, may be used to illuminate a location, in order to allow an image sensor to faithfully and properly capture an image of that location. In another example, where a bridge is used to measure impedance, the excitation voltage of the bridge may be supplied from a power supply treated and acting as an actuator.

The sensor 51 may be a piezoelectric sensor, where the piezoelectric effect is used to measure pressure, acceleration, strain or force. Depending on how the piezoelectric material is cut, there are three main modes of operation: transverse longitudinal and shear. In the transverse effect mode, a force applied along an axis generates charges in a direction perpendicular to the line of force, and in the longitudinal effect mode, the amount of charge produced is proportional to the applied force and is independent of size and shape of the piezoelectric element. When using as a pressure sensor, commonly a thin membrane is used to transfer the force to the piezoelectric element, while in accelerometer use, a mass is attached to the element, and the load of the mass is measured. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PMN-PT).

The sensor 51 may be a solid state sensor, which is typically a semiconductor device and which have no mobile parts, and commonly enclosed as a chip. The sensor may be according to, or based on, the sensor described in U.S. Pat. No. 5,511,547 to Markle, entitled: "Solid State Sensors", in U.S. Pat. No. 6,747,258 to Benz et al., entitled: "Intensified Hybrid Solid-State Sensor with an Insulating Layer", in U.S. Pat. No. 5,105,087 to Jagielinski, entitled: "Large Solid State Sensor Assembly Formed from Smaller Sensors", or in U.S. Pat. No. 4,243,631 to Ryerson, entitled: "Solid State Sensor", which are all incorporated in their entirety for all purposes as if fully set forth herein.

The sensor 51 may be a nanosensor, which is a biological, chemical or physical sensor constructed using nanoscale components, usually microscopic or submicroscopic in size. A nanosensor may be according to, or based on, the sensor described in U.S. Pat. No. 7,256,466 to Lieber et al., entitled: "Nanosensors", in U.S. Patent Application Publication No. 2007/0264623 to Wang et al., entitled: "Nanosensors", in U.S. Patent Application Publication No. 2011/0045523 to Strano et al., entitled: "Optical Nenosensors Comprising Photoluminescent Nanostructures", or in U.S. Patent Application Publication No. 2011/0275544 to Zhou et al., entitled: "Microfluidic Integration with Nanosensor Platform", which are all incorporated in their entirety for all purposes as if fully set forth herein.

The sensor 51 may include one or more sensors, each providing an electrical output signal (such as voltage or current), or changing a characteristic (such as resistance or impedance) in response to a measured or detected phenomenon. The sensors may be identical, similar or different from each other, and may measure or detect the same or different phenomena. Two or more sensors may be connected in series or in parallel. In the case of a changing characteristic sensor or in the case of an active sensor, the unit may include an excitation or measuring circuits (such as a bridge) to generate the sensor electrical signal. The sensor output signal may be conditioned by a signal conditioning circuit. The signal conditioner may involve time, frequency, or magnitude related manipulations. The signal conditioner may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor, an analog to digital (A/D) converter may be used to convert the conditioned sensor output signal to a digital sensor data. The unit may include a computer for controlling and managing the unit operation, processing the digital sensor data and handling the unit communication. The unit may include a modem or transceiver coupled to a network port (such as a connector or antenna), for interfacing and communicating over a network.

In one example, the video camera 10 is mechanically attached to the sensor 51. For example, the video camera 10 may directly mechanically fixed to the sensor 51. In another example, the video camera 10 may be indirectly mechanically fixed to the sensor 51, such as where they are both attached to another structure (or frame) or component. For example, both the video camera 10 and the sensor 51 are fixedly mounted to the structure or frame of a single enclosure, such as an enclosure 61 shown as part of an arrangement 60 in FIG. 6 or to an enclosure 62 shown as part of an arrangement 60*b* in FIG. 6*b*. Such mechanical attachment may provide a permanent relative connection, so that they both are jointly spatially affected by any moving and positioning. In such a scenario, the sensor 51 may be a position or motion sensor, and the physical phenomenon 54 may relate to the video camera 10 or the joint position or motion. In such a case, a position motion detection techniques, such as egomotion, may be used as part of the VCA performed in the video processor 52.

The sensor 51 may be a clinometer (a.k.a. inclinometer, tilt sensor, slope gauge, and pitch/roll indicator) for measuring angle (or slope or tilt), elevation or depression of an object, or pitch or roll (commonly with respect to gravity), with respect to the earth ground plane, or with respect to the horizon, commonly expressed in degrees. The clinometers may measure inclination (positive slope), declination (negative slope), or both. A clinometer may be based on an accelerometer, a pendulum, or on a gas bubble in liquid. The inclinometer may be a tilt switch, such as a mercury tilt switch, commonly based on a sealed glass envelope which contains a bead or mercury. When tilted in the appropriate direction, the bead touches a set (or multiple sets) of contacts, thus completing an electrical circuit.

The sensor 51 may be an angular rate sensor, and may be according to, or based on, the sensor described in U.S. Pat. No. 4,759,220 to Burdess et al., entitled: "Angular Rate Sensors", in U.S. Patent Application Publication No. 2011/0041604 to Kano et al., entitled: "Angular Rate Sensor", in U.S. Patent Application Publication No. 2011/0061460 to Seeger et al., entitled: "Extension-Mode Angular Velocity Sensor", or in U.S. Patent Application Publication No. 2011/0219873 to OHTA et al., entitled: "Angular Rate Sensor", which are all incorporated in their entirety for all purposes as if fully set forth herein.

The sensor 51 may be a motion sensor, and may include one or more accelerometers, which measures the absolute acceleration or the acceleration relative to freefall. The accelerometer may be piezoelectric, piezoresistive, capacitive, MEMS or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

The sensor 51 may be a position sensor for measuring linear or angular position (or motion). A position sensor may be an absolute position sensor, or may be a displacement (relative or incremental) sensor, measuring a relative position, and may be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Absolute angular position sensor output indicates the current position (angle) of the shaft, while incremental or displacement sensor provides information about the change, the angular speed or the motion of the shaft. An angular position sensor may be of optical type, using reflective or interruption schemes, or may be of magnetic type, such as based on variable-reluctance (VR), Eddy-current killed oscillator (ECKO), Wiegand sensing, or Hall-effect sensing, or may be based on a rotary potentiometer. An angular position sensor may be transformer based such as a RVDT, a resolver or a synchro. An angular position sensor may be based on an absolute or incremental rotary encoder, and may be a mechanical or optical rotary encoder, using binary or gray encoding schemes.

The sensor 51 may be an angular rate sensor, used to measure the angular rate, or the rotation speed, of a shaft, an axle or a disc, and may be electromechanical (such as centrifugal switch), MEMS based, Laser based (such as Ring Laser Gyroscope—RLG), or a gyroscope (such as fiber-optic gyro) based. Some gyroscopes use the measurement of the Coriolis acceleration to determine the angular rate. An angular rate sensor may be a tachometer, which may be based on measuring the centrifugal force, or based on optical, electric, or magnetic sensing a slotted disk.

A position sensor may be a linear position sensor, for measuring a linear displacement or position typically in a straight line, and may use a transformer principle such as such as LVDT, or may be based on a resistive element such as linear potentiometer. A linear position sensor may be an incremental or absolute linear encoder, and may employ optical, magnetic, capacitive, inductive, or eddy-current principles.

The sensor 51 may be a clinometer for measuring angle (such as pitch or roll) of an object, typically with respect to a plane such as the earth ground plane. A clinometer may be based on an accelerometer, a pendulum, or on a gas bubble in liquid, or may be a tilt switch such as a mercury tilt switch for detecting inclination or declination with respect to a determined tilt angle. The sensor 51 may be a gyroscope, for measuring orientation in space, such as the conventional mechanical type, a MEMS gyroscope, a piezoelectric gyroscope, a FOG, or a VSG type.

The sensor 51 may be an absolute, a relative displacement, or an incremental position sensor, and may respond to a linear or angular position, or motion, of a sensed element. The position sensor may be an optical type or a magnetic type angular position sensor, and may respond to an angular position or the rotation of a shaft, an axle, or a disk. The angular position sensor may be based on a variable-reluctance (VR), an Eddy-current killed oscillator (ECKO), a Wiegand sensing, or a Hall-effect sensing, and may be transformer based such as an RVDT, a resolver or a synchro. The angular position sensor may be an electromechanical type such as an absolute or an incremental, mechanical or optical, rotary encoder. The angular position sensor may be an angular rate sensor and may respond to the angular rate, or the rotation speed, of a shaft, an axle, or a disc, and may consist of, or comprise, a gyroscope, a tachometer, a centrifugal switch, a Ring Laser Gyroscope (RLG), or a fiber-optic gyro. The position sensor may be a linear position sensor and may respond to a linear displacement or position along a line, and may consist of, or comprise, a transformer, an LVDT, a linear potentiometer, or an incremental or absolute linear encoder.

In one example, the sensor 51 is a motion sensor, and may include one or more accelerometers, which measures the absolute acceleration or the acceleration relative to freefall. For example, one single-axis accelerometer per axis may be used, requiring three such accelerometers for three-axis sensing. The motion sensor may be a single or multi-axis sensor, detecting the magnitude and direction of the acceleration as a vector quantity, and thus can be used to sense orientation, acceleration, vibration, shock and falling. The motion sensor output may be analog or digital signals, representing the measured values. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., Quartz, tourmaline). Alternatively or in addition, the motion sensor may be based on electrical tilt and vibration switch or any other electromechanical switch.

The sensor 51 may be a position sensor for measuring linear or angular position (or motion). A position sensor may be an absolute position sensor, or may be a displacement (relative or incremental) sensor, measuring a relative position, and may further be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Angles are commonly expressed in radians (rad), or in degrees (°), minutes ('), and seconds ("), and angular velocity commonly uses units of radian per second (rad/s). Absolute angular position sensor output indicates the current position (angle) of the shaft, while incremental or displacement sensor provides information about the change, the angular speed or the motion of the shaft. An angular position sensor may be of optical type, using reflective or interruption schemes. A reflective sensor is based on a light-detector that senses a reflected beam from a light emitter, while an interruptive sensor is based on interrupting the light path between the emitter and the detector. An angular position sensor may be of magnetic type, relying on detection based on the changes in the magnetic field. A magnetic-based angular position sensor may be based on a variable-reluctance (VR), Eddy-Current Killed Oscillator (ECKO), Wiegand sensing, or Hall-effect sensing, used to detect a pattern in the rotating disc. A rotary potentiometer may serve as an angular position sensor.

An angular position sensor may be based on a Rotary Variable Differential Transformer (RVDT), used for measuring the angular displacement by using a type of an electrical transformer. An RVDT is commonly composed of a salient two-pole rotor and a stator consisting of a primary excitation coil and a pair of secondary output coils, electromagnetically coupled to the excitation coil. The coupling is proportional to the angle of the measured shaft; hence the AC output voltage is proportional to the angular shaft displacement. A resolver and a synchro are similar transformer based angular position sensors.

An angular position sensor may be based on a rotary encoder (a.k.a. shaft encoder), used for measuring angular position commonly by using a disc, which is rigidly fixed to the measured shaft, and contain conductive, optical, or magnetic tracks. A rotary encoder may be an absolute encoder, or may be an incremental rotary encoder, where output is provided only when the encoder is rotating. A mechanical rotary encoder use an insulating disc and sliding contacts, which close electrical circuits upon rotation of the disc. An optical rotary encoder uses a disc having transparent and opaque areas, and a light source and a photo detector to sense the optical pattern on the disc. Both mechanical and optical rotary encoders, and may use binary or gray encoding schemes.

The sensor 51 may be an angular rate sensor, used to measure the angular rate, or the rotation speed, of a shaft, an axle or a disk. An angular rate sensor may be electromechanical, MEMS based, Laser based (such as Ring Laser Gyroscope—RLG), or a gyroscope (such as fiber-optic gyro) based. Some gyroscopes use the measurement of the Coriolis acceleration to determine the angular rate.

An angular rate sensor may be a tachometer (a.k.a. RPM gauge and revolution-counter), used to measure the rotation speed of a shaft, an axle or a disk, commonly by units of RPM (Revolutions per Minute) annotating the number of full rotations completed in one minute around the axis. A tachometer may be based on any angular position sensor, for example sensors that are described herein, using further conditioning or processing to obtain the rotation speed. A tachometer may be based on measuring the centrifugal force, or based on sensing a slotted disk, using optical means where an optical beam is interrupted, electrical means where electrical contacts sense the disk, or by using magnetic sensors, such as based on Hall-effect. Further, an angular rate sensor may be a centrifugal switch, which is an electric switch that operates using the centrifugal force created from a rotating shaft, most commonly that of an electric motor or a gasoline engine. The switch is designed to activate or de-activate as a function of the rotational speed of the shaft.

A position sensor may be a linear position sensor, for measuring a linear displacement or position typically in a straight line. The SI unit for length is meter (m), and prefixes may be used such as nanometer (nm), micrometer (μm), centimeter (cm), millimeter (mm), and kilometer (Km). A linear position sensor may be based on a resistance changing element such as linear potentiometer.

A linear position sensor may be a Linear Variable Differential Transformer (LVDT) used for measuring linear displacement based on the transformer concept. An LVDT has three coils placed in a tube, where the center coil serves as the primary winding coil, and the two outer coils serve as the transformer secondary windings. The position of a sliding cylindrical ferromagnetic core is measured by changing the mutual magnetic coupling between the windings. A linear position sensor may be a linear encoder, which may be similar to the rotary encoder counterpart, and may be based on the same principles. A linear encoder may be either incremental or absolute, and may be of optical, magnetic, capacitive, inductive, or eddy-current type. Optical linear encoder typically uses a light source such as an LED or laser diode, and may employ shuttering, diffraction, or holographic principles. A magnetic linear encoder may employ an active (magnetized) or passive (variable reluctance) scheme, and the position may be sensed using a sense coil, 'Hall effect' or magneto-resistive read-head. A capacitive or inductive linear encoder respectively measures the changes of capacitance or the inductance. Eddy-current linear encoder may be based on U.S. Pat. No. 3,820,110 to Henrich et al. entitled: "Eddy Current Type Digital Encoder and Position Reference".

The sensor 51 may consist of, or be based on, a gyroscope, for measuring orientation is space. A conventional gyroscope is a mechanical type, consisting of a wheel or disk mounted so that it can spin rapidly about an axis that is itself free to alter in direction. The orientation of the axis is not affected by tilting of the mounting; so gyroscopes are commonly used to provide stability or maintain a reference direction in navigation systems, automatic pilots, and stabilizers. A MEMS gyroscope may be based on vibrating element based on the Foucault pendulum concept. A Fiber Optic Gyroscope (FOG) uses the interference or light to detect mechanical rotation. A Vibrating structure Gyroscope (VSG, a.k.a. Coriolis Vibratory Gyroscope—CVG), is based on a metal alloy resonator, and may be a piezoelectric gyroscope type where a piezoelectric material is vibrating and the lateral motion due to centrifugal force is measured.

The sensor 51 may be a motion sensor, and may include one or more accelerometers, which measure the absolute acceleration or the acceleration relative to freefall. The accelerometer may be piezoelectric, piezoresistive, capacitive, MEMS, or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

In one example, the physical phenomenon 54 comprises mechanical vibration, defined as the measurement of a periodic process of oscillations with respect to an equilibrium point. The oscillations may be periodic, such as the motion of a pendulum, or random. Free vibration occurs when a mechanical system is set in motion with an initial input and allowed to vibrate freely. Examples of this type of vibration are pulling a child back on a swing and letting it go, or hitting a tuning fork and letting it ring. The mechanical system vibrates at one or more of its natural frequencies and damps down to motionlessness. Forced vibration is when a time-varying disturbance (load, displacement or velocity) is applied to a mechanical system. The disturbance can be a periodic and steady-state input, a transient input, or a random input. The periodic input can be a harmonic or a non-harmonic disturbance. Examples of these types of vibration include a washing machine shaking due to an imbalance, transportation vibration caused by an engine or uneven road, or the vibration of a building during an earthquake. For linear systems, the frequency of the steady-state vibration response resulting from the application of a periodic, harmonic input is equal to the frequency of the applied force or motion, with the response magnitude being dependent on the actual mechanical system. Damped vibration: When the energy of a vibrating system is gradually dissipated by friction and other resistances, the vibrations are said to be damped. The vibrations gradually reduce or change in frequency or intensity or cease and the system rests in its equilibrium position. An example of this type of vibration is the vehicular suspension dampened by the shock absorber.

While exampled above regarding a physical phenomenon 54 that involves orientation or motion that mechanically affects both the video camera 10 and the sensor 51 as they are mechanically attached to each other, the physical phenomenon 54 may equally comprises an environmental condition or state that affects both the video camera 10 and the sensor 51. They may be jointly affected by being mechanically attached, such as directly mechanically attached to each other or being enclosed in the same housing. Alternatively or in addition, the video camera 10 and the sensor 51 may be jointly affected by the environmental condition that is part of the physical phenomenon 54 being in the vicinity of each other, even if they are not in the same enclosure or being mechanically attached to each other. For example, the distance between the video camera 10 and the sensor 51 may be equal to, may be less than, or may be higher than, 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, or 1 Km (kilometer). The sensor 51 may be operative to sense, measure, or detect the environmental condition, and may respond to environmental conditions such as temperature, humidity, noise, vibration, fumes, odors, toxic conditions, dust, and ventilation.

In one example, the physical phenomenon 54 relates to the temperature of an object, that may be solid, liquid or gas (such as the air temperature), in a location. A corresponding sensor 51 may be based on a thermistor, which is a type of resistor whose resistance varies significantly with temperature, and is commonly made of ceramic or polymer material. A thermistor may be a PTC (Positive Temperature Coefficient) type, where the resistance increases with increasing temperatures, or may be an NTC (Negative Temperature Coefficient) type, where the resistance decreases with increasing temperatures. Alternatively (or in addition), a thermoelectric sensor may be based on a thermocouple, consisting of two different conductors (usually metal alloys), that produce a voltage proportional to a temperature difference. For higher accuracy and stability, an RTD (Resistance Temperature Detector) may be used, typically consisting of a length of fine wire-wound or coiled wire wrapped around a ceramic or glass core. The RTD is made of a pure material whose resistance at various temperatures is known (R vs. T). A common material used may be platinum, copper, or nickel. A quartz thermometer may be used as well for high-precision and high-accuracy temperature measurement, based on the frequency of a quartz crystal oscillator. The temperature may be measured using conduction, convection, thermal radiation, or by the transfer of energy by phase changes. The temperature may be measured in degrees Celsius (° C.) (a.k.a. Centigrade), Fahrenheit (° F.), or Kelvin (° K). In one example, the temperature sensor (or its output) is used to measure a temperature gradient, providing in which direction and at what rate the temperature changes the most rapidly around a particular location. The temperature gradient is a dimensional quantity expressed in units of degrees (on a particular temperature scale) per unit length, such as the SI (International System of Units) unit Kelvin per meter (K/m).

In one example, the physical phenomenon 54 relates to radioactivity, and a corresponding sensor 51 may be based on a Geiger counter, measuring ionizing radiation. The emission of alpha particles, beta particles or gamma rays are detected and counted by the ionization produced in a low-pressure gas ion a Geiger-Muller tube. The SI unit of radioactive activity is the Becquerel (Bq).

In one example, the physical phenomenon 54 relates to the ambient light level, and a corresponding sensor 51 may be based on a photoelectric sensor is used to measure, sense or detect light or the luminous intensity, such as a photosensor or a photodetector. The light sensed may be a visible light, or invisible light such as infrared, ultraviolet, X-ray or gamma rays. Such sensors may be based on the quantum mechanical effects of light on electronic materials, typically semiconductors such as silicon, germanium, and Indium gallium arsenide. A photoelectric sensor may be based on the photoelectric or photovoltaic effect, such as a photodiode, phototransistor and a photomultiplier tube. The photodiode typically uses a reverse biased p-n junction or PIN structure diode, and a phototransistor is in essence a bipolar transistor enclosed in a transparent case so that light can reach the base-collector junction, and the electrons that are generated by photons in the base-collector junction are injected into the base, and this photodiode current is amplified by the transistor's current gain β (or hfe). A reverse-biased LED (Light Emitting Diode) may also act as a photodiode. Alternatively or in addition, a photosensor may be based on photoconductivity, where the radiation or light absorption changes the conductivity of a photoconductive material, such as selenium, lead sulfide, cadmium sulfide, or polyvinylcarbazole. In such a case, the sensor may be based on photoresistor or LDR (Light Dependent Resistor), which is a resistor whose resistance decreases with increasing incident light intensity. In one example, Charge-Coupled Devices (CCD) and CMOS (Complementary Metal-Oxide-Semiconductor) may be used as the light-sensitive elements, where incoming photons are converted into electron charges at the semiconductor-oxide interface. The sensor may be based an Active Pixel Sensor (APS), for example as an element in an image sensor, and may be according to, or based on, the sensor described in U.S. Pat. No. 6,549,234 to Lee, entitled: "Pixel Structure of Active Pixel Sensor (APS) with Electronic Shutter Function", in U.S. Pat. No. 6,844,897 to Andersson, entitled: "Active Pixel Sensor (APS) Readout Structure with Amplification", in U.S. Pat. No. 7,342,212 to Mentzer et al., entitled: "Analog Vertical Sub-Sampling in an Active Pixel Sensor (APS) Image Sensor", or in U.S. Pat. No. 6,476,372 to Merrill et al., entitled: "CMOS Active Pixel Sensor Using Native Transistors", which are all incorporated in their entirety for all purposes as if fully set forth herein.

In one example, the physical phenomenon 54 relates to an atmospheric pressure, and a corresponding sensor 51 may be based on a pressure sensor (a.k.a. pressure transducer or pressure transmitter/sender) for measuring a pressure of gases or liquids, commonly using units of Pascal (Pa), Bar (b) (such as millibar), Atmosphere (atm), Millimeter of Mercury (mmHg), or Torr, or in terms of force per unit area such as Barye-dyne per square centimeter (Ba). Pressure sensor may indirectly measure other variable such as fluid/gas flow, speed, water-level, and altitude. A pressure sensor may be a pressure switch, acting to complete or break an electric circuit in response to measured pressure magnitude. A pressure sensor may be an absolute pressure sensor, where the pressure is measured relative to a perfect vacuum, may be a gauge pressure sensor where the pressure is measured relative to an atmospheric pressure, may be a vacuum pressure sensor where a pressure below atmospheric pressure is measured, may be a differential pressure sensor where the difference between two pressures is measured, or may be a sealed pressure sensor where the pressure is measured relative to some fixed pressure. The changes in pressure relative to altitude may serve to use a pressure sensor for altitude sensing, and the Venturi effect may be used to measure flow by a pressure sensor. Similarly, the depth of a submerged body or the fluid level on contents in a tank may be measured by a pressure sensor.

A pressure sensor may be of a force collector type, where a force collector (such a diaphragm, piston, bourdon tube, or bellows) is used to measure strain (or deflection) due to applied force (pressure) over an area. Such sensor may be a based on the piezoelectric effect (a piezoresistive strain gauge), and may use Silicon (Monocrystalline), Polysilicon Thin Film, Bonded Metal Foil, Thick Film, or Sputtered Thin Film. Alternatively or in addition, such force collector type sensor may be of a capacitive type, which uses a metal, a ceramic, or a silicon diaphragm in a pressure cavity to create a variable capacitor to detect strain due to applied pressure. Alternatively or in addition, such force collector type sensor may be of an electromagnetic type, where the displacement of a diaphragm by means of changes in inductance is measured. Further, in optical type the physical change of an optical fiber, such as strain, due to applied pressure is sensed. Further, a potentiometric type may be used, where the motion of a wiper along a resistive mechanism is used to measure the strain caused by the applied pressure. A pressure sensor may measure the stress or the changes in gas density, caused by the applied pressure, by using the changes in resonant frequency in a sensing mechanism, by using the changes in thermal conductivity of a gas, or by using the changes in the flow of charged gas particles (ions). An air pressure sensor may be a barometer, typically used to measure the atmospheric pressure, commonly used for weather forecast applications.

A pressure sensor may be according to, or based on, the sensor described in U.S. Pat. No. 5,817,943 to Welles, II et al., entitled: "Pressure Sensors", in U.S. Pat. No. 6,606,911 to Akiyama et al., entitled: "Pressure Sensors", in U.S. Pat. No. 4,434,451 to Delatorre, entitled: "Pressure Sensors", or in U.S. Pat. No. 5,134,887 to Bell, entitled: "Pressure Sensors", which are all incorporated in their entirety for all purposes as if fully set forth herein.

In one example, the physical phenomenon 54 relates to a humidity, and a corresponding sensor 51 may be based on a humidity sensor, such as a hygrometer, used for measuring the humidity in the environmental air or other gas, relating to the water vapors or the moisture content, or any water content in a gas-vapor mixture. The hygrometer may be a humidistat, which is a switch that responds to a relative humidity level, and commonly used to control humidifying or dehumidifying equipment. The measured humidity may be an absolute humidity, corresponding to the amount of water vapor, commonly expressed in water mass per unit of volume. Alternatively or in addition, the humidity may be relative humidity, defined as the ratio of the partial pressure of water vapor in an air-water mixture to the saturated vapor pressure of water at those conditions, commonly expressed in percent (%), or may be specific humidity (a.k.a. humidity ratio), which is the ratio of water vapor to dry air in a particular mass. The humidity may be measured with a dew-point hygrometer, where condensation is detected by optical means. In capacitive humidity sensors, the effect of humidity on the dielectric constant of a polymer or metal oxide material is measured. In resistive humidity sensors, the resistance of salts or conductive polymers is measured. In thermal conductivity humidity sensors, the change in thermal conductivity of air due to the humidity is checked, providing indication of absolute humidity. The humidity sensor may be a humidistat, which is a switch that responds to a relative humidity level, and commonly used to control humidifying or dehumidifying equipment. The humidity sensor may be according to, or based on, the sensor described in U.S. Pat. No. 5,001,453 to Ikejiri et al., entitled: "Humidity Sensor", in U.S. Pat. No. 6,840,103 to Lee at al., entitled: "Absolute Humidity Sensor", in U.S. Pat. No. 6,806,722 to Shon et al., entitled: "Polymer-Type Humidity Sensor", or in U.S. Pat. No. 6,895,803 to Seakins et al., entitled: "Humidity Sensor", which are all incorporated in their entirety for all purposes as if fully set forth herein.

A sensor may be an atmospheric sensor, and may be according to, or based on, the sensor described in U.S. Patent Application Publication No. 2004/0182167 to Orth et al., entitled: "Gage Pressure Output From an Absolute Pressure Measurement Device", in U.S. Pat. No. 4,873,481 to Nelson et al., entitled: "Microwave Radiometer and Methods for Sensing Atmospheric Moisture and Temperature", in U.S. Pat. No. 3,213,010 to Saunders et al., entitled: "Vertical Drop Atmospheric Sensor", or in U.S. Pat. No. 5,604,595 to Schoen, entitled: "Long Stand-Off Range Differential Absorption Tomographic Atmospheric Trace Substances Sensor Systems Utilizing Bistatic Configurations of Airborne and Satellite Laser Source and Detector Reflector Platforms", which are all incorporated in their entirety for all purposes as if fully set forth herein.

Figure 5A:
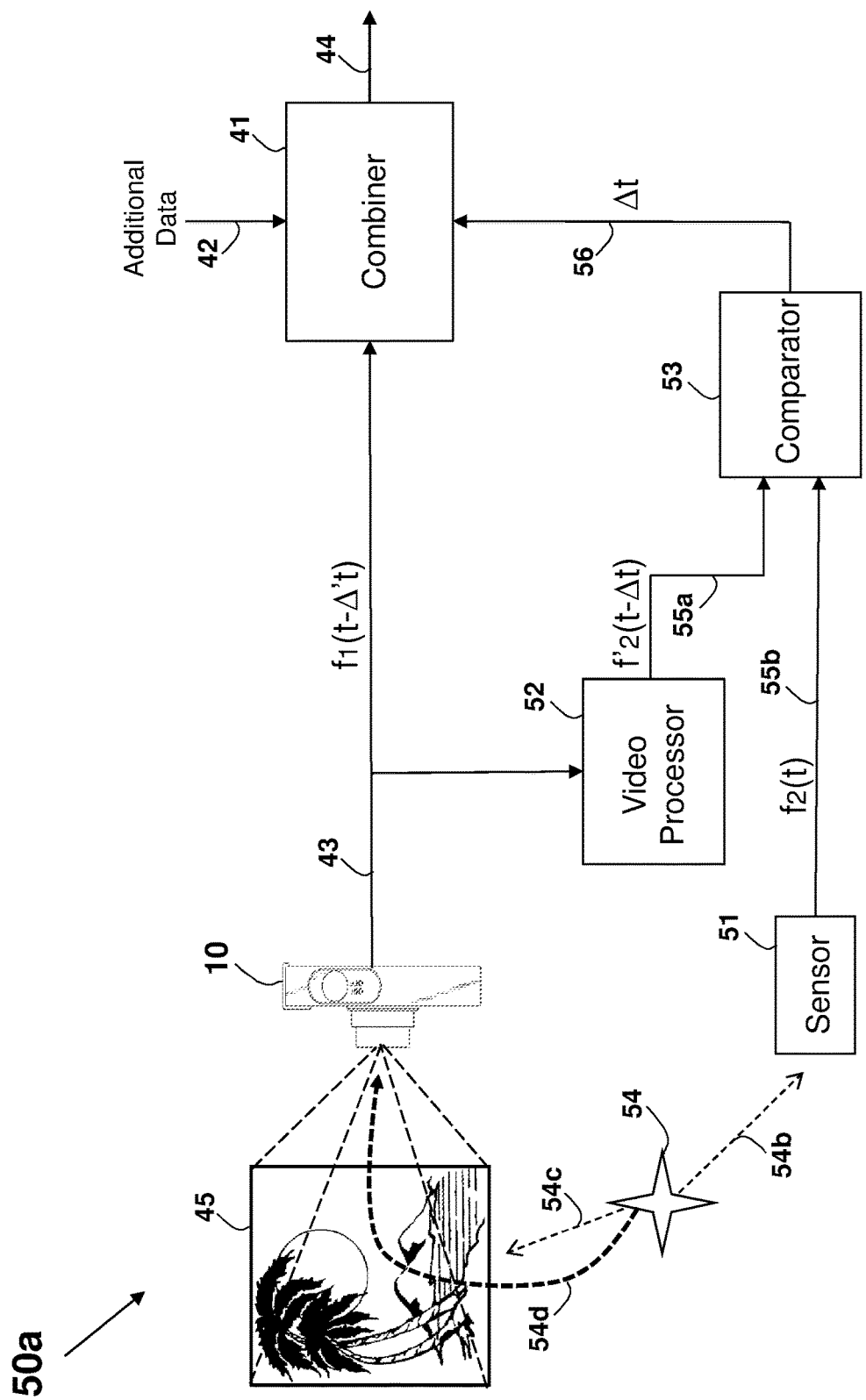
FIG. 5a illustrates schematically a simplified schematic block diagram arrangement of estimating and using a delay associated with a video data stream based on physical phenomenon affecting a sensor and a scene captured by a camera.

The methods and systems were exampled above regarding the physical phenomenon 54 that affects the video camera 10 itself and sensed, measured, or detected by the sensor 51, as shown in the arrangement 50 shown in FIG. 5. However, the concepts, methods and arrangements in a configuration where the physical phenomenon 54 affects not only the video camera 10 itself, but alternatively or in addition affects the scene 45 captured by the video camera 10, as illustrated pictorially by a dashed line 54c in an arrangement 50a shown in FIG. 5a. In such a scenario, the effect of the physical phenomenon 54 on the scene 45 is captured by the video camera 10 as part of the scene 45 capturing, as illustrated pictorially by a dashed line 54d in the arrangement 50a. The effect on the captured scene 45 is then detected and analyzed by the video processor 52, for providing the signal f2(t-Δt) 55a, as described above.

For example, the physical phenomenon 54 may cause an object that is part of the captured scene 45 to move, such as a wind that causes trees or other vegetation to move. The wind speed and direction may be sensed by the sensor 51, which may include a wind or air speed detector. Further, the motion in the captured scene 45 may be detected by the video processor 52, and the wind speed and direction may be estimated for comparison with the sensor 51 output as described herein.

Figure 6:
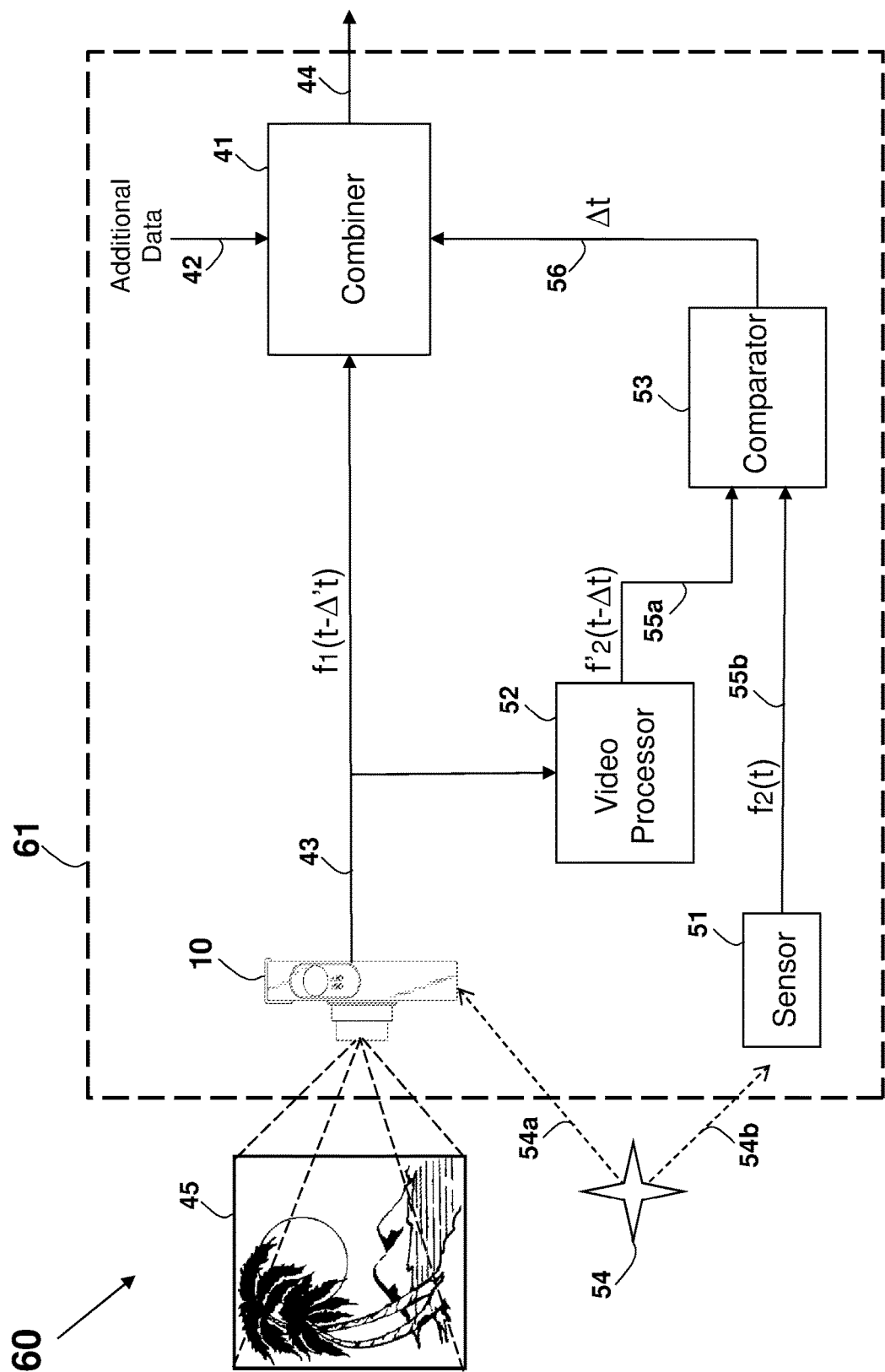
FIG. 6 illustrates schematically a simplified schematic block diagram arrangement of a single enclosure that includes all components for estimating and using a delay associated with a video data stream.

In one example, all the functionalities and components shown as part of the arrangement 50 shown in FIG. 5 are housed in a single device or enclosure 61, as shown in an arrangement 60 shown in FIG. 6. In such a configuration, the camera 10, the sensor 51, the video processor 52 (either as an hardware processor or as software that is executed by a processor), the comparator 53 (either as an hardware circuit, a processor, or as software that is executed by a processor), and the combiner 41 are housed together, and may be mechanically attached, such as being mechanically mounted to the single enclosure 61. Alternatively, the sensing related components, namely the camera 10 and the sensor 51 are housed in one enclosure 62, while the processing elements, components, circuits, or functionalities, such as the combiner 41 and the comparator 53, are housed in another distinct enclosure 63, as shown in an arrangement 60a shown in FIG. 6a. In such a scenario, the combination of the camera 10 and the sensor 51 may be located in one location or be part of a one device, while the processing elements, components, circuits, or functionalities, such as the combiner 41 and the comparator 53, may be located in another location or be part of another device, that may be remotely situated from the scene 45 that is being captured. The video processor 52 functionality may be individually housed, separately from the other enclosures. Alternatively, the video processor 52 functionality may be added to the processing enclosure 63 as part of a single enclosure 63a shown as part of an arrangement 60b shown in FIG. 6b, or may be added to the sensing enclosure 62 as part of a single enclosure 62a shown as part of an arrangement 60c shown in FIG. 6c. Each of the enclosures may include other elements, components, circuits, and functionalities, and may be part of a device or system.

Figure 6A:
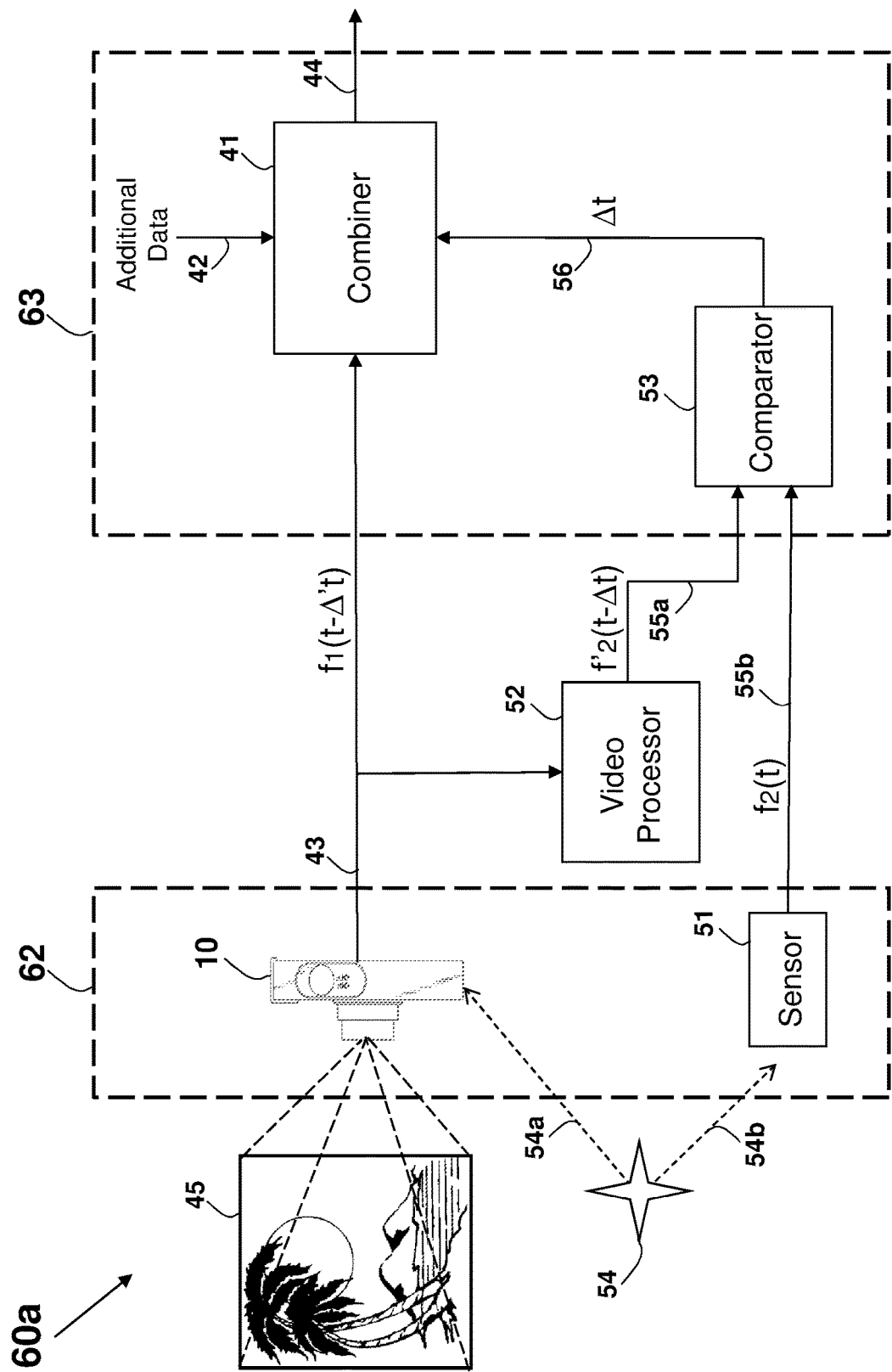
FIGS. 6a, 6b, and 6c illustrate schematically a simplified schematic block diagram arrangement of two enclosures that include components for estimating and using a delay associated with a video data stream.
Figure 6B:
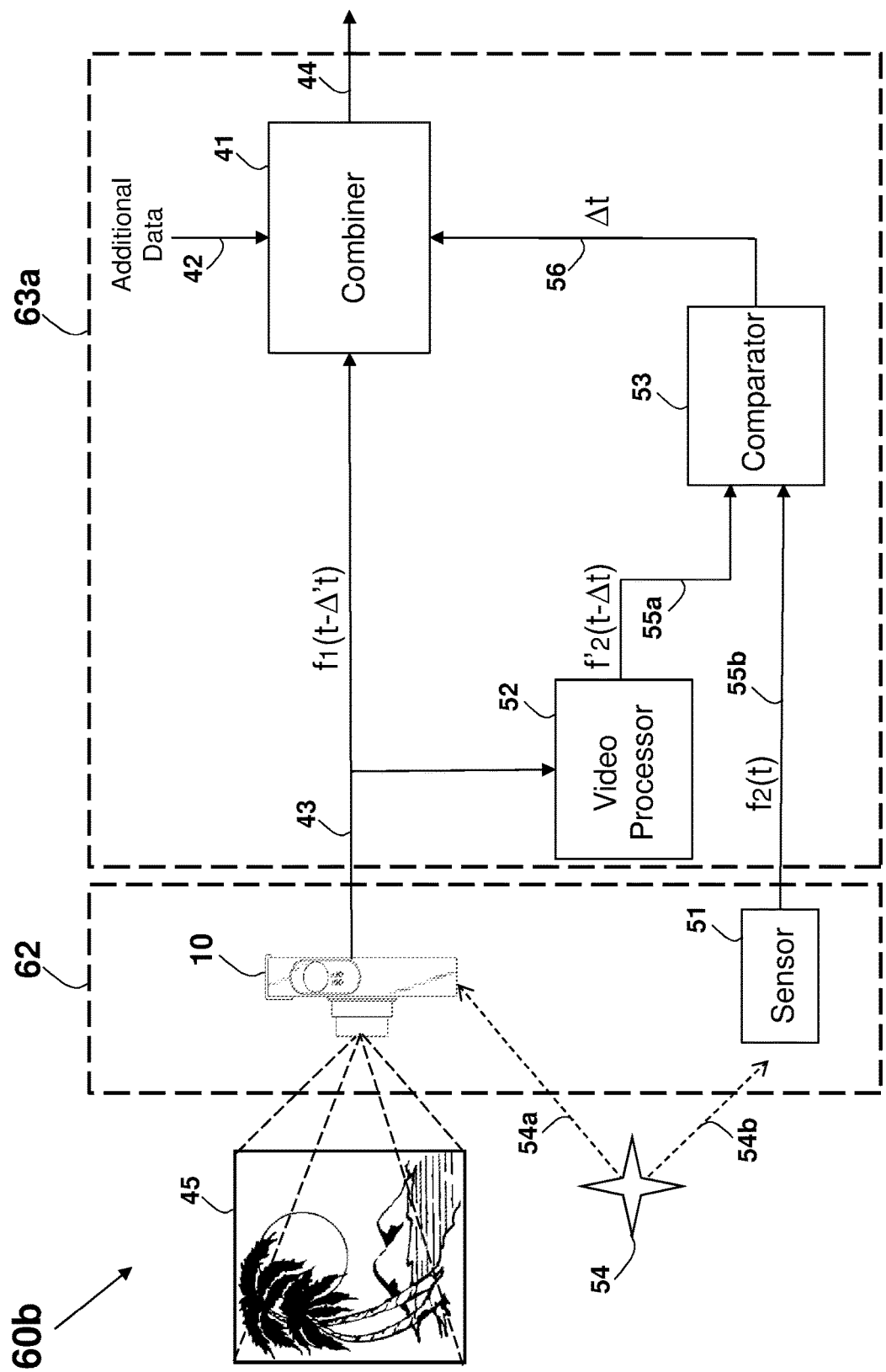
Figure 6C:
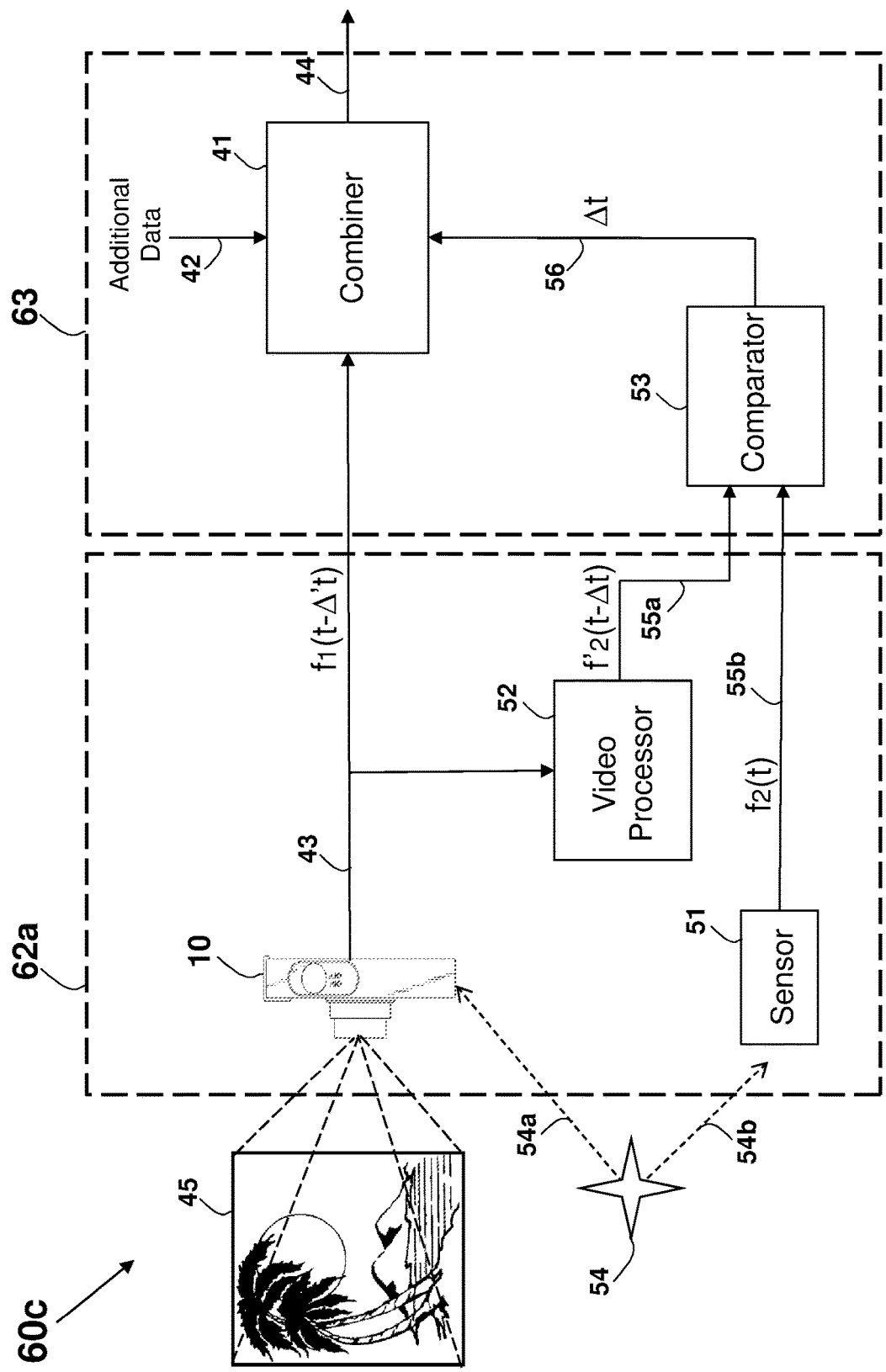

Any enclosure herein, such as the enclosure 61 shown as part of the arrangement 60 in FIG. 6, the enclosure 62 shown as part of the arrangement 60a in FIG. 6a, the enclosure 63 shown as part of the arrangement 60a in FIG. 6a, the enclosure 62 shown as part of the arrangement 60b in FIG. 6b, the enclosure 63a shown as part of the arrangement 60b in FIG. 6b, or the enclosure 62a shown as part of the arrangement 60c in FIG. 6c, and any other apparatus herein, which may be any of the systems, devices, modules, or functionalities described herein, may be integrated with, part of, be included in, be attached to, or be attachable to, a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

Any enclosure herein, such as the enclosure 61 shown as part of the arrangement 60 in FIG. 6, the enclosure 62 shown as part of the arrangement 60a in FIG. 6a, the enclosure 63 shown as part of the arrangement 60a in FIG. 6a, the enclosure 62 shown as part of the arrangement 60b in FIG. 6b, the enclosure 63a shown as part of the arrangement 60b in FIG. 6b, or the enclosure 62a shown as part of the arrangement 60c in FIG. 6c, and any other apparatus herein, which may be any of the systems, devices, modules, or functionalities described herein, may be structured as, may be shaped or configured to serve as, or may be integrated with, a wearable device. For example, any apparatus or device herein may be wearable on an organ such as on the person head, and the organ may be eye, ear, face, cheek, nose, mouth, lip, forehead, or chin. Alternatively or in addition, any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any enclosure herein, such as the enclosure 61 shown as part of the arrangement 60 in FIG. 6, the enclosure 62 shown as part of the arrangement 60a in FIG. 6a, the enclosure 63 shown as part of the arrangement 60a in FIG. 6a, the enclosure 62 shown as part of the arrangement 60b in FIG. 6b, the enclosure 63a shown as part of the arrangement 60b in FIG. 6b, or the enclosure 62a shown as part of the arrangement 60c in FIG. 6c, and any other apparatus herein, which may be any of the systems, devices, modules, or functionalities described herein, may be part of, comprises, or consists of, a vehicle. Any vehicle herein may be a ground vehicle adapted to travel on land, such as a bicycle, a car, a motorcycle, a train, an electric scooter, a subway, a train, a trolleybus, or a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV). Any vehicle herein may be a ground vehicle that may consist of, or may comprise, an autonomous car, which may be according to levels 0, 1, 2, 3, 4, or 5 of the Society of Automotive Engineers (SAE) J3016 standard.

In the exemplary 60b shown in FIG. 6b, the system comprise two enclosures, the enclosure 62 that includes the video camera 10 and the sensor 51, and the enclosure 63a that includes the elements involved in analyzing and using the data received from the sensing devices enclosure 62. The two distinct devices may be spatially separated, such a being installed or located in different locations. Further, one of the enclosures may be part of, or installed in, a vehicle, while the other enclosure may be stationary.

In one exemplary arrangement 80 shown in FIG. 8, the two separated devices communicate over a wireless network 84. The video camera 10 and the sensor 51 are enclosed in an enclosure 86, which may correspond to the enclosure 62, and the other functionalities are housed in an enclosure 87, which may correspond to the enclosure 63a. A multiplexer MUX 81 may be used, in order to combine the two signals, the video data stream 43 and the sensor output signal 55b. Such multiplexing may allow for carrying the two signals over a single medium, such as a single data stream, and may be using Frequency Division/Domain Multiplexing (FDM) or may be using Time Domain/Division Multiplexing (TDM). The combined MUX 81 output signal is then fed to a wireless transceiver 82a, that converts the signal into a wireless signal that can be transmitted to the air via an antenna 83a. The wirelessly transmitted signal is carried over the wireless network 84, and received by a mating wireless transceiver 82b via a mating antenna 83b. The received signal is then de-multiplexed by de-multiplexer DEMUX 85, which mates with the MUX 81, and operates to separate the combined signals to the original ones. Specifically, the combined received signal is split by the DEMUX 85 to a signal 43*a* that represents the transmitted video data stream 43, and is preferably identical to it, and to a signal 55*c* that represents the sensor output 55*b*, and is preferably identical to it. The operation of the receiving device 87 is then identical or similar to the operation of the device 63*a*, as described herein.

In one example, the wireless network 84 may be using, may be according to, may be compatible with, or may be based on, an Near Field Communication (NFC) using passive or active communication mode, may use the 13.56 MHz frequency band, data rate may be 106 Kb/s, 212 Kb/s, or 424 Kb/s, the modulation may be Amplitude-Shift-Keying (ASK), and may further be according to, compatible with, or based on, ISO/IEC 18092, ECMA-340, ISO/IEC 21481, or ECMA-352. In this scenario, each of the wireless transceivers 82*a* and 82*b* may be an NFC modem or transceiver, and each of the antennas 83*a* and 83*b* may be an NFC antenna. Alternatively or in addition, the wireless network 84 may be using, may be according to, may be compatible with, or may be based on, a Personal Area Network (PAN) that may be according to, or based on, Bluetooth™ or IEEE 802.15.1-2005 standards that may be, each of the wireless transceivers 82*a* and 82*b* may be a PAN modem, and each of the antennas 83*a* and 83*b* may be a PAN antenna. In one example, the Bluetooth is a Bluetooth Low-Energy (BLE) standard. Further, the PAN may be a wireless control network according to, or based on, Zigbee™ or Z-Wave™ standards, such as IEEE 802.15.4-2003. Alternatively or in addition, the wireless network 84 may be using, may be according to, may be compatible with, or may be based on, an analog Frequency Modulation (FM) over license-free band such as the LPD433 standard that uses frequencies with the ITU region 1 ISM band of 433.050 MHz to 434.790 MHz, each of the wireless transceivers 82*a* and 82*b* may be an LPD433 modem, and each of the antennas 83*a* and 83*b* may be an LPD433 antenna.

Alternatively or in addition, the wireless network 84 may be using, may be according to, may be compatible with, or may be based on, a Wireless Local Area Network (WLAN) that may be according to, or based on, IEEE 802.11a, IEEE 802.11b, IEEE 802.11g, IEEE 802.11n, or IEEE 802.11ac standards, each of the wireless transceivers 82*a* and 82*b* may be a WLAN modem, and each of the antennas 83*a* and 83*b* may be a WLAN antenna.

Alternatively or in addition, the wireless network 84 may be using, may be according to, may be compatible with, or may be based on, a wireless broadband network or a Wireless Wide Area Network (WWAN), each of the wireless transceivers 82*a* and 82*b* may be a WWAN modem, and each of the antennas 83*a* and 83*b* may be a WWAN antenna. The WWAN may be a WiMAX network such as according to, or based on, IEEE 802.16-2009, each of the wireless transceivers 82*a* and 82*b* may be a WiMAX modem, and each of the antennas 83*a* and 83*b* may be a WiMAX antenna. Alternatively or in addition, the WWAN may be a cellular telephone network, each of the wireless transceivers 82*a* and 82*b* may be a cellular modem, and each of the antennas 83*a* and 83*b* may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on IEEE 802.20-2008. Alternatively or in addition, the wireless network 84 may be using, may be using licensed or an unlicensed radio frequency band, such as the Industrial, Scientific and Medical (ISM) radio band.

Alternatively or in addition, the wireless network 84 may use a Dedicated Short-Range Communication (DSRC), that may be according to, compatible with, or based on, European Committee for Standardization (CEN) EN 12253:2004, EN 12795:2002, EN 12834:2002, EN 13372:2004, or EN ISO 14906:2004 standard, or may be according to, compatible with, or based on, IEEE 802.11p, IEEE 1609.1-2006, IEEE 1609.2, IEEE 1609.3, IEEE 1609.4, or IEEE1609.5.

Any arrangement or method described herein may be used as part of a Virtual Reality (VR) system. For example, the output 44 of the combiner 41 may be fed to an HMD, allowing a person wearing the HMD to watch the captured scene 45, with the additional data 42 synchronously overlayed over the video data captured by the video camera 10.

While exampled above regarding an optical-based imaging video camera 10 that is operative to capture images or scenes in a visible or non-visible spectrum, any method or system herein may equally use a LiDAR camera or scanner, as well as thermal camera, as a substitute to the video camera 10.

While exampled herein, such as in the arrangement 60 shown in FIG. 6, that the Δt 56 is a positive value, corresponding to that the video stream signal f1(t-Δ't) 43 is lagging after the sensor 51 output signal f2(t) 55*b*, any method and apparatus herein equally applies to a scenario where the video stream signal f1(t-Δ't) 43 is advanced, and the sensor 51 output signal f2(t) 55*b* is lagging beyond the video stream signal f1(t-Δ't) 43. Mathematically and practically, such a scenario is equivalent to a negative value of the time delay Δt 56. The absolute value of such a negative time delay may be equal to, higher than, or less than, 1 millisecond, 2 milliseconds, 5 milliseconds, 10 milliseconds, 20 milliseconds, 30 milliseconds, 50 milliseconds, 100 milliseconds, 200 milliseconds, 500 milliseconds, 1 second, 2 seconds, 5 seconds, 10 seconds, 20 seconds, 30 seconds, 1 minute, 2, minutes, 5 minutes, 10 minutes, 20 minutes, 30 minutes, 1 hour, 2 hours, 5 hours, or 10 hours.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™-2008 entitled: *"Standard for Information Technology-Portable Operating System Interface (POSIX®) Description"*, and The Open Group Technical Standard Base Specifications, Issue 7, IEEE STD. 1003.1™, 2013 Edition.

Any part of, or whole of, any of the methods described herein may be implemented by a processor, or by a processor that is part of a device that in integrated with a digital camera, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat)), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any device herein may be integrated with part or an entire appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwashers, a food blender, a beverage maker, a coffeemaker, or an iced-tea maker. The appliance primary function may be associated with environmental control such as temperature control, and the appliance may consist of, or may be part of, an HVAC system, an air conditioner or a heater. The appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

Any steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

A non-limiting example of a processor may be 80186 or 80188 available from Intel Corporation located at Santa-Clara, California, USA. The 80186 and its detailed memory connections are described in the manual "80186/80188 High-Integration 16-Bit Microprocessors" by Intel Corporation, which is incorporated in its entirety for all purposes as if fully set forth herein. Other non-limiting example of a processor may be MC68360 available from Motorola Inc. located at Schaumburg, Illinois, USA. The MC68360 and its detailed memory connections are described in the manual "MC68360 Quad Integrated Communications Controller-User's Manual" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Texas, U.S.A.), described in a data sheet published 2015 by Texas Instruments Incorporated [DS-TM4C123GH6PM-15842.2741, SPMS376E, Revision 15842.2741 June 2014], entitled: "Tiva™ TM4C123GH6PM Microcontroller-Data Sheet", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). Capacity of a memory is commonly featured in bytes (B), where the prefix 'K' is used to denote kilo=$2^{10}$=$1024^1$=1,024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any medium or any memory, that participates in providing instructions to a processor for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, and EPROM, a FLASH-EPROM, any other memory chip or cartridge, a carrier wave as described hereinafter, or any other medium from which a computer can read.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that perform particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

Operating system. An Operating System (OS) is software that manages computer hardware resources and provides common services for computer programs. The operating system is an essential component of any system software in a computer system, and most application programs usually require an operating system to function. For hardware functions such as input/output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modem operating systems include Android, BSD, iOS, Linux, OS X, QNX, Microsoft Windows, Windows Phone, and IBM z/OS.

Any software or firmware herein may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Any apparatus herein, may be a client device that may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as a server, may equally function as a server in the meaning of client/server architecture. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Any sensor herein, such as the sensor 51, may be a piezoelectric sensor, where the piezoelectric effect is used to measure pressure, acceleration, strain or force, and may use transverse, longitudinal, or shear effect mode. A thin membrane may be used to transfer and measure pressure, while mass may be used for acceleration measurement. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PMN-PT). Any sensor herein, such as the sensor 51, may be a motion sensor, and may include one or more accelerometers, which measure the absolute acceleration or the acceleration relative to freefall. The accelerometer may be piezoelectric, piezoresistive, capacitive, MEMS, or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for estimating a delay of a video data stream from a Digital Video Camera (DVC), for use with a device having a single enclosure, and for use with a physical phenomenon that affects the video camera or a scene captured by the video camera, the method comprising:
   receiving, from the digital video camera, the video data stream;
   producing, by a video processor, a first signal that estimates the physical phenomenon value, by processing the video data stream for detecting the effect of the physical phenomenon on the captured video;
   receiving, from a sensor, a second signal that is responsive to the physical phenomenon value;
   estimating a time delay value between the first and second signals by comparing therebetween; and
   combining the video data stream with additional data by synchronizing using the estimated time delay value;
   wherein the single enclosure comprises the digital camera and the sensor.

2. The method according to claim 1, wherein the video processor is part of the device, the producing of the first signal is performed in the device, the estimating of the time delay value is performed in the device, or the combining of the video data stream with the additional data is performed in the device.

3. The method according to claim 1, wherein the single enclosure is a hand-held enclosure or a portable enclosure.

4. The method according to claim 1, wherein the single enclosure is a surface mountable enclosure.

5. The method according to claim 1, wherein the device consists or, comprises, or is part of, at least one of a wireless device, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone.

6. The method according to claim 5, wherein the device consists or, comprises, or is part of, a smartphone that comprises, or is based on, an Apple iPhone 6 or a Samsung Galaxy S6.

7. The method according to claim 1, further comprising operating of an operating system.

8. The method according to claim 7, wherein the operating system is a mobile operating system.

9. The method according to claim 8, wherein the mobile operating system comprises Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

10. The method according to claim 7, wherein the operating system is a Real-Time Operating System (RTOS).

11. The method according to claim 10, wherein the RTOS comprises FreeRTOS, SafeRTOS, QNX, VxWorks, or Micro-Controller Operating Systems (μC/OS).

12. The method according to claim 1, for use with a device is wearable on a person.

13. The method according to claim 12, wherein the video processor is part of the device, the producing of the first signal is performed in the device, the estimating of the time delay value is performed in the device, or the combining of the video data stream with the additional data is performed in the device.

14. The method according to claim 12, wherein the device is wearable on an organ of the person head.

15. The method according to claim 14, wherein the organ is an eye, ear, face, cheek, nose, mouth, lip, forehead, or chin.

16. The method according to claim 12, wherein the device is constructed to have a form substantially similar to, is constructed to have a shape allowing mounting or wearing identical or similar to, or is constructed to have a form to at least in part substitute for, headwear, eyewear, or earpiece.

17. The method according to claim 16, wherein the headwear consists of, structured as, or comprises, a bonnet, a cap, a crown, a fillet, a hair cover, a hat, a helmet, a hood, a mask, a turban, a veil, or a wig.

18. The method according to claim 16, wherein the eyewear consists of, structured as, or comprises, glasses, sunglasses, a contact lens, a blindfold, or a goggle.

19. The method according to claim 16, wherein the earpiece consists of, structured as, or comprises, a hearing aid, a headphone, a headset, or an earplug.

20. The method according to claim 12, wherein the device is permanently or releasably attachable to, or is part of, a clothing piece of a person.

21. The method according to claim 20, wherein the attaching uses taping, gluing, pinning, enclosing, encapsulating, a pin, or a latch and hook clip.

22. The method according to claim 21, wherein the clothing piece is a top, bottom, or full-body underwear, or a headwear, a footwear, an accessory, an outwear, a suit, a dress, a skirt, or a top.

23. The method according to claim 12, wherein the device comprises an annular member defining an aperture therethrough that is sized for receipt therein of a part of a human body.

24. The method according to claim 23, wherein the human body part is part of a human hand that consists of, or comprises, an upper arm, elbow, forearm, wrist, or a finger.

25. The method according to claim 23, wherein the human body part is part of a human head or neck that consists of, or comprises, a forehead, ear, skull, or face.

26. The method according to claim 23, wherein the human body part is part of a human thorax or abdomen that consists of, or comprises, a waist or hip.

27. The method according to claim 23, wherein the human body part is part of a human leg or foot that consists of, or comprises, a thigh, calf, ankle, instep, knee, or toe.

28. The method according to claim 1, wherein the digital camera and the sensor are part of, mounted in, or attached to, a vehicle.

29. The method according to claim 28, wherein the video processor is part of the vehicle, the producing of the first signal is performed in the vehicle, the estimating of the time delay value is performed in the vehicle, or the combining of the video data stream with the additional data is performed in the vehicle.

30. The method according to claim 28, wherein the vehicle is a ground vehicle adapted to travel on land.

31. The method according to claim 30, wherein the ground vehicle is one out of a bicycle, a car, a motorcycle, a train, an electric scooter, a subway, a train, a trolleybus, and a tram.

32. The method according to claim 28, wherein the vehicle is a buoyant or submerged watercraft adapted to travel on or in water.

33. The method according to claim 32, wherein the watercraft is one out of a ship, a boat, a hovercraft, a sailboat, a yacht, and a submarine.

34. The method according to claim 28, wherein the vehicle is an aircraft adapted to fly in air.

35. The method according to claim 34, wherein the aircraft is a fixed wing or a rotorcraft aircraft.

36. The method according to claim 34, wherein the aircraft is one out of an airplane, a spacecraft, a drone, or a glider.

37. The method according to claim 1, wherein the receiving of the video data stream comprises receiving of the video data stream over a wireless network by a first wireless transceiver via a first antenna from the video camera, or wherein the receiving of the second signal comprises receiving of the second signal over a wireless network by a first wireless transceiver via a first antenna from the sensor.

38. The method according to claim 37, further comprising transmitting the video data stream over a wireless network by a second wireless transceiver via a second antenna from the video camera, or wherein the method further comprising transmitting of the second signal over a wireless network by a second wireless transceiver via a second antenna from the sensor.

39. The method according to claim 37, for use with a received multiplexed signal that comprises the video data stream and the second signal, and wherein the method further comprising de-multiplexing the received multiplexed signal into the video data stream and the second signal.

40. The method according to claim 39, further comprising multiplexing the video data stream and the second signal into the received multiplexed signal.

41. The method according to claim 39, wherein the multiplexing is based on, or using, Frequency Division/Domain Multiplexing (FDM) or Time Domain/Division Multiplexing (TDM).

42. The method according to claim 37, wherein the wireless network is a Wireless Personal Area Network (WPAN), the first wireless transceivers is a WPAN transceiver, and the first antenna is a WPAN antenna.

43. The method according to claim 42, wherein the WPAN is according to, compatible with, or based on, Bluetooth™ or Institute of Electrical and Electronics Engineers (IEEE) IEEE 802.15.1-2005 standards, or wherein the WPAN is a wireless control network that is according to, or based on, Zigbee™, IEEE 802.15.4-2003, or Z-Wave™ standards.

44. The method according to claim 42, wherein the WPAN is according to, compatible with, or based on, Bluetooth Low-Energy (BLE).

45. The method according to claim 37, wherein the wireless network is a Wireless Local Area Network (WLAN), the first wireless transceiver is a WLAN transceiver, and the first antenna is a WLAN antenna.

46. The method according to claim 45, wherein the WLAN is according to, compatible with, or based on, IEEE 802.11-2012, IEEE 802.11a, IEEE 802.11b, IEEE 802.11g, IEEE 802.11n, or IEEE 802.11ac.

47. The method according to claim 37, wherein the wireless network is a Wireless Wide Area Network (WWAN), the first wireless transceivers is a WWAN transceiver, and the first antenna is a WWAN antenna.

48. The method according to claim 47, wherein the WWAN is according to, compatible with, or based on, WiMAX network that is according to, compatible with, or based on, IEEE 802.16-2009.

49. The method according to claim 47, wherein the wireless network is a cellular telephone network, the first wireless transceiver is a cellular modem, and the first antenna is a cellular antenna.

50. The method according to claim 49, wherein the wireless network is a cellular telephone network that is a Third Generation (3G) network that uses Universal Mobile Telecommunications System (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), or Global System for Mobile communications (GSM), Enhanced Data rates for GSM Evolution (EDGE) EDGE-Evolution, or wherein the cellular telephone network is a Fourth Generation (4G) network that uses Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or is based on IEEE 802.20-2008.

51. The method according to claim 37, wherein the wireless network is over a licensed or unlicensed radio frequency band.

52. The method according to claim 51, wherein the unlicensed radio frequency band is an Industrial, Scientific and Medical (ISM) radio band.

53. The method according to claim 37, wherein the wireless network is using, or is based on, Dedicated Short-Range Communication (DSRC).

54. The method according to claim 53, wherein the DSRC is according to, compatible with, or based on, European Committee for Standardization (CEN) EN 12253:2004, EN 12795:2002, EN 12834:2002, EN 13372:2004, or EN ISO 14906:2004 standard.

* * * * *